US012469849B2

(12) United States Patent
Zhu et al.

(10) Patent No.: US 12,469,849 B2
(45) Date of Patent: *Nov. 11, 2025

(54) NANOSTRUCTURED MATERIALS FOR BATTERY APPLICATIONS

(71) Applicant: OneD Material, Inc., Palo Alto, CA (US)

(72) Inventors: Yimin Zhu, Fremont, CA (US); Jay L. Goldman, Mountain View, CA (US); Jason Hartlove, Los Altos, CA (US); Hans Jurgen Hofler, Sunnyvale, CA (US)

(73) Assignee: OneD Material, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/012,784

(22) Filed: Jan. 7, 2025

(65) Prior Publication Data
US 2025/0149579 A1 May 8, 2025

Related U.S. Application Data

(63) Continuation of application No. 17/192,204, filed on Mar. 4, 2021, now Pat. No. 12,224,441, which is a
(Continued)

(51) Int. Cl.
H01M 4/583 (2010.01)
H01M 4/134 (2010.01)
(Continued)

(52) U.S. Cl.
CPC ............ H01M 4/583 (2013.01); H01M 4/134 (2013.01); H01M 4/1395 (2013.01); H01M 4/62 (2013.01);
(Continued)

(58) Field of Classification Search
CPC .... H01M 4/583; H01M 4/134; H01M 4/1395; H01M 4/366
See application file for complete search history.

(56) References Cited

U.S. PATENT DOCUMENTS 3,651,030 A 3/1972 Desaulniers et al.
4,849,311 A 7/1989 Itoh et al.
(Continued)

FOREIGN PATENT DOCUMENTS

CN 1895993 A 1/2007
CN 1967910 A 5/2007
(Continued)

OTHER PUBLICATIONS

Derwent Abstract for Huang et al. CN 1895993 A.
(Continued)

Primary Examiner — Nathanael T Zemui
(74) Attorney, Agent, or Firm — Jennifer Hayes; Nixon Peabody LLP

(57) ABSTRACT

The present invention relates to nanostructured materials (including nanowires) for use in batteries. Exemplary materials include carbon-comprising, Si-based nanostructures, nanostructured materials disposed on carbon-based substrates, and nanostructures comprising nanoscale scaffolds. The present invention also provides methods of preparing battery electrodes, and batteries, using the nanostructured materials.

30 Claims, 30 Drawing Sheets

Related U.S. Application Data continuation of application No. 17/024,441, filed on Sep. 17, 2020, now Pat. No. 11,600,821, which is a continuation of application No. 16/599,795, filed on Oct. 11, 2019, now Pat. No. 11,233,240, which is a continuation of application No. 12/783,243, filed on May 19, 2010, now Pat. No. 10,490,817.

(60) Provisional application No. 61/255,732, filed on Oct. 28, 2009, provisional application No. 61/221,392, filed on Jun. 29, 2009, provisional application No. 61/179,663, filed on May 19, 2009.

(51) Int. Cl.
*H01M 4/1395* (2010.01)
*H01M 4/62* (2006.01)
*H01M 10/0525* (2010.01)

(52) U.S. Cl.
CPC ... H01M 10/0525 (2013.01); *Y10T 29/49108* (2015.01)

(56) References Cited

U.S. PATENT DOCUMENTS

| | | |
|---|---|---|
| 5,196,396 A | 3/1993 | Lieber et al. |
| 5,226,913 A | 7/1993 | Pinchuk |
| 5,252,835 A | 10/1993 | Lieber et al. |
| 5,274,602 A | 12/1993 | Glen et al. |
| 5,332,910 A | 7/1994 | Haraguchi et al. |
| 5,338,430 A | 8/1994 | Parsonage et al. |
| 5,399,184 A | 3/1995 | Harada |
| 5,505,928 A | 4/1996 | Alivisatos et al. |
| 5,512,131 A | 4/1996 | Kumar et al. |
| 5,635,041 A | 6/1997 | Bahar et al. |
| 5,640,343 A | 6/1997 | Gallagher et al. |
| 5,674,592 A | 10/1997 | Clark et al. |
| 5,677,082 A | 10/1997 | Greinke et al. |
| 5,681,357 A | 10/1997 | Eschbach et al. |
| 5,688,293 A | 11/1997 | Oliver et al. |
| 5,690,807 A | 11/1997 | Clark, Jr. et al. |
| 5,751,018 A | 5/1998 | Alivisatos et al. |
| 5,800,706 A | 9/1998 | Fischer |
| 5,814,031 A | 9/1998 | Mooney et al. |
| 5,834,135 A | 11/1998 | Pendalwar et al. |
| 5,858,862 A | 1/1999 | Westwater et al. |
| 5,879,827 A | 3/1999 | Debe et al. |
| 5,879,828 A | 3/1999 | Debe et al. |
| 5,897,945 A | 4/1999 | Lieber et al. |
| 5,910,378 A | 6/1999 | Debe et al. |
| 5,916,642 A | 6/1999 | Chang |
| 5,953,595 A | 9/1999 | Gosain et al. |
| 5,962,863 A | 10/1999 | Russell et al. |
| 5,976,957 A | 11/1999 | Westwater et al. |
| 5,990,479 A | 11/1999 | Weiss et al. |
| 5,997,832 A | 12/1999 | Lieber et al. |
| 6,004,444 A | 12/1999 | Aksay et al. |
| 6,036,774 A | 3/2000 | Lieber et al. |
| 6,048,616 A | 4/2000 | Gallagher et al. |
| 6,128,214 A | 10/2000 | Kuekes et al. |
| 6,136,156 A | 10/2000 | El-Shall et al. |
| 6,159,742 A | 12/2000 | Lieber et al. |
| 6,165,642 A | 12/2000 | Kawakami et al. |
| 6,190,634 B1 | 2/2001 | Lieber et al. |
| 6,207,229 B1 | 3/2001 | Bawendi et al. |
| 6,225,198 B1 | 5/2001 | Alivisatos et al. |
| 6,235,675 B1 | 5/2001 | McIlroy |
| 6,248,674 B1 | 6/2001 | Kamins et al. |
| 6,256,767 B1 | 7/2001 | Kuekes et al. |
| 6,274,007 B1 | 8/2001 | Smirnov et al. |
| 6,303,266 B1 | 10/2001 | Okino et al. |
| 6,306,736 B1 | 10/2001 | Alivisatos et al. |
| 6,321,915 B1 | 11/2001 | Wilson et al. |
| 6,322,901 B1 | 11/2001 | Bawendi et al. |
| 6,334,939 B1 | 1/2002 | Zhou et al. |
| 6,361,861 B2 | 3/2002 | Gao et al. |
| 6,380,103 B2 | 4/2002 | Gonzalez et al. |
| 6,383,923 B1 | 5/2002 | Brown et al. |
| 6,413,489 B1 | 7/2002 | Ying et al. |
| 6,438,025 B1 | 8/2002 | Skarupo |
| 6,440,606 B1 | 8/2002 | Yoshizawa et al. |
| 6,447,663 B1 | 9/2002 | Lee et al. |
| 6,471,761 B2 | 10/2002 | Fan et al. |
| 6,479,030 B1 | 11/2002 | Firsich |
| 6,495,258 B1 | 12/2002 | Chen et al. |
| 6,504,292 B1 | 1/2003 | Choi et al. |
| 6,514,395 B2 | 2/2003 | Zhou et al. |
| 6,566,704 B2 | 5/2003 | Choi et al. |
| 6,582,673 B1 | 6/2003 | Chow et al. |
| 6,586,785 B2 | 7/2003 | Flagan et al. |
| 6,589,682 B1 | 7/2003 | Fleckner et al. |
| 6,589,696 B2 | 7/2003 | Matsubara et al. |
| 6,610,355 B2 | 8/2003 | Yadav et al. |
| 6,648,712 B2 | 11/2003 | Choi et al. |
| 6,741,019 B1 | 5/2004 | Filas et al. |
| 6,749,827 B2 | 6/2004 | Smalley |
| 6,749,892 B2 | 6/2004 | Chang |
| 6,755,956 B2 | 6/2004 | Lee et al. |
| 6,756,026 B2 | 6/2004 | Colbert et al. |
| 6,760,245 B2 | 7/2004 | Eaton et al. |
| 6,773,616 B1 | 8/2004 | Chen et al. |
| 6,781,166 B2 | 8/2004 | Lieber et al. |
| 6,798,000 B2 | 9/2004 | Luyken et al. |
| 6,815,218 B1 | 11/2004 | Jacobson et al. |
| 6,815,750 B1 | 11/2004 | Kamins |
| 6,831,017 B1 | 12/2004 | Li et al. |
| 6,858,455 B2 | 2/2005 | Guillom et al. |
| 6,872,645 B2 | 3/2005 | Duan et al. |
| 6,875,537 B2 | 4/2005 | Tani et al. |
| 6,878,871 B2 | 4/2005 | Scher et al. |
| 6,882,051 B2 | 4/2005 | Majumdar et al. |
| 6,887,511 B1 | 5/2005 | Shima et al. |
| 6,911,767 B2 | 6/2005 | Takai |
| 6,926,985 B2 | 8/2005 | Wariishi et al. |
| 6,933,033 B1 | 8/2005 | Forsyth et al. |
| 6,949,206 B2 | 9/2005 | Whiteford et al. |
| 6,962,823 B2 | 11/2005 | Empedocles et al. |
| 6,976,897 B2 | 12/2005 | Choi et al. |
| 7,009,331 B2 | 3/2006 | Sheu et al. |
| 7,051,945 B2 | 5/2006 | Stumbo et al. |
| 7,056,409 B2 | 6/2006 | Dubrow |
| 7,057,881 B2 | 6/2006 | Chow et al. |
| 7,067,328 B2 | 6/2006 | Dubrow et al. |
| 7,094,499 B1 | 8/2006 | Hung |
| 7,105,428 B2 | 9/2006 | Pan et al. |
| 7,115,971 B2 | 10/2006 | Stumbo et al. |
| 7,129,554 B2 | 10/2006 | Lieber et al. |
| 7,132,188 B2 | 11/2006 | Masel et al. |
| 7,135,728 B2 | 11/2006 | Duan et al. |
| 7,179,561 B2 | 2/2007 | Niu et al. |
| 7,189,472 B2 | 3/2007 | Suenaga et al. |
| 7,285,422 B1 | 10/2007 | Little et al. |
| 7,301,199 B2 | 11/2007 | Lieber et al. |
| 7,402,829 B2 | 7/2008 | Green |
| 7,541,114 B2 | 6/2009 | Ohzuku et al. |
| 7,553,371 B2 | 6/2009 | Dubrow et al. |
| 7,767,346 B2 | 8/2010 | Kim et al. |
| 7,816,031 B2 | 10/2010 | Cui et al. |
| 7,846,584 B2 | 12/2010 | Choi et al. |
| 7,977,007 B2 | 7/2011 | Niu et al. |
| 7,977,013 B2 | 7/2011 | Niu et al. |
| 8,278,011 B2 | 10/2012 | Zhu et al. |
| 8,357,475 B2 | 1/2013 | Niu et al. |
| 8,440,369 B2 | 5/2013 | Niu et al. |
| 8,597,831 B2 | 12/2013 | Green et al. |
| 8,877,374 B2 | 11/2014 | Cui et al. |
| 8,940,437 B2 | 1/2015 | Green et al. |
| RE45,703 E | 9/2015 | Zhu et al. |
| 10,490,817 B2 | 11/2019 | Zhu et al. |
| 11,233,240 B2 | 1/2022 | Zhu et al. |
| 11,600,821 B2 | 3/2023 | Zhu et al. |
| 2001/0023986 A1 | 9/2001 | Mancevski |
| 2001/0051367 A1 | 12/2001 | Kiang |
| 2002/0014667 A1 | 2/2002 | Shin et al. |

(56) References Cited

U.S. PATENT DOCUMENTS

| | | |
|---|---|---|
| 2002/0090542 A1 | 7/2002 | Mosdale et al. |
| 2002/0117659 A1 | 8/2002 | Lieber et al. |
| 2002/0125192 A1 | 9/2002 | Lopez et al. |
| 2002/0127495 A1 | 9/2002 | Scherer |
| 2002/0130311 A1 | 9/2002 | Lieber et al. |
| 2002/0130353 A1 | 9/2002 | Lieber et al. |
| 2002/0142202 A1 | 10/2002 | Li et al. |
| 2002/0158342 A1 | 10/2002 | Tuominen et al. |
| 2002/0163079 A1 | 11/2002 | Awano |
| 2002/0172820 A1 | 11/2002 | Majumdar et al. |
| 2002/0175408 A1 | 11/2002 | Majumdar et al. |
| 2002/0179434 A1 | 12/2002 | Dai et al. |
| 2003/0012723 A1 | 1/2003 | Clarke |
| 2003/0037675 A1 | 2/2003 | Gillingham et al. |
| 2003/0042562 A1 | 3/2003 | Giebeler et al. |
| 2003/0044608 A1 | 3/2003 | Yoshizawa et al. |
| 2003/0044777 A1 | 3/2003 | Beattie |
| 2003/0071246 A1 | 4/2003 | Grigorov |
| 2003/0073573 A1 | 4/2003 | Baker et al. |
| 2003/0089899 A1 | 5/2003 | Lieber et al. |
| 2003/0091891 A1 | 5/2003 | Yoshida et al. |
| 2003/0184357 A1 | 10/2003 | Dijon et al. |
| 2003/0185741 A1 | 10/2003 | Matyjaszewski et al. |
| 2003/0186522 A1 | 10/2003 | Duan et al. |
| 2003/0189202 A1 | 10/2003 | Li et al. |
| 2003/0195611 A1 | 10/2003 | Greenhalgh et al. |
| 2003/0200521 A1 | 10/2003 | DeHon et al. |
| 2003/0222019 A1 | 12/2003 | Fulton et al. |
| 2003/0232721 A1 | 12/2003 | Zhou et al. |
| 2004/0005258 A1 | 1/2004 | Fonash et al. |
| 2004/0012118 A1 | 1/2004 | Perez et al. |
| 2004/0018416 A1 | 1/2004 | Choi et al. |
| 2004/0026684 A1 | 2/2004 | Empedocles |
| 2004/0031975 A1 | 2/2004 | Kern et al. |
| 2004/0036126 A1 | 2/2004 | Chau et al. |
| 2004/0036128 A1 | 2/2004 | Zhang et al. |
| 2004/0061422 A1 | 4/2004 | Avouris et al. |
| 2004/0071870 A1 | 4/2004 | Knowles et al. |
| 2004/0095658 A1 | 5/2004 | Buretea et al. |
| 2004/0112964 A1 | 6/2004 | Empedocles et al. |
| 2004/0118448 A1 | 6/2004 | Scher et al. |
| 2004/0118698 A1 | 6/2004 | Lu et al. |
| 2004/0121681 A1 | 6/2004 | Lindsay et al. |
| 2004/0126659 A1 | 7/2004 | Graetz et al. |
| 2004/0135951 A1 | 7/2004 | Stumbo et al. |
| 2004/0146560 A1 | 7/2004 | Whiteford et al. |
| 2004/0167014 A1 | 8/2004 | Yan et al. |
| 2004/0173378 A1 | 9/2004 | Zhou et al. |
| 2004/0202599 A1 | 10/2004 | Xu et al. |
| 2004/0202703 A1 | 10/2004 | Meyer-Ingold et al. |
| 2004/0206448 A1 | 10/2004 | Dubrow |
| 2004/0224217 A1 | 11/2004 | Toops |
| 2004/0234841 A1 | 11/2004 | Yoshitake et al. |
| 2004/0234859 A1 | 11/2004 | Lee et al. |
| 2005/0026526 A1 | 2/2005 | Verdegan et al. |
| 2005/0031780 A1 | 2/2005 | Matsui |
| 2005/0038498 A1 | 2/2005 | Dubrow et al. |
| 2005/0053826 A1 | 3/2005 | Wang et al. |
| 2005/0064185 A1 | 3/2005 | Buretea et al. |
| 2005/0064618 A1 | 3/2005 | Brown et al. |
| 2005/0066883 A1 | 3/2005 | Dubrow et al. |
| 2005/0074672 A1 | 4/2005 | Matsubara et al. |
| 2005/0079659 A1 | 4/2005 | Duan et al. |
| 2005/0112451 A1 | 5/2005 | Lee et al. |
| 2005/0181195 A1 | 8/2005 | Dubrow |
| 2005/0181209 A1 | 8/2005 | Karandikar |
| 2005/0187605 A1 | 8/2005 | Greenhalgh et al. |
| 2005/0214644 A1 | 9/2005 | Aramata et al. |
| 2005/0221072 A1 | 10/2005 | Dubrow et al. |
| 2005/0233213 A1 | 10/2005 | Lee et al. |
| 2005/0238810 A1 | 10/2005 | Scaringe et al. |
| 2005/0279274 A1 | 12/2005 | Niu et al. |
| 2005/0287418 A1 | 12/2005 | Noh et al. |
| 2006/0003212 A1 | 1/2006 | Kim et al. |
| 2006/0008942 A1 | 1/2006 | Romano et al. |
| 2006/0009003 A1 | 1/2006 | Romano et al. |
| 2006/0051670 A1 | 3/2006 | Aramata et al. |
| 2006/0066217 A1 | 3/2006 | Son |
| 2006/0093914 A1 | 5/2006 | Tanaka et al. |
| 2006/0097691 A1 | 5/2006 | Green |
| 2006/0115711 A1 | 6/2006 | Kim et al. |
| 2006/0116284 A1 | 6/2006 | Pak et al. |
| 2006/0159916 A1 | 7/2006 | Dubrow et al. |
| 2006/0188774 A1 | 8/2006 | Niu et al. |
| 2007/0026293 A1 | 2/2007 | Kim et al. |
| 2007/0084797 A1 | 4/2007 | Cooper et al. |
| 2007/0087268 A1 | 4/2007 | Kim et al. |
| 2007/0099084 A1 | 5/2007 | Huang et al. |
| 2007/0111102 A1 | 5/2007 | Inoue et al. |
| 2007/0122712 A1 | 5/2007 | Kang et al. |
| 2007/0190880 A1 | 8/2007 | Dubrow et al. |
| 2007/0212538 A1 | 9/2007 | Niu |
| 2007/0264574 A1 | 11/2007 | Kim et al. |
| 2007/0272297 A1 | 11/2007 | Krivoshlykov et al. |
| 2008/0224123 A1 | 9/2008 | Martin et al. |
| 2008/0241647 A1 | 10/2008 | Fukui et al. |
| 2008/0261112 A1 | 10/2008 | Nagata et al. |
| 2008/0277746 A1 | 11/2008 | Niu et al. |
| 2008/0280169 A1 | 11/2008 | Niu et al. |
| 2008/0311464 A1* | 12/2008 | Krause ................ H01M 4/386 429/50 |
| 2009/0017363 A1 | 1/2009 | Niu et al. |
| 2009/0042008 A1 | 2/2009 | Kimishima et al. |
| 2009/0068553 A1 | 3/2009 | Firsich |
| 2009/0117466 A1 | 5/2009 | Zhamu et al. |
| 2009/0162750 A1 | 6/2009 | Kawakami et al. |
| 2009/0176159 A1 | 7/2009 | Zhamu et al. |
| 2009/0186267 A1 | 7/2009 | Tiegs |
| 2009/0269511 A1 | 10/2009 | Zhamu et al. |
| 2009/0269669 A1* | 10/2009 | Kim ................ H01M 10/0525 427/113 |
| 2009/0305129 A1 | 12/2009 | Fukui et al. |
| 2009/0317719 A1 | 12/2009 | Luhrs et al. |
| 2010/0081057 A1 | 4/2010 | Liu et al. |
| 2010/0092868 A1 | 4/2010 | Kim et al. |
| 2010/0096265 A1 | 4/2010 | Colbert et al. |
| 2010/0120179 A1 | 5/2010 | Zhamu et al. |
| 2010/0136432 A1 | 6/2010 | Kim |
| 2010/0173070 A1 | 7/2010 | Niu |
| 2010/0285358 A1 | 11/2010 | Cui et al. |
| 2010/0285359 A1* | 11/2010 | Hwang ................ H01M 4/133 429/219 |
| 2010/0297502 A1 | 11/2010 | Zhu et al. |
| 2010/0301276 A1 | 12/2010 | Lee et al. |
| 2011/0024169 A1 | 2/2011 | Buchine et al. |
| 2011/0039690 A1 | 2/2011 | Niu |
| 2011/0117432 A1 | 5/2011 | Kay |
| 2012/0094178 A1* | 4/2012 | Loveridge ............ H01M 4/622 252/514 |
| 2012/0183856 A1 | 7/2012 | Cui et al. |
| 2013/0089784 A1 | 4/2013 | Cho et al. |
| 2015/0140333 A1 | 5/2015 | Niu |
| 2020/0052297 A1 | 2/2020 | Zhu et al. |
| 2021/0005892 A1 | 1/2021 | Zhu et al. |
| 2021/0210759 A1 | 7/2021 | Zhu et al. |

FOREIGN PATENT DOCUMENTS

| | | |
|---|---|---|
| CN | 101106192 A | 1/2008 |
| CN | 101350404 A | 1/2009 |
| CN | 101442124 B | 9/2011 |
| CN | 102428763 A | 4/2012 |
| EP | 1553052 A2 | 7/2005 |
| EP | 2204868 B1 | 11/2011 |
| EP | 2432058 A1 | 3/2012 |
| EP | 2433475 A1 | 3/2012 |
| EP | 3859830 A1 | 8/2021 |
| EP | 4068914 A2 | 10/2022 |
| JP | S59-127372 A | 7/1984 |
| JP | S63-286327 | 11/1988 |
| JP | S64-014873 | 1/1989 |
| JP | 1994-203840 | 7/1994 |
| JP | 1996-017440 | 1/1996 |

(56) References Cited

FOREIGN PATENT DOCUMENTS

| | | |
|---|---|---|
| JP | 2000-353528 | 12/2000 |
| JP | 2001-288626 A | 10/2001 |
| JP | 2003-239171 A | 8/2003 |
| JP | 2003-346766 A | 9/2003 |
| JP | 2003-263986 A | 12/2003 |
| JP | 2004-214182 A | 7/2004 |
| JP | 2004-281317 A | 10/2004 |
| JP | 2005-013795 | 1/2005 |
| JP | 2005-166414 A | 6/2005 |
| JP | 2005-259697 A | 9/2005 |
| JP | 2005-310759 A | 11/2005 |
| JP | 2006-049266 A | 2/2006 |
| JP | 2006-131499 | 5/2006 |
| JP | 2007-501525 A | 1/2007 |
| JP | 2007-115687 A | 5/2007 |
| JP | 2007-125687 A | 6/2007 |
| JP | 2007-165079 A | 6/2007 |
| JP | 2007-305569 | 11/2007 |
| JP | 2008-186732 A | 8/2008 |
| JP | 2012-526364 A | 10/2012 |
| JP | 2012-527735 A | 11/2012 |
| JP | 5882200 B2 | 3/2016 |
| JP | 6717607 B2 | 6/2020 |
| JP | 6732810 B2 | 7/2020 |
| KR | 10-2007-0058484 | 6/2007 |
| KR | 10-2008-0070769 | 7/2008 |
| KR | 10-2012-0027369 A | 3/2012 |
| KR | 10-1935416 | 12/2018 |
| KR | 10-2019-0002755 A | 1/2019 |
| KR | 10-2067922 | 1/2020 |
| WO | WO-1999033129 A1 | 7/1999 |
| WO | WO-1999040812 A1 | 8/1999 |
| WO | WO-2001008781 A2 | 2/2001 |
| WO | WO-2001096847 A1 | 12/2001 |
| WO | WO-2001003208 A9 | 2/2002 |
| WO | WO-2002048701 A2 | 6/2002 |
| WO | WO-2002080280 A1 | 10/2002 |
| WO | WO-2002017362 | 11/2002 |
| WO | WO-2003085701 A2 | 10/2003 |
| WO | WO-2004042851 A2 | 5/2004 |
| WO | WO-2004099068 A2 | 11/2004 |
| WO | WO-2005023923 A2 | 3/2005 |
| WO | WO-2005075048 A1 | 8/2005 |
| WO | WO-2006035426 | 4/2006 |
| WO | WO-2006073427 A2 | 7/2006 |
| WO | WO-2007061945 A2 | 5/2007 |
| WO | WO-2007083155 A1 | 7/2007 |
| WO | WO-2007114168 A1 | 10/2007 |
| WO | WO-2007136164 A1 | 11/2007 |
| WO | WO-2008029888 A1 | 3/2008 |
| WO | WO-2008139157 A1 | 11/2008 |
| WO | WO-2009009206 A1 | 1/2009 |
| WO | WO-2009010757 A1 | 1/2009 |
| WO | WO-2009010758 A1 | 1/2009 |
| WO | WO-2009010759 A1 | 1/2009 |
| WO | WO-2009031715 A1 | 3/2009 |
| WO | WO-2010038609 A1 | 4/2010 |
| WO | WO-2010091116 A2 | 8/2010 |
| WO | WO-2010135446 A1 | 11/2010 |
| WO | WO-2011059766 A1 | 5/2011 |

OTHER PUBLICATIONS

Machine translation (by ProQuest) for Huang et al. CN 1895993 A.
International Search Report and Written Opinion in International Application No. PCTUS2010035435 mailed Sep. 7, 2010.
International Preliminary Report on Patentability in International Application No. PCTUS2010035435 dated Nov. 22, 2011 with Written Opinion dated Sep. 7, 2010.
European Patent Office (EPO) Extended European Search Report for Application No. EP 21161119.9 dated Jul. 5, 2021.
European Patent Office (EPO) Communication pursuant to Article 94(3) EPC for Application No. EP 21161119.9 dated Oct. 20, 2021.
European Patent Office (EPO) Supplemental Search Report for Application No. EP 10778339.1 dated Mar. 19, 2014.
European Patent Office (EPO) Examination Report for Application No. EP 10778339.1 dated Dec. 19, 2017.
European Patent Office (EPO) Communication Rule 114(2) for Application No. EP 10778339.1 dated Oct. 8, 2018.
European Patent Office (EPO) Communication pursuant to Article 94(3) EPC for Application No. EP 10778339.1 dated Nov. 27, 2020.
Extended European Search Report for Application No. EP 22160623.9 dated Sep. 9, 2022.
Japanese Office Action dated Nov. 11, 2014 for corresponding JP application 2012-511997.
Japanese Office Action dated Oct. 8, 2013 for corresponding JP application 2012-511997.
Japanese Office Action dated Dec. 26, 2016 for corresponding JP application 2016-018713.
Japanese Office Action dated Oct. 2, 2017 for corresponding JP application 2016-018713.
Japanese Office Action dated Sep. 17, 2019 for corresponding JP application 2016-018713.
Japanese Office Action dated Jan. 4, 2019 for corresponding JP application 2016-018713.
Japanese Office Action dated Nov. 26, 2018 for corresponding JP application 2018-17171.
Japanese Office Action dated Oct. 28, 2019 for corresponding JP application 2018-17171.
Japanese Notice of Allowance dated Jun. 8, 2020 for corresponding JP application 2018-17171. (No. English translation.).
Japanese Office Action dated Aug. 2, 2021 for corresponding JP application 2020-117769.
Japanese Office Action dated Dec. 20, 2021 for corresponding JP application 2020-117769.
Korean Office Action dated Jun. 13, 2017 for corresponding KR application 2011-7030289.
Korean Notice of Grounds of Rejection dated Apr. 26, 2018 for corresponding KR application 2011-7030289.
Korean Decision for Grant of Patent dated Sep. 28, 2018 for corresponding KR application 2011-7030289.
Korean Notice of Grounds of Rejection dated Mar. 20, 2019 for corresponding KR application 2018-7038045.
Office Action in U.S. Appl. No. 12/783,243, mailed Jan. 13, 2014.
Office Action in U.S. Appl. No. 12/783,243, mailed Jul. 1, 2014.
Office Action in U.S. Appl. No. 12/783,243, mailed Nov. 17, 2014.
Office Action in U.S. Appl. No. 12/783,243, mailed Apr. 28, 2015.
Office Action in U.S. Appl. No. 12/783,243, mailed Apr. 13, 2016.
Office Action in U.S. Appl. No. 12/783,243, mailed Mar. 14, 2017.
Office Action in U.S. Appl. No. 12/783,243, mailed May 11, 2018.
Office Action in U.S. Appl. No. 12/783,243, mailed Feb. 21, 2019.
Notice of Allowance in U.S. Appl. No. 12/783,243, mailed Oct. 3, 2019.
Office Action in U.S. Appl. No. 16/599,795, mailed Aug. 6, 2021.
Notice of Allowance in U.S. Appl. No. 16/599,795, mailed Sep. 15, 2021.
Office Action in U.S. Appl. No. 17/024,441, mailed Oct. 24, 2022.
Office Action in U.S. Appl. No. 17/192,204, mailed Oct. 26, 2022.
Office Action in U.S. Appl. No. 17/192,204, mailed Jul. 18, 2023.
Office Action in U.S. Appl. No. 17/192,204, mailed May 6, 2024.
Notice of Allowance in U.S. Appl. No. 17/024,441, mailed Nov. 21, 2022.
Notice of Allowance in U.S. Appl. No. 17/192,204, mailed Dec. 11, 2024.
"The Chemical Bond" University of Wisconsin, Dept. of Chemistry, n.d. Web Apr. 27, 2015.
Bachtold, A. et al., "Logic Circuits with Carbon Nanotube Transistors" Science (2001) 294, pp. 1317-1320.
Bjork, M.T. et al. "One-dimensional Steeplechase for Electron Realized" Nano Lett (2002) 2, pp. 86-90.
Cao, Y. et al. "Growth and properties of semiconductor core/shell nanocrystals with InAs cores" J. Am. Chem. Soc. (2000) 122, pp. 9692-9702.

(56) References Cited

OTHER PUBLICATIONS

Chan, C. K., et al., "High-performance lithium battery anodes using silicon nanowires", nature nanotechnology, vol. 3, Jan. 2008, pp. 31-35; 2008 Nature Publishing Group, Published online: Dec. 16, 2007.
Chen, H. et al. "Silicon Nanowires With and Without Carbon Coating as Anode Materials for Lithium-Ion Batteries," J Solid State Electrochem (Jan. 28, 2010) 14, pp. 1829-1834.
Chen, J. et al., "Observation of a Large On-Off Ratio and Negative Differential Resistance in an Electronic Molecular Switch" Science (1999) 286, pp. 1550-1552.
Choi, W.C. et al., Bimetallic Pt-Ru nanowire network for anode material in a direct-methanol fuel cell? J. Power Sources (2003) 124(2), pp. 420-425.
Chung, S-W. et al., "Silicon Nanowire Devices" App. Phys. Letts. (2000) 76(15), pp. 2068-2070.
Collier, C. P. et al., "Electronically Configurable Molecular-Based Logic Gates" Science (1999) 285, pp. 391-394.
Cui, Y. et al. "Crystalline-Amorphous Core-Shell Silicon Nanowires for high Capacity and High Current Battery Electrodes" Nano Lett (2009) 9(1), pp. 491-495.
Cui, Y. et al. "Diameter-controlled synthesis of single-crystal silicon nanowires " Appl. Phys. Lett (2001) 78(15), pp. 2214-2216.
Cui, Y. et al. "Doping and electrical transport in silicon nanowires" J. Phys. Chem. B (2000) 104, pp. 5213-5216.
Cui, Y. et al., "Functional Nanoscale electronic devices assembled using silicon nanowire building blocks" Science (2001) 291, pp. 851-853.
Dabbousi, B.O. et al., "(CdSe)ZnS core-shell quantum dots: Synthesis and characterization of a size series of highly luminescent nanocrystallites" J. Phys. Chem. B (1997) 101, pp. 9463-9475.
Derycke, V. et al., "Carbon Nanotube Inter-and Intramolecular Logic Gates" Nano Letters (2001) 1(9), pp. 453-456.
Duan, X. et al. "General synthesis of compound semiconductor nanowires" Adv. Mater. (2000) 12, pp. 298-302.
Duan, X. et al. "High-performance thin-film transistors using semiconductor nanowires and nanoribbons" Nature (2003) 425, pp. 274-278.
Givargizov, E.I. "Fundamental Aspects of VLS Growth" J. Cryst. Growth (1975) 31, pp. 20-30.
Greene, L.E. et al., "Low-temperature wafer-scale production of ZnO Nanowire Arrays" Angew Chem. Int. Ed. (2003) 42, pp. 3031-3034.
Gudiksen, M.S. et al., "Diameter-selective synthesis of semiconductor nanowires" J. Am. Chem. Soc. (2000) 122, pp. 8801-8802.
Gudiksen, M.S. et al., "Growth of nanowire superlattice structures of nanoscale photonics and electronics" Nature (2002) 415-617-620.
Gudiksen, M.S. et al., "Synthetic control of the diameter and length of single crystal semiconductor nanowires" J. Phys. Chem. B (2001) 105, pp. 4062-4064.
Haraguchi, K. et al., "Polarization Dependence of Ligh Emitted from GaAs p-n junctions in quantum wire crystals" J. Appl. Phys. (1994) 75(8), pp. 4220-4225.
Haraguchi, K. et al., "Self Organized Fabrication of Planar GaAs Nanowhisker Arrays" Appl. Phys. Lett. (1996) 69(3), pp. 386-387.
Hiruma, K. et al., "GaAs Free Standing Quantum Sized Wires" J. Appl. Phys. (1993) 74(5), pp. 3162-3171.
Holzapfel, M. et al. "Chemical Vapor Deposited Silicon/Graphite Compound Material as Negative Electrode for Lithium-Ion Batteries", Electrochemical and Solid-State Letters, Aug. 12, 2005; vol. 8, Issue 10, pp. A516-A520.
Holzapfel, M., et al., "A new type of nano-sized silicon/carbon composite electrode for reversible lithium insertion", Chem. Commun., Jan. 26, 2005; pp. 1566-1568; The Royal Society of Chemistry 2005.
Huang, R. et al. "Carbon-coated Silicon Nanowire Array Films for High-Performance Lithium-Ion Battery Anodes" Appl Phys Lett (Oct. 1, 2009) 95, pp. 33119-1 to 133119-3.

Huang, Y. et al., "Directed Assembly of One-Dimensional Nanostructures into Functional networks" Science (2001) 291, pp. 630-633.
Huang, Y. et al., "Logic Gates and Computation from Assembled Nanowire Building Blocks" Science (2001) 294, pp. 1313-1317.
Jun, Y-W, et al. "Controlled synthesis of multi-armed CdS nanorod architectures using monosurfactant system" J. Am. Chem. Soc. (2001) 123, pp. 5150-5151.
Kim et al. "Superior Lithium Electroactive Mesoporous Si @ Carbon Core-Shell Nanowires for Lithium Battery Anode Material" Nano Lett (2008) 8(11):3688-3691.
Kim, E-H et al. "Synthesis of Amorphous Si Nanowires from Solid Si Sources Using Microwave Irradiation" Thin Solid Films (May 3, 2009) 517, pp. 6629-6634.
Kolasinski, K.W., "Catalytic growth of nanowires: Vapor-liquid-solid, vapor-solid-solid, solution-liquid-solid and solid-liquid-solid growth", Current Opinion in Solid State and Materials Science, vol. 10, Issues 3-4, Jun.-Aug. 2006, pp. 182-191; Elsevier.
Kong, J. et al., "Chemical vapor deposition of methane for single-walled carbon nanotubes" Chem. Phys. Lett. (1998) 292, pp. 567-574.
Kong, J. et al., "Nanotube molecular wires as chemical sensors" Science (2000) vol. 287, pp. 622-625.
Kong, J. et al., "Synthesis of individual single-walled carbon nanotubes on patterned silicon wafers" Nature (1998) 395, pp. 878-881.
Li, H., et al., "The crystal structural evolution of nano-Si anode caused by lithium insertion and extraction at room temperature", Solid State Ionics, vol. 135, Issues 1-4, Nov. 2000, pp. 181-191; NH Elsevier.
Li, W-N et al. "Synthesis and Characterization of Silicon Nanowires on Mesophase Carbon Microbead Substrates by Chemical Vapor Deposition" J. Phys. Chem. B (2005) 109, pp. 3291-3297.
Liu, C. et al. "Sol-Gel Synthesis of Free-Standing Ferroelectric Lead Zirconate Titanate Nanoparticles" J. Am. Chem. Soc. (2001) 123, pp. 4344-4345.
Liu, Y., et al. "Novel negative electrode materials with high capacity density for further rechargeable lithium ion batteries", Res. Rep. Fac. Eng. Mie Univ., vol. 29, Oct. 20, 2004; pp. 65-72.
Manalis, S.F. et al., "Microvolume field-effect pH sensor for the scanning probe microscope" Applied Phys. Lett. (2000) 76, pp. 1072-1074.
Manna, L. et al. "Epitaxial growth and photochemical annealing of graded CdS/ZnS shells on colloidal CdSe nanorods" J. Am. Chem. Soc. (2002) 124, pp. 7136-7145.
Manna, L. et al. "Synthesis of soluble and processable rod-, arrow-, teardrop-, and tetrapod-shaped CdSe nanocrystals" J. Am. Chem. Soc. (2000) 122, pp. 12700-12706.
Martin, C.R., "Nanomaterials: A membrane-based synthetic approach" Science (1994) 266, pp. 1961-1966.
Material Safety Data Sheet N-Methyl-2-pyrrolidinone MSDS; Science Lab.com, Chemical & Laboratory Equipment; Oct. 10, 2005, 6 pages, USA.
Morales, A.M et al., A laser ablation method for the synthesis of crystalline semiconductor nanowires? Science (1998) 279, pp. 208-211.
Peng, X. et al. "Epitaxial growth of highly luminescent CdSe/CdS core/shell nanocrystals with photostability and electronic accessibility" J. Am. Chem. Soc. (1997) 119, pp. 7019-7029.
Peng, X. et al. "Shape control of CdSe nanocrystals" Nature (2000) 404, pp. 59-61.
Puntes, V.F. et al., "Colloidal nanocrystal shape and size control: The case of cobalt" Science (2001) 291, pp. 2115-2117.
Rabin, O. et al., "Formation of thick porous anodic alumina films and nanowire arrays on silicon wafers and glass" Adv. Func. Mater. (2003) 13(8), pp. 631-638.
Sappenfield, M. "Spider-Man's sticky power in human reach" Christian Science Monitor (2003).
Schon J.H. et al., "Field-effect modulation of the conductance of single molecules" Science (2001) 294, pp. 2138-2140.
Schon, J.H. et al., "Self-assembled monolayer organic field-effect transistors" Nature (2001) 413, pp. 713-716.

(56) References Cited

OTHER PUBLICATIONS

Service, R.F., "Assembling nanocircuits from the bottom up" Science (2001) 293, pp. 782-785.
Szczech J.R. et al., "Nanostructured Silicon for High Capacity Lithium Battery Anodes" Table ESI 1-7; Department of Chemistry, University of Wisconsin-Madison, 1101 University Avenue, Madison, Wisconsin, 53706; 2011, 12 pp., USA.
Szczech J.R. et al., "Nanostructured Silicon for High Capacity Lithium Battery Anodes" Energy Environ. Sci., 2011, 4, pp. 56-72.
Tang, T. et al., "Synthesis of InN Nanowires Using a Two-Zone Chemical Vapor Deposition Approach" IEEE (Aug. 14, 2003), pp. 205-207.
Tans, S.J. et al., "Room-temperature transistor based on a single carbon nanotube" Nature (1998) 393, pp. 49-52.
Thess, A. et al., "Crystalline ropes of metallic carbon nanotubes" Science (1996) 273, pp. 483-486.
Tseng, G.Y. et al., "Toward nanocomputers" Science (2001) 294, pp. 1293-1294.
Urban, J.J. et al. "Synthesis of single-crystalline perovskite nanowires composed of barium titanate and strontium titanate" J. Am. Chem. Soc. (2002) 124(7), pp. 1186-1187.
Yang, J., et al., "Si/C Composites for High Capacity Lithium Storage Materials", Electrochemical and Solid-State Letters, vol. 6, Issue 8, Aug. 1, 2003; pp. A154-A156.
Zhang, H.P. et al. "Core-shell Structure Electrode Materials for Lithium Ion Batteries" J Solid State Electrochem (Mar. 6, 2009) 13: pp. 1521-1527.
Zuo, P., et al., Electrochemical stability of silicon/carbon composite anode for lithium ion batteries, Electrochimica Acta, vol. 52, Issue 15, Apr. 20, 2007; pp. 4878-4883.

* cited by examiner

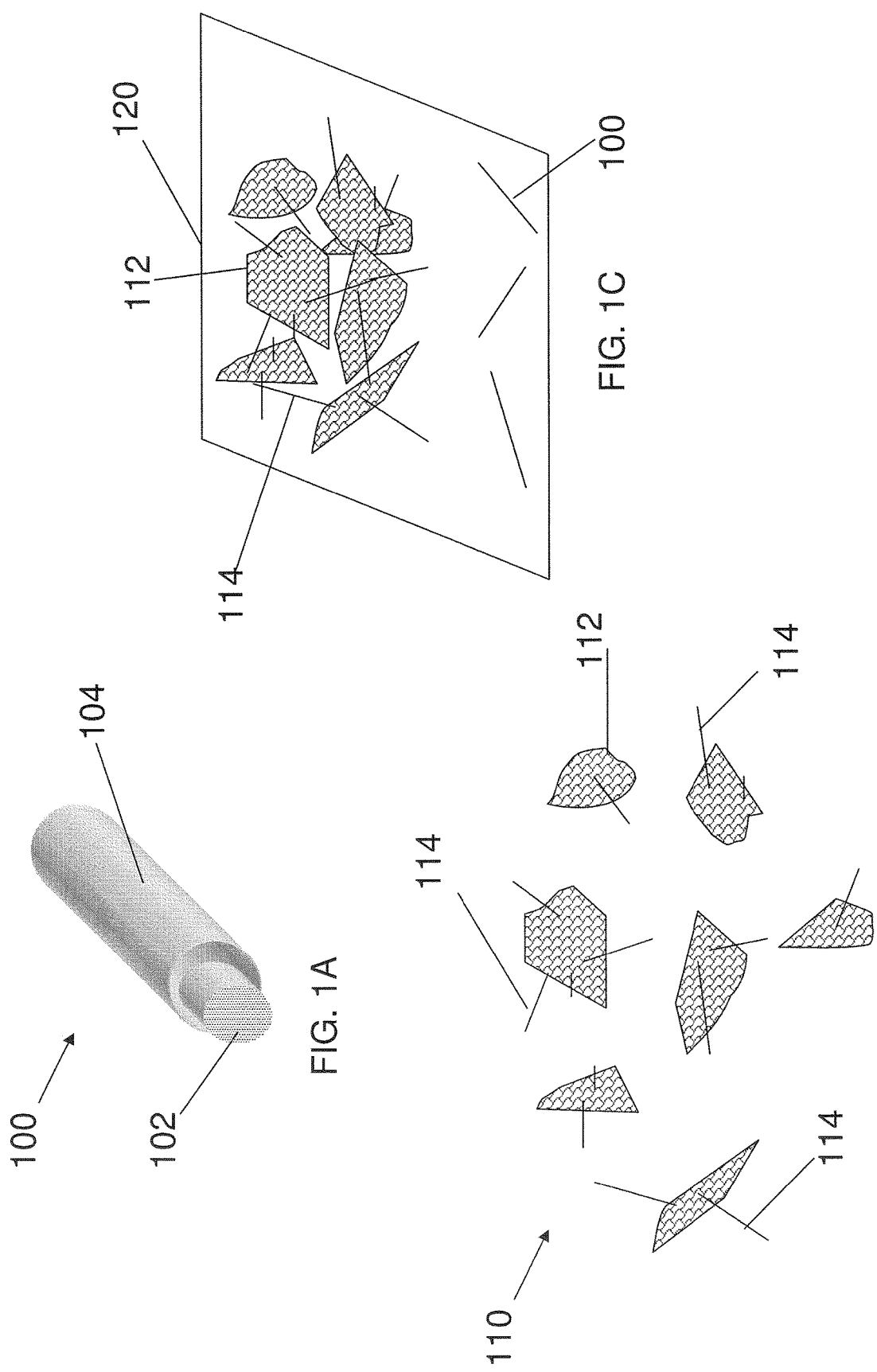

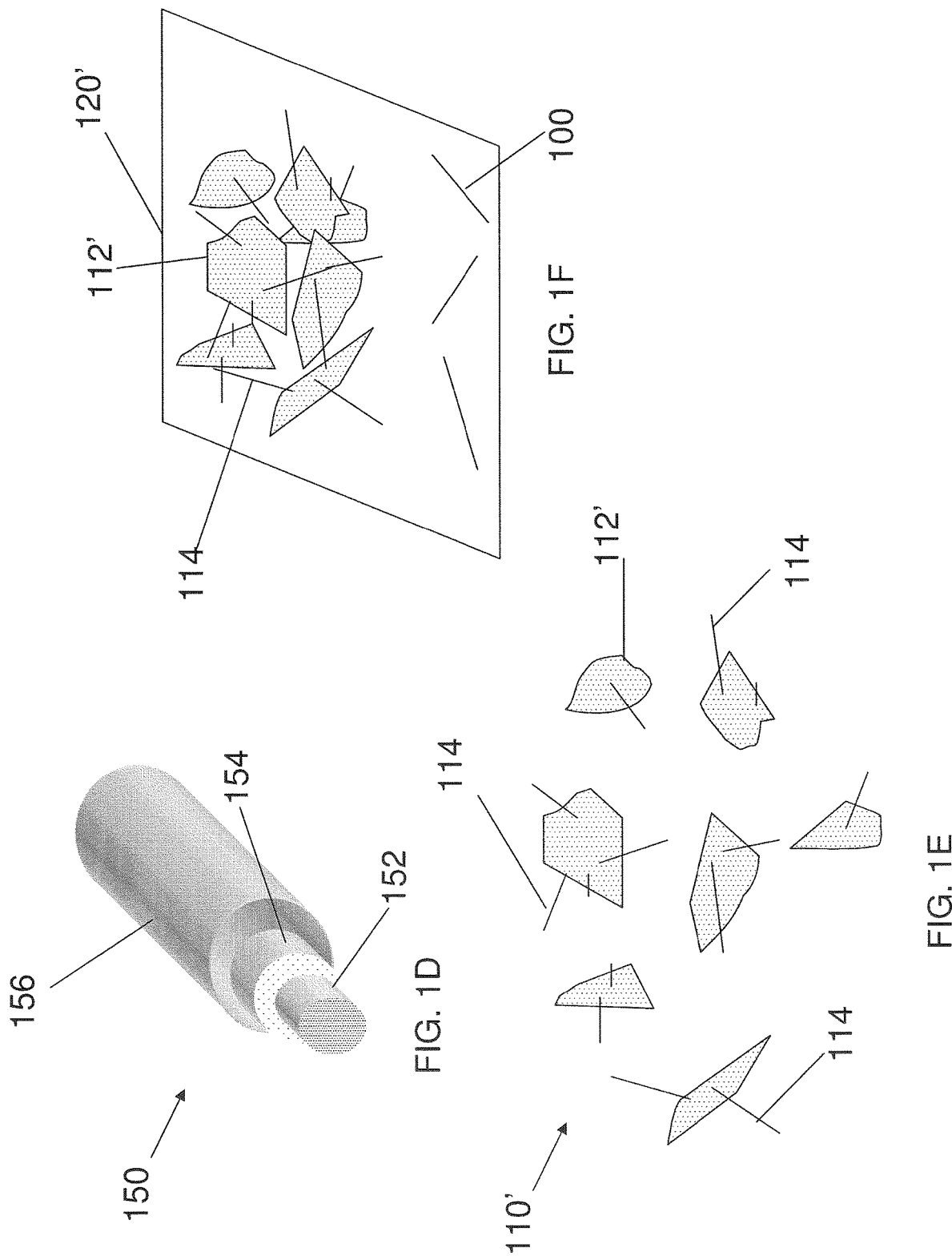

Process 1700

1702  Aluminum foil embossing
1704  Cleaning
1706  Substrate Surface Preparation
1708  Gold colliding
1710  Drying
1712  Wire growth
1714  Wire harvesting
1716  Filtration
1718  Drying
1720  Ball milling

NANOSTRUCTURED MATERIALS FOR BATTERY APPLICATIONS

CROSS REFERENCE TO RELATED APPLICATIONS

This application is a continuation of U.S. patent application Ser. No. 17/192,204, filed on Mar. 4, 2021, which is a continuation of U.S. patent application Ser. No. 17/024,441, filed on Sep. 17, 2020, now U.S. Pat. No. 11,600,821, which is a continuation of U.S. patent application Ser. No. 16/599,795, filed on Oct. 11, 2019, now U.S. Pat. No. 11,233,240, which is a continuation of U.S. patent application Ser. No. 12/783,243, filed on May 19, 2010, now U.S. Pat. No. 10,490,817, which claims the benefit of U.S. Provisional Application Nos. 61/179,663, entitled "Nanowire Enabled Battery Technology", filed May 19, 2009, 61/221,392 entitled "Nanostructured Materials For Battery Applications", filed Jun. 29, 2009, and 61/255,732 entitled "Nanostructured Materials For Battery Applications", filed Oct. 28, 2009, which are incorporated herein by reference in their entirety.

BACKGROUND OF THE INVENTION

Field of the Invention

The present invention relates to nanostructured materials (including nanowires) for use in batteries. Exemplary materials include carbon-comprising, Si-based nanostructures, nanostructured materials disposed on carbon-based substrates, and nanostructures comprising nanoscale scaffolds. The present invention also provides methods of preparing battery electrodes, and batteries, using the nanostructured materials.

Background of the Invention

Traditional batteries, including lithium (Li) ion batteries, comprise an anode, a separator material with an electrolyte medium, and a cathode. The anode electrode of most commercially available Li ion batteries is a copper foil coated with a mixture of graphite powder and a polymer blend such as polyvinylidene difluoride (PVDF). The cathode generally comprises a mixture of lithium transition metal oxides, PVDF and carbon black coated onto an aluminum foil. While graphite and $LiCoO_2$ are normally used, and have high coulombic efficiencies, there is a need for improved anode materials with superior storage capacity and thermal stability.

One material that has attracted a great deal of attention is silicon (Si), due to its high capacity. However, repeated charging/discharging cycles have been found to cause a volume change in the Si, which can ultimately cause the material to disintegrate and severely limit any potential battery life. Thus, there is a need for improved electrode materials for use in batteries, and specifically, Si-based materials.

SUMMARY OF THE INVENTION

In one embodiment the present invention provides additives for use in a battery slurry. Suitably, such additives comprise one or more carbon-comprising, Si-based nanostructures. Exemplary Si-based nanostructures include Si-based nanowires and Si-based nanoparticles. Suitably, the nanowires have a core-shell structure, and in exemplary embodiments, the core comprises Si, and the shell comprises C. The Si-based nanowires suitably have a diameter of about 20 nm to about 200 nm, and a length of about 0.1 µm to about 50 µm.

In embodiments, the additives comprise about 1 weight % to about 80 weight % (more suitably about 10 weight %) of the slurry. In exemplary embodiments, a conductive polymer, such as polyvinylidene difluoride, is disposed on the Si-based nanostructures. The present invention also provides battery slurries comprising one or more carbon-comprising, Si-based nanostructures. Exemplary characteristics of the Si-based nanostructures, including Si-based nanowires, are described herein. Suitably, the battery slurries comprise about 1 weight % to about 80 weight % (suitably about 10 weight %) of the carbon-comprising, Si-based nanostructures. In exemplary embodiments, the battery slurries further comprise a carbon-based material, such as carbon or graphite.

In another embodiment, the additives of the present invention comprise one or more nanostructures disposed on a carbon-based substrate. Exemplary nanostructures include nanowires or nanoparticles, such as nanowires having a core-shell structure. Suitably, the nanowires comprise a crystalline core (e.g., Si) and non-oxide, amorphous shell (e.g., Si or C). In exemplary embodiments, the nanowires or nanoparticles comprise Si. Suitably, the nanowires have a diameter of about 20 nm to about 200 nm, and a length of about 0.1 µm to about 50 µm.

Exemplary carbon-based substrates include a carbon-based powder, carbon black, graphite, graphene, graphene powder and graphite foil. Suitably, the carbon-based powder includes particles of about 5 microns to about 50 microns, e.g., about 20 microns. Suitably, the additives of the present invention comprise about 1 weight % to about 80 weight % (e.g., about 10 weight %) of the slurry. The additives can further comprise a conductive polymer, such as polyvinylidene difluoride, disposed on the nanostructures.

In a further embodiment, the additives of the present invention comprise one or more nanostructures comprising a nanoscale scaffold, a Si-based layer disposed on the nanoscale scaffold and a carbon-based layer disposed on the Si-based layer. Exemplary nanoscale scaffolds include nanowires, nanofibers, and nanotubes. Suitably, the nanowires have a diameter of about 20 nm to about 200 nm, and a length of about 0.1 µm to about 50 µm.

The present invention also provides a battery slurry and/or battery electrodes (e.g., anodes) comprising one or more of the carbon-comprising Si-based nanostructures, the nanostructures disposed on a carbon-based substrate, and/or the nanostructures comprising a nanoscale scaffold, as described herein. Exemplary nanostructures, including compositions and characteristics of the nanostructures are described throughout. In exemplary embodiments, the nanostructures, such as nanowires, comprise Li inserted in the nanowires. In exemplary embodiments, the electrodes comprise about 1 weight % to about 80 weight % (e.g., about 10 weight %) of the nanostructures. Suitably, the nanostructures are embedded in a Li foil.

The present invention also provides batteries having an anode comprising one or more of the nanostructures of the present invention. Suitably, the batteries are Li ion batteries. The batteries of the present invention also suitably further comprise a cathode, and an electrolyte separator positioned between the anode and the cathode. Exemplary cathode materials include, but are not limited to, $LiCoO_2$, $LiFePO_4$, $LiMnO_2$, $LiMnO_4$, $LiNiCoAlO/LiNiCOMnO^+LiMn_2O_4$, LiCoFePO$_4$ and LiNiO$_2$. Suitably, the batteries further comprise a housing encasing the anode, the electrolytic separator and the cathode.

The present invention also provides methods of preparing a battery electrode. Suitably, the methods comprise providing one or more of the nanostructures of the present invention. The nanostructures are mixed with a conductive polymer and a carbon-based material to form a slurry. The slurry is formed into the battery electrode.

The present invention also provides methods of preparing a battery. Suitably, the methods comprise providing one or more nanostructures. The nanostructures are mixed with a conductive polymer and a carbon-based material to form a slurry. The slurry is formed into a battery anode, and a separator is disposed between the anode and a cathode.

The present invention also provides methods of preparing a carbon-coated nanostructure. Suitably, the methods comprise providing a nanoscale scaffold. A carbon-comprising polymer is disposed on the nanoscale scaffold. The carbon-comprising polymer is heated to form a carbon coating on the nanoscale scaffold.

The present invention further provides methods for preparing an additive for use in a battery slurry. Suitably, the methods comprise providing a carbon-based powder. A Si-based nanostructure is disposed on the carbon-based powder.

Further embodiments, features, and advantages of the invention, as well as the structure and operation of the various embodiments of the invention are described in detail below with reference to accompanying drawings.

BRIEF DESCRIPTION OF THE FIGURES

The invention is described with reference to the accompanying drawings. In the drawings, like reference numbers indicate identical or functionally similar elements. The drawing in which an element first appears is indicated by the left-most digit in the corresponding reference number.

FIG. 1A shows a carbon-comprising, Si-based nanostructure in accordance with an embodiment of the present invention.

FIG. 1B shows nanostructures disposed on carbon-based substrates in accordance with an embodiment of the present invention.

FIG. 1C shows a battery electrode of an embodiment of the present invention.

FIG. 1D shows a carbon-coated nanostructure of an embodiment of the present invention.

FIG. 1E shows nanostructures disposed on a carbon-based powder in accordance with an embodiment of the present invention.

FIG. 1F shows a battery electrode of an embodiment of the present invention.

DETAILED DESCRIPTION OF THE INVENTION

Figure 2:
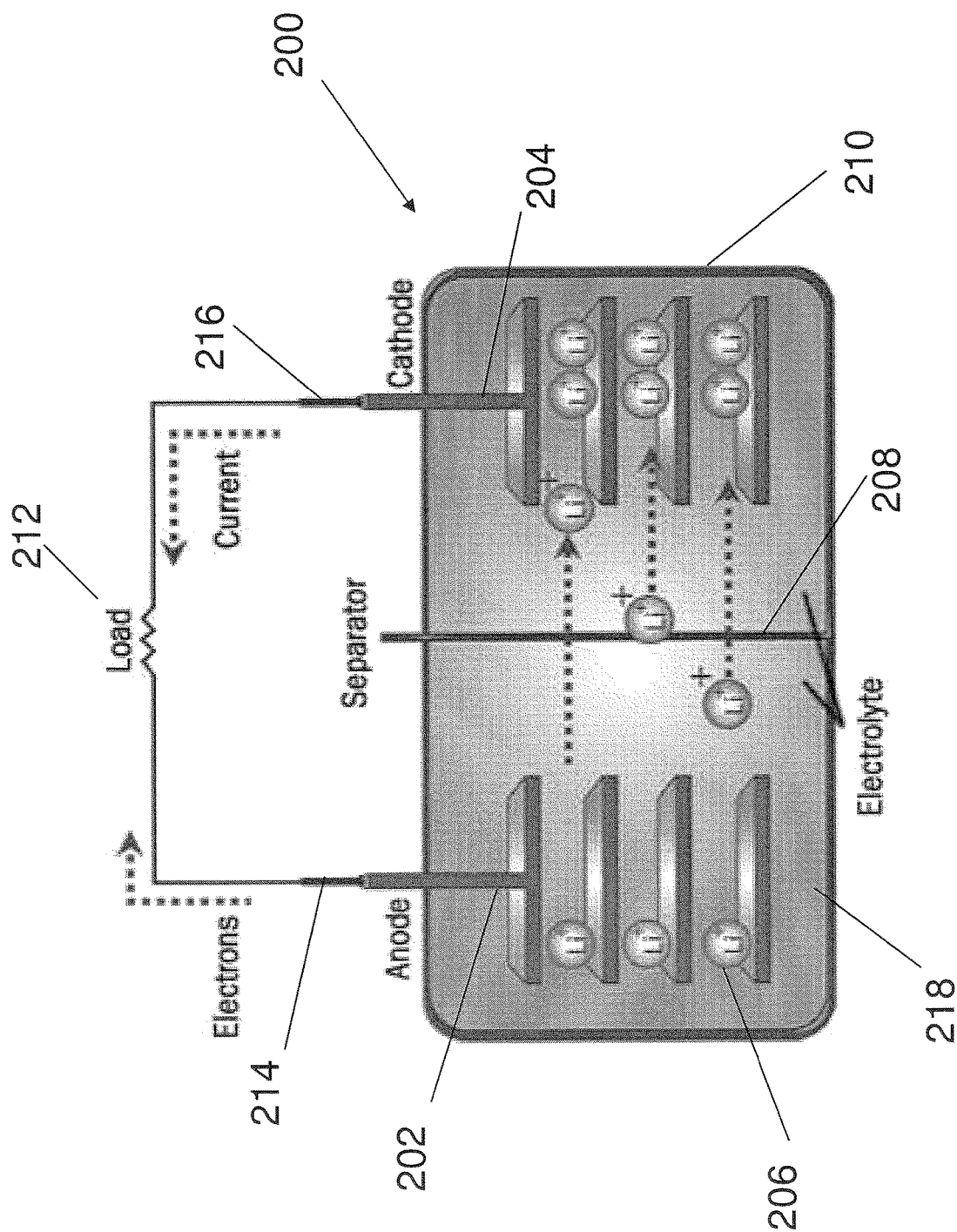
FIG. 2 shows a battery in accordance with an embodiment of the present invention.

It should be appreciated that the particular implementations shown and described herein are examples of the invention and are not intended to otherwise limit the scope of the present invention in any way. Indeed, for the sake of brevity, conventional electronics, manufacturing, semiconductor devices, and nanowire (NW), nanorod, nanotube, and nanoribbon technologies and other functional aspects of the systems (and components of the individual operating components of the systems) may not be described in detail herein. Furthermore, for purposes of brevity, the invention is frequently described herein as pertaining to nanowires, though other similar structures are also encompassed herein.

It should be appreciated that although nanowires are frequently referred to, the techniques described herein are also applicable to other nanostructures, such as nanorods, nanoparticles, nanopowder, nanotubes, nanotetrapods, nanoribbons, nanosheets and/or combinations thereof.

As used herein, an "aspect ratio" is the length of a first axis of a nanostructure divided by the average of the lengths of the second and third axes of the nanostructure, where the second and third axes are the two axes whose lengths are most nearly equal to each other. For example, the aspect ratio for a perfect rod would be the length of its long axis divided by the diameter of a cross-section perpendicular to (normal to) the long axis.

The term "heterostructure" when used with reference to nanostructures refers to nanostructures characterized by at least two different and/or distinguishable material types. Typically, one region of the nanostructure comprises a first material type, while a second region of the nanostructure comprises a second material type. In another embodiment, the nanostructure comprises a core of a first material and at least one shell of a second (or third etc.) material, where the different material types are distributed radially about the long axis of a nanowire, a long axis of an arm of a branched nanocrystal, or the center of a nanocrystal, for example. A shell need not completely cover the adjacent materials to be considered a shell or for the nanostructure to be considered a heterostructure. For example, a nanocrystal characterized by a core of one material covered with small islands of a second material is a hetero structure. In other embodiments, the different material types are distributed at different locations within the nanostructure. For example, material types can be distributed along the major (long) axis of a nanowire or along a long axis or arm of a branched nanocrystal. Different regions within a hetero structure can comprise entirely different materials, or the different regions can comprise a base material.

As used herein, a "nanostructure" is a structure having at least one region or characteristic dimension with a dimension of less than about 500 nm, e.g., less than about 200 nm, less than about 100 nm, less than about 50 nm, or even less than about 20 nm. Typically, the region or characteristic dimension will be along the smallest axis of the structure. Examples of such structures include nanowires, nanopowder, nanorods, nanofilms, nanotubes, branched nanocrystals, nanotetrapods, tripods, bipods, nanocrystals, nanodots, quantum dots, nanoparticles, branched tetrapods (e.g., inorganic dendrimers), and the like. Nanostructures can be substantially homogeneous in material properties, or in other embodiments can be heterogeneous (e.g., heterostructures). Nanostructures can be, for example, substantially crystalline, substantially monocrystalline, polycrystalline, amorphous, or combinations thereof. In one aspect, one of the three dimensions of the nanostructure has a dimension of less than about 500 nm, for example, less than about 200 nm, less than about 100 nm, less than about 50 nm, or even less than about 20 nm.

As used herein, the term "nanowire" generally refers to any elongated conductive or semiconductive material (or other material described herein) that includes at least one cross sectional dimension that is less than 500 nm, and suitably, less than 200 nm, or less than 100 nm, and has an aspect ratio (length:width) of greater than 10, preferably greater than 50, and more preferably, greater than 100, for example, up to about 1000, or more.

As used herein, a "nanoparticle" refers to a particle, crystal, sphere, or other shaped structure having at least one region or characteristic dimension with a dimension of less than about 500 nm, suitably less than about 200 nm, less than about 100 nm, less than about 50 nm, less than about 20 nm, or less than about 10 nm. Suitably, all of the dimensions of the nanoparticles utilized in the present invention are less than about 50 nm, and suitably have a size of about 1 nm to about 30 nm, or about 1 nm to about 20 nm, about 1 nm to about 10 nm, about 1 nm to about 9 nm, about 1 nm to about 8 nm, about 1 nm to about 7 nm, about 1 nm to about 6 nm, about 1 nm to about 5 nm, about 1 nm to about 4 nm, about 1 nm to about 3 nm, or about 1 nm to about 2 nm, for example, about 1 nm, about 2 nm, about 3 nm, about 4 nm, about 5 nm, about 6 nm, about 7 nm, about 8 nm, about 9 nm, or about 10 nm.

The nanowires of this invention can be substantially homogeneous in material properties, or in other embodiments can be heterogeneous (e.g. nanowire heterostructures). The nanowires can be fabricated from essentially any convenient material or materials, and can be, e.g., substantially crystalline, substantially monocrystalline, polycrystalline, amorphous, or combinations thereof. Nanowires can have a variable diameter or can have a substantially uniform diameter, that is, a diameter that shows a variance less than about 20% (e.g., less than about 10%, less than about 5%, or less than about 1%) over the region of greatest variability and over a linear dimension of at least 5 nm (e.g., at least 10 nm, at least 20 nm, or at least 50 nm). Typically the diameter is evaluated away from the ends of the nanowire (e.g., over the central 20%, 40%, 50%, or 80% of the nanowire). A nanowire can be straight or can be e.g., curved or bent, over the entire length of its long axis or a portion thereof. In other embodiments, a nanowire or a portion thereof can exhibit two- or three-dimensional quantum confinement.

Examples of such nanowires include semiconductor nanowires as described in Published International Patent Application Nos. WO 02/017362, WO 02/048701, and WO 01/003208, carbon nanotubes, and other elongated conductive or semiconductive structures of like dimensions, which are incorporated herein by reference.

As used herein, the term "nanorod" generally refers to any elongated conductive or semiconductive material (or other material described herein) similar to a nanowire, but having an aspect ratio (length:width) less than that of a nanowire. Note that two or more nanorods can be coupled together along their longitudinal axis. Alternatively, two or more nanorods can be substantially aligned along their longitudinal axis, but not coupled together, such that a small gap exists between the ends of the two or more nanorods. In this case, electrons can flow from one nanorod to another by hopping from one nanorod to another to traverse the small gap. The two or more nanorods can be substantially aligned, such that they form a path by which electrons can travel.

A wide range of types of materials for nanostructures, including nanowires, nanocrystals, nanoparticles, nanopowders, nanorods, nanotubes and nanoribbons can be used, including semiconductor material selected from, e.g., Si, Ge, Sn, Se, Te, B, C (including diamond), P, BC, BP(BP$_6$), BSi, SiC, SiGe, SiSn, GeSn, WC, SiO$_2$, TiO$_2$, BN, BAS, AlN, AlP, AlAs, AlSb, GaN, GaP, GaAs, GaSb, InN, InP, InAs, ZnO, ZnS, ZnSe, ZnTe, CdS, CdSe, CdTe, HgS, HgSe, HgTe, BES, BeSe, BeTe, MgS, MgSe, GeS, GeSc, GeTe, SnS, SnSe, SnTe, PbO, PbS, PbSe, PbTe, CuF, CuCl, CuBr, CuI, AgF, AgCl, AgBr, AgI, BeSiN$_2$, CaCN$_2$, ZnGeP$_2$, CdSnAs$_2$, ZnSnSb$_2$, CuGeP$_3$, CuSi$_2$P$_3$, (Cu, Ag) (Al, Ga, In, Tl, Fe) (S, Se, Te)$_2$, Si$_3$N$_4$, Ge$_3$N$_4$, Al$_2$O$_3$, (Al, Ga, In)$_2$ (S, Se, Te)$_3$, Al$_2$CO, and an appropriate combination of two or more such semiconductors.

Nanowires of the present invention may also comprise organic polymers, ceramics, inorganic semiconductors such as carbides and nitrides, and oxides (such as TiO$_2$ or ZnO), carbon nanotubes, biologically derived compounds, e.g., fibrillar proteins, etc. or the like. For example, in certain embodiments, inorganic nanowires are employed, such as semiconductor nanowires. Semiconductor nanowires can be comprised of a number of Group IV, Group III-V or Group II-VI semiconductors or their oxides. In one embodiment, the nanowires may include metallic conducting, semiconducting, carbide, nitride, or oxide materials such as RuO$_2$, SiC, GaN, TiO$_2$, SnO$_2$, WC$_x$, MoC$_x$, ZrC, WN$_x$, MoN$_x$ etc. As used throughout, the subscript "x," when used in chemical formulae, refers to a whole, positive integer (e.g., 1, 2, 3, 4, 5, 6, 7, 8, 9, 10, etc). It is suitable that the nanowires be made from a material that is resistant to degradation in a weak acid. Nanowires according to this invention can include, or can expressly exclude, carbon nanotubes, and, in certain embodiments, exclude "whiskers" or "nanowhiskers", particularly whiskers having a diameter greater than 100 nm, or greater than about 200 nm.

In other aspects, the semiconductor may comprise a dopant from a group consisting of: a p-type dopant from Group III of the periodic table; an n-type dopant from Group V of the periodic table; a p-type dopant selected from a group consisting of: B, Al and In; an n-type dopant selected from a group consisting of: P, As and Sb; a p-type dopant from Group II of the periodic table; a p-type dopant selected from a group consisting of: Mg, Zn, Cd and Hg; a p-type dopant from Group IV of the periodic table; a p-type dopant selected from a group consisting of: C and Si.; or an n-type dopant selected from a group consisting of: Si, Ge, Sn, S, Se and Te. Other now known or later developed dopant materials can be employed.

Additionally, the nanowires can include carbon nanotubes, or nanotubes formed of conductive or semiconductive organic polymer materials, (e.g., pentacene, and transition metal oxides).

It should be understood that the spatial descriptions (e.g., "above", "below", "up", "down", "top", "bottom", etc.) made herein are for purposes of illustration only, and that devices of the present invention can be spatially arranged in any orientation or manner.

Nanostructures have been produced in a wide variety of different ways. For example, solution based, surfactant mediated crystal growth has been described for producing spherical inorganic nanomaterials, e.g., quantum dots, as well as elongated nanomaterials, e.g., nanorods and nanotetrapods. Other methods have also been employed to produce nanostructures, including vapor phase methods. For example, silicon nanocrystals have been reportedly produced by laser pyrolysis of silane gas.

Other methods employ substrate based synthesis methods including, e.g., low temperature synthesis methods for producing, e.g., ZnO nanowires as described by Greene et al. ("Low-temperature wafer scale production of ZnO nanowire arrays," L. Greene, M. Law, J. Goldberger, F. Kim, J. Johnson, Y. Zhang, R. Saykally, P. Yang, Angew. Chem. Int. Ed. 42, 3031-3034, 2003), and higher temperature vapor-liquid-solid (VLS) methods that employ catalytic gold particles, e.g., that are deposited either as a colloid or as a thin film that forms a particle upon heating. Such VLS methods of producing nanowires are described in, for example, Published International Patent Application No. WO 02/017362, the full disclosure of which is incorporated herein by reference in its entirety for all purposes.

Nanostructures can be fabricated and their size can be controlled by any of a number of convenient methods that can be adapted to different materials. For example, synthesis of nanocrystals of various composition is described in, e.g., Peng et al. (2000) "Shape Control of CdSe Nanocrystals" Nature 404, 59-61; Puntes et al. (2001) "Colloidal nanocrystal shape and size control: The case of cobalt" Science 291, 2115-2117; U.S. Pat. No. 6,306,736 to Alivisatos et al. (Oct. 23, 2001) entitled "Process for forming shaped group III-V semiconductor nanocrystals, and product formed using process;" U.S. Pat. No. 6,225,198 to Alivisatos et al. (May 1, 2001) entitled "Process for forming shaped group II-VI semiconductor nanocrystals, and product formed using process;" U.S. Pat. No. 5,505,928 to Alivisatos et al. (Apr. 9, 1996) entitled "Preparation of III-V semiconductor nanocrystals;" U.S. Pat. No. 5,751,018 to Alivisatos et al. (May 12, 1998) entitled "Semiconductor nanocrystals covalently bound to solid inorganic surfaces using self-assembled monolayers;" U.S. Pat. No. 6,048,616 to Gallagher et al. (Apr. 11, 2000) entitled "Encapsulated quantum sized doped semiconductor particles and method of manufacturing same;" and U.S. Pat. No. 5,990,479 to Weiss et al. (Nov. 23, 1999) entitled "Organo luminescent semiconductor nanocrystal probes for biological applications and process for making and using such probes." The disclosures of each of these publications are incorporated by reference herein in their entireties.

Growth of nanowires having various aspect ratios, including nanowires with controlled diameters, is described in, e.g., Gudiksen et al. (2000) "Diameter-selective synthesis of semiconductor nanowires" J. Am. Chem. Soc. 122, 8801-8802; Cui et al. (2001) "Diameter-controlled synthesis of single-crystal silicon nanowires" Appl. Phys. Lett. 78, 2214-2216; Gudiksen et al. (2001) "Synthetic control of the diameter and length of single crystal semiconductor nanowires" J. Phys. Chem. B 105, 4062-4064; Morales et al. (1998) "A laser ablation method for the synthesis of crystalline semiconductor nanowires" Science 279, 208-211; Duan et al. (2000) "General synthesis of compound semiconductor nanowires" Adv. Mater. 12, 298-302; Cui et al. (2000) "Doping and electrical transport in silicon nanowires" J. Phys. Chem. B 104, 5213-5216; Peng et al. (2000) "Shape control of CdSe nanocrystals" Nature 404, 59-61; Puntes et al. (2001) "Colloidal nanocrystal shape and size control: The case of cobalt" Science 291, 2115-2117; U.S. Pat. No. 6,306,736 to Alivisatos et al. (Oct. 23, 2001) entitled "Process for forming shaped group III-V semiconductor nanocrystals, and product formed using process;" U.S. Pat. No. 6,225,198 to Alivisatos et al. (May 1, 2001) entitled "Process for forming shaped group II-VI semiconductor nanocrystals, and product formed using process"; U.S. Pat. No. 6,036,774 to Lieber et al. (Mar. 14, 2000) entitled "Method of producing metal oxide nanorods"; U.S. Pat. No. 5,897, 945 to Lieber et al. (Apr. 27, 1999) entitled "Metal oxide nanorods"; U.S. Pat. No. 5,997,832 to Lieber et al. (Dec. 7, 1999) "Preparation of carbide nanorods;" Urbau et al. (2002) "Synthesis of single-crystalline perovskite nanowires composed of barium titanate and strontium titanate" *J. Am. Chem. Soc.,* 124, 1186; and Yun et al. (2002) "Ferroelectric Properties of Individual Barium Titanate Nanowires Investigated by Scanned Probe Microscopy" *Nanoletters* 2, 447. The disclosures of each of these publications are incorporated by reference herein in their entireties.

In certain embodiments, the nanowires of the present invention are produced by growing or synthesizing these elongated structures on substrate surfaces. By way of example, published U.S. Patent Application No. US-2003-0089899-A1 (the disclosure of which is incorporated by reference herein) discloses methods of growing uniform populations of semiconductor nanowires from gold colloids adhered to a solid substrate using vapor phase epitaxy/VLS. Greene et al. ("Low-temperature wafer scale production of ZnO nanowire arrays", L. Greene, M. Law, J. Goldberger, F. Kim, J. Johnson, Y. Zhang, R. Saykally, P. Yang, Angew. *Chem. Int. Ed.* 42, 3031-3034, 2003) discloses an alternate method of synthesizing nanowires using a solution based, lower temperature wire growth process. A variety of other methods are used to synthesize other elongated nanomaterials, including the surfactant based synthetic methods disclosed in U.S. Pat. Nos. 5,505,928, 6,225,198 and 6,306,736, for producing shorter nanomaterials, and the known methods for producing carbon nanotubes, see, e.g., US-2002/0179434 to Dai et al., as well as methods for growth of nanowires without the use of a growth substrate, see, e.g., Morales and Lieber, Science, V.279, p. 208 (Jan. 9, 1998). As noted herein, any or all of these different materials may be employed in producing the nanowires for use in the invention. For some applications, a wide variety of group III-V, II-VI and group IV semiconductors may be utilized, depending upon the ultimate application of the substrate or article produced. In general, such semiconductor nanowires have been described in, e.g., US-2003-0089899-A1, incorporated herein above. The disclosures of each of these publications are incorporated by reference herein in their entireties.

Growth of branched nanowires (e.g., nanotetrapods, tripods, bipods, and branched tetrapods) is described in, e.g., Jun et al. (2001) "Controlled synthesis of multi-armed CdS nanorod architectures using monosurfactant system" *J. Am. Chem. Soc.* 123, 5150-5151; and Manna et al. (2000) "*Synthesis of Soluble and Processable Rod-, Arrow-, Teardrop-, and Tetrapod-Shaped CdSe Nanocrystals*" *J. Am. Chem. Soc.* 122, 12700-12706. The disclosures of each of these publications are incorporated by reference herein in their entireties.

Synthesis of nanoparticles is described in, e.g., U.S. Pat. No. 5,690,807 to Clark Jr. et al. (Nov. 25, 1997) entitled "Method for producing semiconductor particles"; U.S. Pat. No. 6,136,156 to El-Shall, et al. (Oct. 24, 2000) entitled "Nanoparticles of silicon oxide alloys;" U.S. Pat. No. 6,413,489 to Ying et al. (Jul. 2, 2002) entitled "Synthesis of nanometer-sized particles by reverse micelle mediated techniques;" and Liu et al. (2001) "Sol-Gel Synthesis of Free-Standing Ferroelectric Lead Zirconate Titanate Nanoparticles" *J. Am. Chem. Soc.* 123, 4344. The disclosures of each of these publications are incorporated by reference herein in their entireties. Synthesis of nanoparticles is also described in the above citations for growth of nanocrystals, nanowires, and branched nanowires, where the resulting nanostructures have an aspect ratio less than about 1.5.

Synthesis of core-shell nanostructure heterostructures, namely nanocrystal and nanowire (e.g., nanorod) core-shell heterostructures, are described in, e.g., Peng et al. (1997) "Epitaxial growth of highly luminescent CdSe/CdS core/shell nanocrystals with photostability and electronic accessibility" *J. Am. Chem. Soc.* 119, 7019-7029; Dabbousi et al. (1997) "(CdSe) ZnS core-shell quantum dots: Synthesis and characterization of a size series of highly luminescent nanocrysallites" *J. Phys. Chem. B* 101, 9463-9475; Manna et al. (2002) "Epitaxial growth and photochemical annealing of graded CdS/ZnS shells on colloidal CdSe nanorods" *J. Am. Chem. Soc.* 124, 7136-7145; and Cao et al. (2000) "Growth and properties of semiconductor core/shell nanocrystals with InAs cores" *J. Am. Chem. Soc.* 122, 9692-9702. Similar approaches can be applied to growth of other core-shell nanostructures. The disclosures of each of these publications are incorporated by reference herein in their entireties.

Growth of nanowire heterostructures in which the different materials are distributed at different locations along the long axis of the nanowire is described in, e.g., Gudiksen et al. (2002) "Growth of nanowire superlattice structures for nanoscale photonics and electronics" *Nature* 415, 617-620; Bjork et al. (2002) "One-dimensional steeplechase for electrons realized" *Nano Letters* 2, 86-90; Wu et al. (2002) "Block-by-block growth of single-crystalline Si/SiGe superlattice nanowires" *Nano Letters* 2, 83-86; and U.S. patent application 60/370,095 (Apr. 2, 2002) to Empedocles entitled "Nanowire heterostructures for encoding information." The disclosures of each of these publications are incorporated by reference herein in their entireties. Similar approaches can be applied to growth of other heterostructures.

As described herein, and throughout co-assigned published Patent Application Nos. 2007/0212538 and 2008/0280169, the entire contents of each of which are incorporated by reference herein, nanowire structures with multiple shells can also be fabricated, such as, for example, a conducting inner core wire (which may or may not be doped) (e.g., to impart the necessary conductivity for electron transport) and one or more outer-shell layers that provide a suitable surface for binding polymer electrolyte. Exemplary nanowires that can be used in the practice of the present invention also include carbon-comprising nanowires, such as those disclosed in Published U.S. Patent Application Nos. 2007/0212538 and 2008/0280169.

In one embodiment, the present invention provides additives for use in a battery slurry. As used herein, an "additive" refers to a composition that is added to a battery slurry, such that a portion (e.g., a weight %) of the original slurry is replaced with the additive composition. As used herein, a "battery slurry" refers to a mixture of components used to form an electrode (anode or cathode) of a battery.

In an embodiment, the additives comprise one or more carbon-comprising, Si-based nanostructures. As used herein, "carbon-comprising" is used to indicate that the nanostructures comprise carbon in at least some form. Suitably, the nanostructures comprise a carbon shell or sheet surrounding, or at least partially surrounding the nanostructure. As used herein, "Si-based" is used to indicate that the nanostructure comprises at least 50% silicon (Si). Suitably, the nanostructures comprise at least 55%, at least 60%, at least 65%, at least 70%, at least 75%, at least 80%, at least 85%, at least 90%, or at least 95% Si. FIG. 1A shows an exemplary carbon-comprising, Si-based nanostructure 100 (e.g., a nanowire) of the present invention which comprises a Si core 102 and a C shell 104. As show in FIG. 1A, suitably the nanostructures are Si-based nanowires, however in further embodiments, the nanostructures can be Si-based nanoparticles. It should be noted that the carbon-comprising, Si-based nanostructures, as well as other nanostructures described herein, are generically termed "nanostructures" herein.

In another embodiment, the additives comprise one or more nanostructures comprising a nanoscale scaffold, a Si-based layer disposed on the nanoscale scaffold and a carbon-based layer disposed on the Si-based layer. As used herein, a "nanoscale scaffold" refers to a nanostructure upon which one or more other materials, components, layers, coatings, shells, and/or films may be disposed. Example nanoscale scaffolds include nanowires, nanopowder, nanorods, nanofilms, nanotubes, branched nanocrystals, nanotetrapods, tripods, bipods, nanocrystals, nanodots, quantum dots, nanoparticles, branched tetrapods (e.g., inorganic dendrimers), and the like. FIG. 1D shows an exemplary nanostructure 150 (e.g., a coated nanowire) of the present invention that comprises a nanoscale scaffold 152, a Si-based layer 154 disposed on nanoscale scaffold 152, and a C shell 156 disposed on Si-based layer 154. Suitably, nanoscale scaffold 152 comprises a nanowire (e.g., a Si nanowire), a nanofiber, a nanotube (e.g., a C nanotube), or some other nanoscale scaffold upon which a Si-based layer may be disposed.

The nanostructures of the present invention comprising a nanoscale scaffold, a Si-based layer disposed on the nanoscale scaffold, and a carbon-based layer disposed on the Si-based layer are also referred to herein as nanoscale-scaffold-based compositions, nanoscaffold-based compositions, or simply scaffold-based nanostructures.

In exemplary embodiments, the Si-based nanostructures are Si-based nanowires. Exemplary dimensions for the nanowires of the present invention are described throughout. Suitably, the nanowires have a diameter of about 10 nm to about 500 nm, or about 20 nm to about 400 nm, about 20 nm to about 300 nm, about 20 nm to about 200 nm, about 20 nm to about 100 nm, or about 40 nm to about 100 nm. Suitably, the nanowires have a length of about 100 nm to about 100 µm, or about 1 µm to about 75 µm, about 1 µm to about 50 µm, or about 1 µm to about 20 µm. Suitably, the aspect ratios of the nanowires are up to about 2000:1, or suitably, up to about 1000:1, having a diameter of about 20 nm to about 200 nm, and a length of about 0.1 µm to about 50 µm.

Methods for producing nanowires using vapor-liquid-solid (VLS) processes are disclosed, for example, in published U.S. Patent Application No. US-2003-0089899 (the disclosure of which is incorporated by reference herein). Additional methods for producing nanowires are described herein, and are well known in the art. In exemplary embodiments, in order to produce high volume, high density nanowires, methods disclosed in U.S. Provisional Patent Application No. 61/221,501, filed Jun. 29, 2009, entitled "Methods for Growth of High Density Nanowires," the disclosure of which is incorporated by reference herein in its entirety, are used. Following the nanowire growth, the nanowires are suitably harvested (e.g., via sonication or other mechanical means). The addition of a carbon-comprising layer (e.g., a C shell) can be added to the nanowires immediately following growth, or after harvesting. The nanowires can then be utilized as additives as described herein. Additional processing, such as ball milling, grinding or other mechanical mechanisms to break the nanowires and additives into smaller pieces or shorter segments can also be used.

As described herein, suitably the additives of the present invention can be added to currently existing battery slurries, replacing a portion of the slurry, e.g., a portion of the graphite component, with the carbon-comprising, Si-based nanostructure compositions of the present invention. Battery slurries utilized in commercial grade batteries generally comprise a mixture of graphite, carbon and a polymer binder (e.g., polyvinylidene difluoride (PVDF)). The amounts and ratios of these components generally varies from battery to battery, but slurries usually comprise about 50%-80% graphite, about 40%-10% carbon and about 10% PVDF (all percentages are weight percentages). In exemplary embodiments, a portion of the graphite component of the slurry is suitably replaced by the additives of the present invention. For example, the additives replace about 1 weight % to about 80 weight % of the slurry (replacing an equivalent amount of the graphite). For example, the additives replace about 1 weight %, about 2 weight %, about 3 weight %, about 4 weight %, about 5 weight %, about 6 weight %, about 7 weight %, about 8 weight %, about 9 weight %, about 10 weight %, about 11 weight %, about 12 weight %, about 13 weight %, about 14 weight %, about 15 weight %, about 16 weight %, about 17 weight %, about 18 weight %, about 19 weight %, about 20 weight %, about 21 weight %, about 22 weight %, about 23 weight %, about 24 weight %, about 25 weight %, about 26 weight %, about 27 weight %, about 28 weight %, about 29 weight %, about 30 weight %, about 31 weight %, about 32 weight %, about 33 weight %, about 34 weight %, about 35 weight %, about 36 weight %, about 37 weight %, about 38 weight %, about 39 weight %, about 40 weight %, about 41 weight %, about 42 weight %, about 43 weight %, about 44 weight %, about 45 weight %, about 46 weight %, about 47 weight %, about 48 weight %, about 49 weight %, about 50 weight %, about 51 weight %, about 52 weight %, about 53 weight %, about 54 weight %, about 55 weight %, about 56 weight %, about 57 weight %, about 58 weight %, about 59 weight %, about 60 weight %, about 61 weight %, about 62 weight %, about 63 weight %, about 64 weight %, about 65 weight %, about 66 weight %, about 67 weight %, about 68 weight %, about 69 weight %, about 70 weight %, about 71 weight %, about 72 weight %, about 73 weight %, about 74 weight %, about 75 weight %, about 76 weight %, about 77 weight %, about 78 weight %, about 79 weight %, or about 80 weight % of the slurry.

In exemplary embodiments, the additives of the present invention further comprise a conductive polymer (e.g., a carbon-based polymer) disposed on the nanostructures. Exemplary conductive polymers are described herein and otherwise known in the art, and include, for example, PVDF, polypyrrole, polythiaphene, polyethylene oxide, polyacrylonitrile, poly (ethylene succinate), polypropylene, poly (β-propiolactone), styrene butadiene rubber (SBR), carboxymethyl cellulose salt (CMC) and sulfonated fluoropolymers such as NAFION® (commercially available from DuPont Chemicals, Wilmington), polyimide, poly(acrylic acid) etc. Conductive polymers are suitably uniformly dispersed on the surfaces of the nanostructures, for example, along the lengths of nanowires. The interface between the nanostructures, suitably nanowires, and the conductive polymers also allows for fast charge/discharge cycles of the electrodes prepared using such materials. In addition, the conductive polymer coating on the nanowires also helps to accommodate the volume change in nanowires associated with alkali metal intercalation.

In further embodiments, the present invention provides battery slurries comprising one or more of the carbon-comprising, Si-based nanostructures, as described herein. Exemplary characteristics of the nanostructures are described throughout. As discussed herein, suitably the slurries comprise about 1 weight % to about 80 weight % of the carbon-comprising, Si-based nanostructures (suitably replacing an equivalent amount of the graphite in the slurries).

As described herein, in exemplary embodiments the slurries further comprise a carbon-based material in addition to the nanostructures described throughout. For example, the slurries suitably comprise carbon or graphite in addition to the nanostructures (as well as a polymer binder).

In another embodiment, the additives of the present invention suitably comprise one or more nanostructures disposed on a carbon-based substrate (nanostructure-carbon-based substrate compositions). As shown in FIG. 1B, additive 110 suitably comprises nanostructures 114 disposed on carbon-based substrates 112. In additional embodiments, as shown in FIG. 1E, additive 110' suitably comprises nanostructures 114 disposed on carbon-based powder 112'. Suitably, carbon-based powder 112' comprises particles of about 5 microns to about 50 microns, about 10 microns to 30 microns, about 15 microns to about 25 microns, or about 20 microns. It should be noted that the components shown in FIGS. 1A-1E are not to scale and provided only for illustrative purposes. As described throughout, exemplary nanostructures that can be utilized in the practice of the present invention include nanowires, nanoparticles or nanofilms.

As used herein, the term "disposed" refers to any method of placing one element next to and/or adjacent (including on top of or attached to) another, and includes, spraying, layering, depositing, painting, dipping, bonding, coating, growing, forming, depositing, etc. Suitably, nanostructures are grown on carbon-based substrates. For example, as described throughout, suitably nanostructures 114 are nanowires that have been grown directly on carbon-based substrate 112, or grown separately from carbon-based substrate 112, and then disposed (e.g., attached or otherwise associated) on carbon-based substrate 112.

For example, a catalyst metal, including metal foils or colloids (e.g., gold colloids) is first disposed on the carbon-based substrate. Then, the catalyst metal is contacted with one or more precursor gases to grow nanowires using a VLS-processes. Methods for producing nanowires using such VLS-processes are disclosed, for example, in published U.S. Patent Application No. US-2003-0089899 (the disclosure of which is incorporated by reference herein). Additional methods for producing nanowires are described herein, and are well known in the art. In exemplary embodiments, in order to produce high volume, high density nanowires, methods disclosed in U.S. Provisional Patent Application No. 61/221,501, filed Jun. 29, 2009, entitled "Methods for Growth of High Density Nanowires," the disclosure of which is incorporated by reference herein in its entirety, are used. In such embodiments, following the nanowire growth, the nanowires can be harvested alone and then disposed on carbon-based substrates, or in other embodiments, the nanowires and the carbon-based substrates onto which they are disposed are harvested together. The nanowires and the nanowire-carbon-based substrates can then be utilized as additives as described herein. Additional processing, such as ball milling, grinding or other mechanical mechanisms to break the nanowires and additives into smaller pieces or shorter segments can also be used.

In an embodiment, Si-based nanostructures are grown on carbon-based powder, e.g., graphite powder, without micropores to create a Si-based nanostructure disposed on the graphite powder as shown in FIG. 1E. Suitably, the Si-based nanostructures may comprise Si-based nanowires, Si-based nanofibers, Si particles, Si-based thin layers, and/or Si-based films. In additional embodiments, other materials capable of Li intercalation can be used to grow nanostructures on carbon-comprising powder (e.g., graphite powder).

Embodiments of the present invention achieve improved conductivity by growing Si-based nanostructures on graphite powder. In addition, the Si-based nanostructure disposed on graphite powder can be used in a battery-electrode slurry and battery-electrode layers, which leverages the high capacity of Si and the high conductivity of the graphite powder.

Additional embodiments of the present invention achieve improved conductivity by disposing a carbon coating on Si-based nanowires, which may also make it easier to integrate Si-based nanowires in carbon-based slurries for lithium-ion batteries. Lithium-ion battery slurries include a binder, typically comprised of a carbon-comprising polymer (e.g., styrene butadiene rubber (SBR), carboxymethyl cellulose (CMC), polyvinylidene fluoride (PVDF), etc.). In embodiments, the binder is used as a carbon source for carbon coating Si nanowires. Carbonizing Si nanowires using the battery slurry binder suitably improves the interaction between the carbonized Si nanowire and the battery slurry.

The compositions of the present invention comprising nanostructures disposed on carbon-based substrates are also referred to herein as nanostructure-carbon-based substrate compositions, nanowire-carbon-based substrate compositions, or simply nanostructure compositions or nanowire compositions.

As used herein a "carbon-based substrate" refers to a substrate that comprises at least about 50% carbon by mass. Suitably, a carbon-based substrate comprises at least about 60% carbon, 70% carbon, 80% carbon, 90% carbon, 95% carbon or about 100% carbon by mass, including 100% carbon. Exemplary carbon-based substrates that can be used in the practice of the present invention include, but are not limited to, carbon powder, such as carbon black, fullerene soot, desulfurized carbon black, graphite, graphene, graphene powder or graphite foil. As used throughout, "carbon black" refers to the material produced by the incomplete combustion of petroleum products. Carbon black is a form of amorphous carbon that has an extremely high surface area to volume ratio. "Graphene" refers to a single atomic layer of carbon formed as a sheet, and can be prepared as graphene powders. See e.g., U.S. Pat. Nos. 5,677,082, 6,303,266 and 6,479,030, the disclosures of each of which are incorporated by reference herein in their entireties. "Carbon-based substrates" specifically exclude metallic materials, such as steel, including stainless steel. Carbon-based substrates can be in the form of sheets, or separate particles, as well as cross-linked structures.

Suitably, the nanostructure-carbon-based substrate compositions, the carbon-comprising, Si-based nanostructures, and/or the scaffold-based nanostructures form an "ink," which can easily be manipulated and added, i.e., as additive, to various battery slurries, or utilized in the preparation of battery electrodes, as described herein.

Nanostructures comprising Si (i.e., Si-based nanostructures), including Si nanowires, and Si nanoparticles, are suitably used in the practice of the present invention due to their ability to absorb the volume change associated with charging and discharging cycles of a rechargeable battery. Silicon has the highest known capacity of all materials, and lithiated silicon ($Li_{15}Si_4$, the highest lithiated phase achievable for ambient temperature lithiation of silicon) has a corresponding capacity of about 3579 m Ah/g (milliamp hours per gram) before lithiation. In addition, silicon is abundant, inexpensive and safer to manufacture and utilize than graphite. However, from x-ray data, the calculated density of $Li_{15}Si_4$ is 1.179 g/cm$^3$. Thus, when silicon is fully lithiated to $Li_{14}Si_4$ it undergoes a volume expansion of 280% and has a maximum theoretical volumetric capacity of 2190 mAh/cm$^3$ after lithiation. This volume expansion renders bulk silicon impractical for use in a battery, as the material disintegrates upon repeated charge and discharge cycles, and thus severely limits battery life.

The nanostructures of the present invention—such as, for example, scaffold-based nanostructures, nanowires, including Si nanowires, disposed on carbon-based substrates, or carbon-comprising, Si-based nanowires—absorb the volume change associated with lithiation during repeated charge/discharge cycles. The use of carbon-based structures such as graphene, carbon-black and other carbon-based substrates, aid in the absorbance of the volume change in the slurry, as the structures can easily bend, flex, and deform. In addition, the overall structure of the nanowires allows for volume change within the slurries without generating excessive forces due to the strain of the wires during deformation. A carbon shell or sheet surrounding Si-based nanowires also aids in the absorption of volume changes.

As described herein in embodiments, the nanowires for use in the practice of the present invention have a core-shell structure. Suitably, the nanowires comprise a crystalline core and non-oxide, amorphous shell. That is, the shell of the nanowire does not contain an oxide. In further embodiments, the shell can include an oxide, such as with silicon nanowires. In further embodiments, the nanowires can be of a core-shell-shell structure (or additional shells). Exemplary core-shell (and core-shell-shell) nanowire compositions are described throughout. Suitably the shell of the nanowires is an alkali metal-alloy forming materials, such as a lithium alloy-forming material. Suitably a material that allows alkali metal (e.g., Li) intercalation, or has a high Li solubility (e.g., >0.1%). Suitably, the core or a first shell of the nanowires is a good thermal conductor (e.g., thermal conductivity of k>0.2 Wm$^{-1}$K (watts per meter*Kelvin)) at room temperature, and a good electrical conductor (e.g., resistance of R<5 ohm).

In exemplary embodiments, the carbon-comprising, Si-based nanowires, nanowire-carbon-based substrate compositions, or scaffold-based nanostructures of the present invention form a porous network in which the nanowires intertwine, interweave or overlap. This arrangement takes the form of a porous structure, wherein the size of pores between the nanowires is suitably mesopores and macropores. As used herein the term "mesopores" refers to pores that are larger than micropores (micropores are defined as less than about 2 nm in diameter), but smaller than macropores (macropores are defined as greater than about 50 nm in diameter), and suitably have a pore size in the range of greater than about 30 nm to less than about 200 nm in diameter. Suitably, the compositions of the present invention will be substantially free of micropores, that is, less than about 0.1% of the pores will be micropores (i.e., less than about 2 nm in diameter). The porous nature these nanowire structures allows for increase mass transport of electrolyte through the structures, resulting in rapid diffusion of the alkali metal ions.

In suitable embodiments, the nanowires comprise Si, suitably a Si core, and a shell comprising C. While nanowires comprising a SiC core, or a SiC shell can also be used, suitably the nanowires do not comprise a carbide shell (i.e., SP3 carbon), but instead simply comprise a carbon shell (i.e., SP$^2$ carbon) that is covalently bonded to the silicon core. In the case of SiC nanowires, the carburization process is suitably controlled so as to generate partially carburized Si nanowires (see Published U.S. Patent Application No. 2008/0280169) with strongly bonded carbon nanoparticles. Nanowires of the present invention are able to accommodate the associated volume change with alkali metal (e.g., Li) intercalation. Other suitable materials for use in the core of the nanowires are described herein and include TiO$_2$.

The use of a core-shell (or multiple shell) nanowire structure in the compositions of the present invention provide enhanced cycling (charging/discharging) performance, most likely due to the formation of passivating films on the surface of the nanowires. An initial capacity loss can originate from the reduction of the electrolyte on the nanowire surface, resulting in the formation of a solid electrolyte interface (SEI) on the nanowire surface, or from irreversible alkali metal (e.g., Li) insertion/intercalation into the nanostructures. Preformation of an artificial SEI layer (through chemical modification) on the nanostructures, and or prelithiating of the nanostructures, can be used to enhance performance. In embodiments, a shell comprises a metal and/or metal oxide, such as Cu, Tin oxide, Ni, and the like. Si nanowire surface conductivity can be improved in this manner, and reduce the volume change of the Cu/SiNWs or Ni/SiNWS so that a thin, dense and stable SEI can be maintained on the surface. Such metal and/or metal oxide shells can also reduce the consumption of Li in the battery. A shell comprising a metal oxide such as tin oxide, for example, also permits Li ions to diffuse through the shell, yet prevent solvents in the electrolyte from penetrating.

In embodiments, nanowires for use in the present invention can further comprise nanoparticles on their surface. For example, the nanoparticles can be graphite or graphene particles or layers. In embodiments where the nanowires are used to prepare anodes, as described herein, suitably the nanowires can further comprise nanoparticles of Si or TiO$_2$ on their surface. In embodiments where the nanowires are used to prepare cathodes, the nanowires can comprise nanoparticles of LiNiSiO$_4$, LiNiSiO, LiFeO$_2$, etc. The nanoparticles decorating the surface of the nanowires of the present invention are utilized in a highly efficient manner (acting as intercalating or alloying materials) due to the high curvature of the nanowire surface (e.g., radius of less than about 100 nm) on which they are disposed, thus exposing a large number of the nanoparticles to the external environment.

Li—Si alloy compositions can be passivated in polar aprotic electrolyte solutions and by Li-ion conducting surface films that behave like a solid electrolyte interface. Ionic liquids can also be introduced to modify Si nanowire surface chemistry. Thus, surface chemistry modification can be realized by tuning components in the electrolyte solutions.

Exemplary dimensions for the nanowires of the present invention are described throughout. Suitably, the nanowires have a diameter of about 10 nm to about 500 nm, or about 20 nm to about 400 nm, about 20 nm to about 300 nm, about 20 nm to about 200 nm, about 20 nm to about 100 nm, or about 40 nm to about 100 nm. Suitably, the nanowires have a length of about 100 nm to about 100 μm, or about 1 μm to about 75 μm, about 0.1 μm to about 50 μm, or about 1 μm to about 20 μm. Suitably, the aspect ratios of the nanowires are up to about 2000:1, or suitably, up to about 1000:1. Such high aspect ratios allow for electrons that are generated on the nanowires to be rapidly passed between the nanowires to the conducting electrode. In addition, nanowires with diameters of less than about 50 nm, and aspect ratios of greater than about 1000:1, demonstrate increased flexibility when undergoing the volume change associated with cycling between charged and discharged states, as described herein.

In further embodiments, the nanowires for use in the practice of the present invention can be porous nanowires, such as porous Si nanowires. Electrochemical cycling during lithiation and delithiation produces pores on the walls of the nanostructures. It has been hypothesized that the presence of these pores may increase the ability of the nanostructures to accommodate volume changes, and also to increase the surface area available for contact with conductive polymers and alkali metals. Preparation of porous nanostructures, including porous nanowires, can be carried out by electrochemical cycling. In an additional embodiment, a pore forming material can be incorporated into the nanostructures and then removed to generate the porous nanostructures. For example, Sn or other secondary components can be integrated into the nanostructures (e.g., Si nanowires), and then removed by chemical (e.g., etching) or physical methods. These porous nanostructures, including porous Si nanowires are then utilized in the carbon-comprising, Si-based nanostructure compositions, the nanostructure-carbon-based substrate compositions, the scaffold-based nanostructures, and additives of the present invention.

Preparation of the additives of the presently claimed invention, including carbon-comprising, Si-based nanowire, nanowire-carbon-based substrate compositions, and scaffold-based nanostructures suitably utilize nanowire alignment methods such as those disclosed in Published U.S. Patent Application No. 2008/0224123 (the disclosure of which is incorporated by reference herein in its entirety) to generate high density nanowire compositions. Exemplary alignment methods include the use of fluid flow and shear extrusion to align the nanowires, as well as e-field alignment and deposition onto various substrates, including carbon-based substrates. Spraying can be utilized to introduce nanowires and/or conductive polymers to the nanowires. The nanowires can also be bent and compressed in order to form a more dense and interwoven composition.

As described herein, suitably the additives of the present invention can be added to currently existing battery slurries, replacing a portion of the slurry, e.g., a portion of the graphite component. Battery slurries utilized in commercial grade batteries generally comprise a mixture of graphite, carbon and a polymer binder (e.g., polyvinylidene difluoride (PVDF)). The amounts and ratios of these components generally varies from battery to battery, but slurries usually comprise about 50%-80% graphite, about 40%-10% carbon and about 10% PVDF (all percentages are weight percentages). In exemplary embodiments, a portion of the graphite component of the slurry is suitably replaced by the additives of the present invention. For example, the additives replace about 1 weight % to about 80 weight % of the slurry (replacing an equivalent amount of the graphite).

In exemplary embodiments, the additives of the present invention further comprise a conductive polymer disposed on the nanostructures. Exemplary conductive polymers are described herein and otherwise known in the art, and include, for example, PVDF, polypyrrole, polythiophene, polyethylene oxide, polyacrylonitrile, poly(ethylene succinate), polypropylene, poly (β-propiolactone), styrene butadiene rubber (SBR), carboxymethyl cellulose salt (CMC), and sulfonated fluoropolymers such as NAFION® (commercially available from DuPont Chemicals, Wilmington), etc. Conductive polymers are suitably uniformly dispersed on the surfaces of the nanostructures, for example, along the lengths of nanowires. The interface between the nanostructures, suitably nanowires, and the conductive polymers also allows for fast charge/discharge cycles of the electrodes prepared using such materials. In addition, the conductive polymer coating on the nanowires also helps to accommodate the volume change in nanowires associated with alkali metal intercalation.

In further embodiments, the present invention provides battery slurries comprising one or more of the carbon-comprising, Si-based nanostructures, the nanostructure-carbon-based-substrate compositions, and/or the scaffold-based nanostructures as described herein. Exemplary characteristics of the nanostructures are described throughout. As discussed herein, suitably the slurries comprise about 1 weight % to about 80 weight % of the nanostructure-carbon-based-substrate compositions (suitably replacing an equivalent amount of the graphite in the slurries).

As described herein, in exemplary embodiments the slurries further comprise a carbon-based material in addition to the nanostructures described throughout. For example, the slurries suitably comprise carbon or graphite in addition to the nanostructures (as well as a polymer binder).

The present invention also provides battery electrodes comprising one or more additives of the presently claimed invention (i.e., the carbon-comprising, Si-based nanostructures, the nanostructure-carbon-substrate based compositions, and/or scaffold-based nanostructures). As shown in FIGS. 1C and 1F, suitably such battery electrodes 120 and 120' are prepared from: the carbon-comprising, Si-based nanostructures 100 of FIG. 1A; the nanostructure-carbon-substrate based compositions 100 shown in FIG. 1B or 100' shown in FIG. 1E; and/or the scaffold-based nanostructures shown in FIG. 1D. As shown in FIG. 1F, suitably battery electrodes 120' may also be prepared from nanostructures 114 disposed on carbon-based powder 112'. The additives of the present invention can be used to prepare anodes and/or cathodes of batteries. In exemplary embodiments, the electrodes comprise one type of additive (e.g., only carbon-comprising, Si-based nanostructures 100 of FIG. 1A, the nanostructure-carbon-substrate based compositions 110 shown in FIG. 1B or 100' shown in FIG. 1E, or scaffold-based nanostructures 150 shown in FIG. 1D), or in other embodiments, comprise a mixture of carbon-comprising, Si-based nanostructures 100 of FIG. 1A, the nanostructure-carbon-substrate based compositions 110 shown in FIG. 1B or 100' of FIG. 1E, and/or the scaffold-based nanostructures 150 shown in FIG. 1D.

As described throughout, suitably the nanostructures for use in the battery electrodes are nanowires, nanoparticles, or nanofilms. Exemplary compositions of the nanostructures, including core-shell and core-shell-shell nanowires are described throughout. In exemplary embodiments, the nanostructures are Si nanostructures, including Si nanowires, and core-shell nanowires in which the core is Si and the shell C, covalently linked to the core. Exemplary sizes of nanowires for use in the battery electrodes are described throughout.

As described herein, suitably the nanostructure compositions replace about 1 weight % to about 80 weight % of the battery slurry. Thus, when used to prepare a battery electrode, the nanostructure compositions also comprise about 1 weight % to about 80 weight % of the electrode, suitably about 5 weight % to about 20 weight %, about 5 weight % to about 15 weight %, about 5 weight % to about 10 weight %, or about 10 weight % of the battery electrode.

In suitable embodiments, compositions of the present invention suitably comprise a conductive polymer disposed on the nanostructures. Exemplary conductive polymers are described herein, and include for example, polyvinylidene difluoride, polypyrrole, polythiophene, polyethylene oxide, polyacrylonitrile, poly(ethylene succinate), polypropylene, poly (β-propiolactone), styrene butadiene rubber (SBR), carboxymethyl cellulose salt (CMC), and sulfonated fluoropolymers such as NAFION® (commercially available from DuPont Chemicals, Wilmington), etc. The conductive polymer also serves as a binder material when forming electrodes 120.

In further embodiments, the carbon-comprising, Si-based nanostructures, the nanostructure-carbon-based substrates, and scaffold-based nanostructures of the battery electrodes further comprise an alkali metal (e.g., lithium (Li), sodium (Na), potassium (K), rubidium (Rb), caesium (Cs), or francium (Fr)). For example, nanostructures of the present invention can be embedded in an alkali metal foil, such as a lithium (Li) foil. Composites of the nanostructure compositions and alkali metal (e.g., alkali metal films) are highly conductive and as described throughout, demonstrate the ability of the nanostructures (e.g., Si nanostructures) to accommodate the large volume change due to ion insertion.

The present invention also provides batteries comprising the various carbon-comprising, Si-based nanostructures, nanostructure-carbon-based substrate compositions, and/or scaffold-based nanostructures of the present invention. The schematic shown in FIG. 2 of a battery 200 of the present invention is provided for illustrative purposes only. The schematic is not shown to scale, and the orientation and arrangement of the battery components are provided only to aid in explanation of the present invention. Additional components, orientations and arrangements of batteries are well known in the art.

In embodiments, as shown in FIG. 2, battery 200 suitably comprises an anode 202. Suitably, anode 202 comprises one or more of the nanostructure compositions, as described herein. In exemplary embodiments, the anodes comprise the carbon-comprising, Si-based nanostructures. In other embodiments, the anodes comprise the nanostructure-carbon-based substrate compositions. In further embodiments, the anodes comprise scaffold-based nanostructures. In still further embodiments, the anodes can comprise any of these different nanostructure compositions, or multiple anodes, each comprising one or any of these nanostructure compositions. Exemplary nanostructures, including nanowires and compositions of such nanostructures (and nanowires) are described herein. Suitable sizes for nanowires for use in the batteries are described throughout. In addition, exemplary carbon-based substrates are also described herein, and include, a carbon-based powder, carbon black, graphite, graphene, graphene powder and graphite foil.

The carbon-comprising, Si-based nanostructure compositions, the nanostructure-carbon-based substrate compositions, and the scaffold-based nanostructures, and additives of the present invention can be utilized in any battery type. In exemplary embodiments, the batteries of the present invention are Li-ion batteries. That is, the batteries are suitably rechargeable batteries in which a lithium ion 206 moves between the anode 202 and cathode 204. The lithium ion moves from the anode to the cathode during discharge and in reverse, from the cathode to the anode, when charging.

As described herein, the ability of alkali metals, e.g., Li, to insert into the nanostructures of the present invention provides increased capacity. However, due to the ability of the nanostructures, including nanowires (e.g., Si nanowires) to absorb the volume change that accompanies this insertion, the anodes remain structurally sound. The ability of lithium to insert into the nanowires, particularly Si nanowires, provides for a dramatic increase in the capacity of anodes prepared from such materials.

Suitably, the anodes 202 of the batteries 200 of the present invention comprise about 1 weight % to about 80 weight % (suitably about 5 weight % to about 20 weight %, or about 10 weight %) of the nanostructures of the present invention. A conductive polymer—such as polyvinylidene difluoride, styrene butadiene rubber (SBR), or carboxymethyl cellulose—is also suitably disposed on the nanostructures. In exemplary embodiments, anode 202 comprises Si nanostructures embedded in a Li foil.

As shown in FIG. 2, suitably battery 200 further comprises a cathode 204 and a separator 208 (e.g., an electrolyte separator) positioned between the anode 202 and the cathode 204 to partition the anode and cathode from each other, but also to allow passage of ions through the separator 208. In exemplary embodiments, cathode 204 can comprise any suitable material known for use as battery cathodes, such as, but not limited to, lithium-based cathodes, such as $LiCoO_2$, $LiFePO_4$, $LiMnO_2$, $LiMnO_4$, $LiNiCOAlO/LiNiCoMnO^+$ $LiMn_2O_4$, $LiCoFePO_4$ and $LiNiO_2$. Exemplary materials for separator 208 include microporous polymer materials that have good ionic conductivity and sufficiently low electronic conductivity. Suitable materials include PVDF, polypyrrole, polythiaphene, polyethylene oxide, polyacrylonitrile, poly (ethylene succinate), polypropylene, poly (β-propiolactone), and sulfonated fluoropolymers such as NAFION®, as well as others known in the art. Battery 200 also further comprises an electrolyte 218, suitably an alkali metal salt (e.g., Li salt) dissolved in an organic solvent, for example, LiPF6 in 1:1 w:w, ethylene carbonate:diethyle carbonate. Alternatively electrolyte 218 can comprise an alkali metal salt (e.g., Li salt) mixed with an ionically conducting material such as a polymer or inorganic material so as to form a suspension. Alternatively electrolyte 218 can comprise additives one or more additives such as ethylene carbonate (EC), propylene carbonate (PC), derivatives or analogous compounds of EC or PC, chloro ethylene carbonate (CEC), dichloroethylene carbonate, fluoro ethylene carbonate (FEC), trifluoro propylene carbonate, vinylene carbonate (VC), catechol carbonate, ethylene sulfite, propylene sulfite, sulfur additives, diethyl carbonate (DEC), dimethyl carbonate (DMC), derivatives or analogous compounds of DEC or DMC, dimethyl sulfite, diethyl sulfite, S,S-dialkyl dithiocarbonates, methoxyethyl (methyl) carbonate, dimethyl pyrocarbonate (DMPC), dibutyl pyrocarbonate, ethyl propyl carbonate, ethyl methyl carbonate, asymmetric alkyl methyl carbonates, trifluorocthylmethyl carbonate, partially fluorinated linear carbonates, $Li_2CO_3$, partially halogenated organic compounds, bromo butyrolactone, chloro ethylene carbonate, fluoro ethylene carbonate, trifluoro propylene carbonate, fluorinated noncyclic compounds, ethers, glycol ethers, urethanes, glycol esters, N,N-dimethylamino trifluoro acetamide, trifluoro ethylmethyl carbonate, partially fluorinated linear carbonates, methyl chloroformate, fluorinated solvents, vinylene compounds, acrylic acid nitrile, ethyl cinnamate, vinylene acetate, chlorinated solvents, sulfites, hydrogen fluoride (HF), $AlI_3$, $MgI_2$, $SnI_2$, $S_x^2$, 2-methyl-furan (2MeF), 2-methyltetrahydrofuran (2Me-THF), pyridine derivatives, dipyridyl derivatives, cetyltrimethylammonium chloride, nonionic surfactants, crown ethers, benzene, $CO_2$, $N_2O$, CO, 2-methylthiophene (2MeTp), and mixtures thereof.

As shown in FIG. 2, in exemplary embodiments, battery 200 further comprises a housing 210 encasing the anode, electrolytic separator and cathode. Suitable shapes and materials for housing 210 (e.g., metals, polymers, ceramics, composites, etc.) are well known in the art and include a laminate housing composed of a metallic layer and a synthetic resin layer. For example, a nylon film, an aluminum foil and a polyolefin film layered in this order. The polyolefin film is suitably fused or bonded by an adhesive to constitute the inner side of the housing. The polyolefin film may be, for example, a polypropylene film, polyethylene film, or modified polyethylene film. Battery 200 also suitably further comprises electrodes 214 and 216, which can comprise metals such as aluminum, copper, nickel or stainless steel, and connect to load 212.

Figure 20:
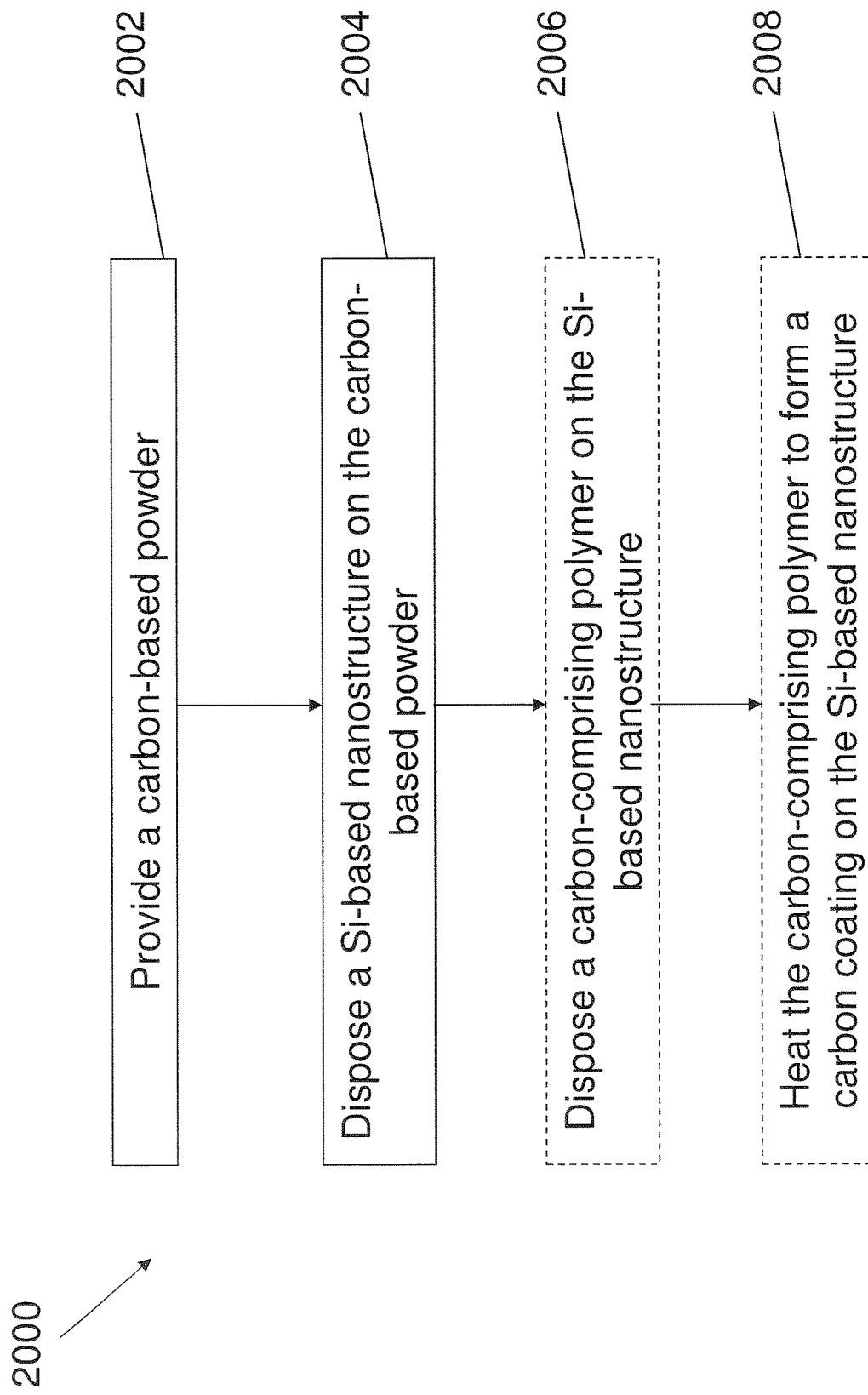
FIG. 20 shows a flowchart of a method of preparing an additive for use in a battery slurry in accordance with an embodiment of the present invention.

In embodiments, the present invention provides methods of preparing an additive for use in a battery slurry. As shown in flowchart 2000 of FIG. 20, with reference to FIG. 1E, suitably such methods comprise, in a step 2002, providing a carbon-based powder. The carbon-based powder may comprise particles of graphite, for example, about 5 microns to about 50 microns, about 10 microns to about 30 microns, about 15 microns to about 25 microns, or about 20 microns in size. In a step 2004, a Si-based nanostructure is disposed on the carbon-based powder. Suitably, the Si-based nanostructure is a Si nanowire or Si nanofiber grown on the carbon-based powder. Methods of growing Si nanowires are provided herein. Such methods may also optionally include disposing a carbon-comprising polymer on the Si-based nanostructure, as illustrated in a step 2006, and heating the carbon-comprising polymer to form a carbon coating on the Si-based nanostructure. Exemplary heating temperatures and times are described herein.

Figure 3A:
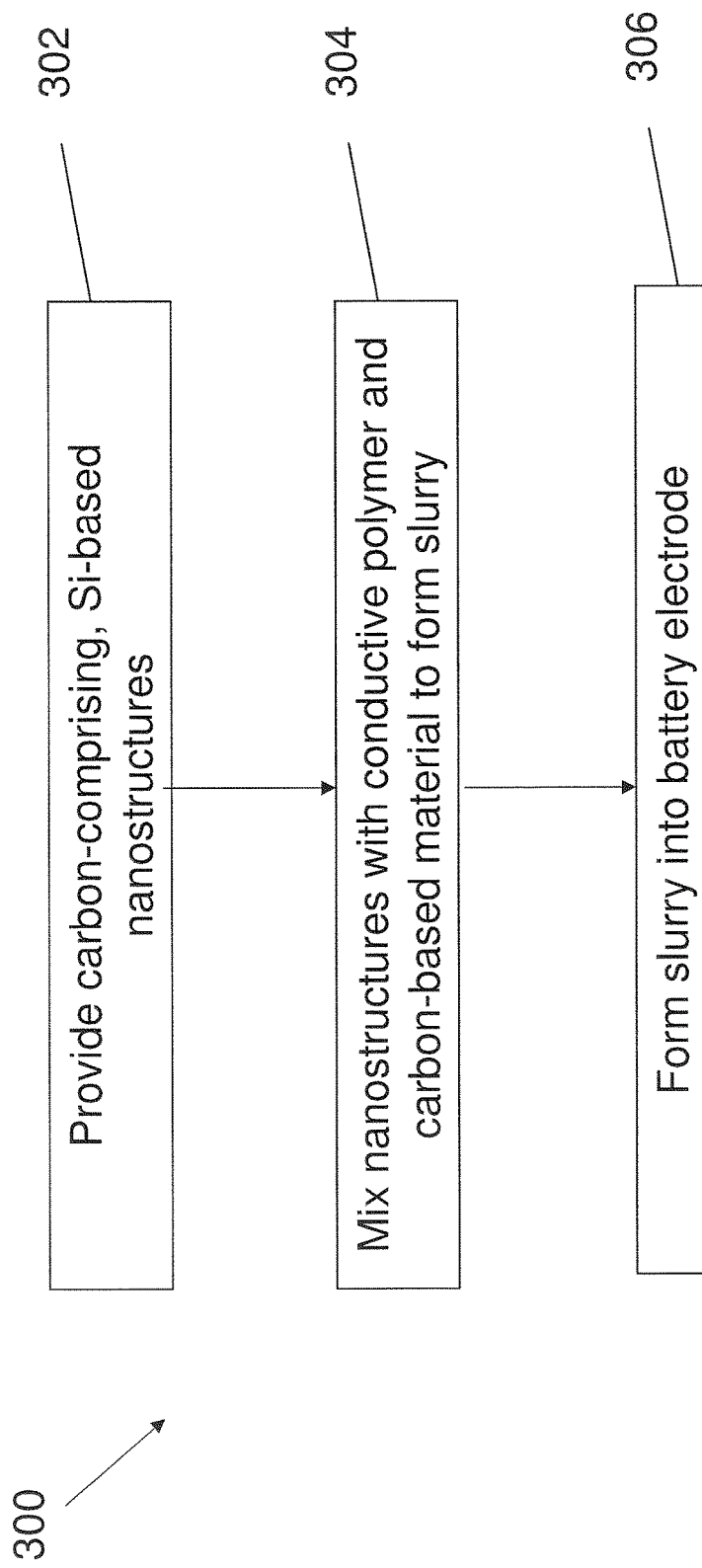
FIGS. 3A-3B show flowcharts of methods of preparing a battery electrode in accordance with embodiments of the present invention.

In further embodiments, the present invention provides methods of preparing a battery electrode. As shown in flowchart 300 of FIG. 3A, with reference to FIGS. 1A and 1C, suitably such methods comprise, in step 302, providing one or more carbon-comprising, Si-based nanostructures 100. In step 304 of flowchart 300, the nanostructures are mixed with a conductive polymer and a carbon-based material to form a slurry. In step 306, the slurry is formed into battery electrode 120.

Exemplary nanostructures, including nanowires, are disclosed herein, as are compositions and characteristics of the nanostructures. Suitably, the nanostructures are Si nanowires, including core-shell (or core-shell-shell) nanowires in which the core of the nanowires comprises Si.

As noted throughout, suitably the carbon-comprising, Si-based nanostructure compositions of the present invention are utilized as additives in conventional battery slurries to generate electrodes (e.g., anodes). As noted throughout, suitably such additives are provided at about 1 weight % to about 80 weight % of the electrode, more suitably about 5 weight % to about 20 weight %, or about 10 weight % of the electrode. As noted herein, suitably the electrodes prepared according to the methods of the present invention are anodes of lithium-ion batteries.

Step 304 of flowchart 300 suitably comprises mixing the carbon-comprising, Si-based nanostructure compositions with a conductive polymer such as polyvinylidene difluoride, styrene butadiene rubber (SBR), and/or carboxymethyl cellulose salt (CMC). Other suitable conductive polymers are described herein or otherwise known in the art. The carbon-comprising, Si-based nanostructure compositions are also suitably mixed with an additional carbon-based material. Examples of such additional carbon-based substrates are described throughout, and include, carbon, carbon black, graphite, graphene, graphene powder or graphite foil. This combination forms a battery slurry typically used to form electrodes.

Figure 3B:
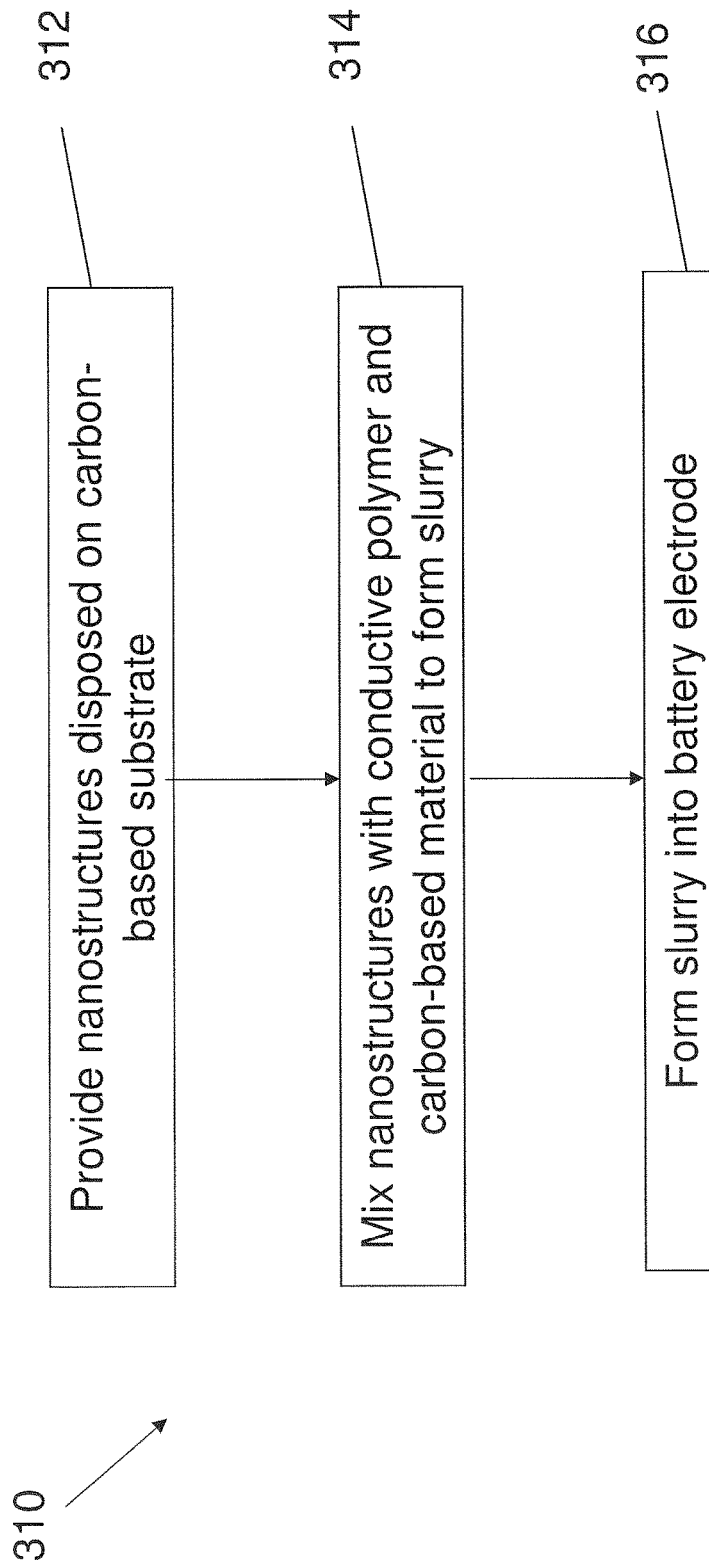

The present invention provides further methods of preparing a battery electrode. As shown in flowchart 310 of FIG. 3B, with reference to FIGS. 1B and 1C, suitably such methods comprise, in step 312, providing one or more nanostructures 114 or 114' disposed on a carbon-based substrate 112 or 112'. In step 304 of flowchart 300, the nanostructures are mixed with a conductive polymer and a carbon-based material to form a slurry. In step 316, the slurry is formed into battery electrode 120 or 120'.

Exemplary nanostructures, including nanowires, are disclosed herein, as are compositions and characteristics of the nanostructures. Suitably, the nanostructures are Si nanowires, including core-shell (or core-shell-shell) nanowires in which the core of the nanowires comprises Si. Exemplary carbon-based substrates are also described herein, and suitably include carbon black, graphite, graphene, carbon-based powder, graphene powder or graphite foil.

As noted throughout, suitably the nanostructure-carbon-based substrate compositions of the present invention are utilized as additives in conventional battery slurries to generate electrodes (e.g., anodes). As noted throughout, suitably such additives are provided at about 1 weight % to about 80 weight % of the electrode, more suitably about 5 weight % to about 20 weight %, or about 10 weight % of the electrode. As noted herein, suitably the electrodes prepared according to the methods of the present invention are anodes of lithium-ion batteries.

Step 314 of flowchart 310 suitably comprises mixing the nanostructure-carbon-based substrate compositions with a conductive polymer such as polyvinylidene difluoride. Other suitable conductive polymers are described herein or otherwise known in the art. The nanostructure-carbon-based substrate compositions are also suitably mixed with an additional carbon-based material (in addition to the carbon-based substrates on which the nanostructures are disposed). Examples of such additional carbon-based substrates are described throughout, and include, carbon, carbon black, graphite, graphene, graphene powder or graphite foil. This combination forms a battery slurry typically used to form electrodes.

Figure 4A:
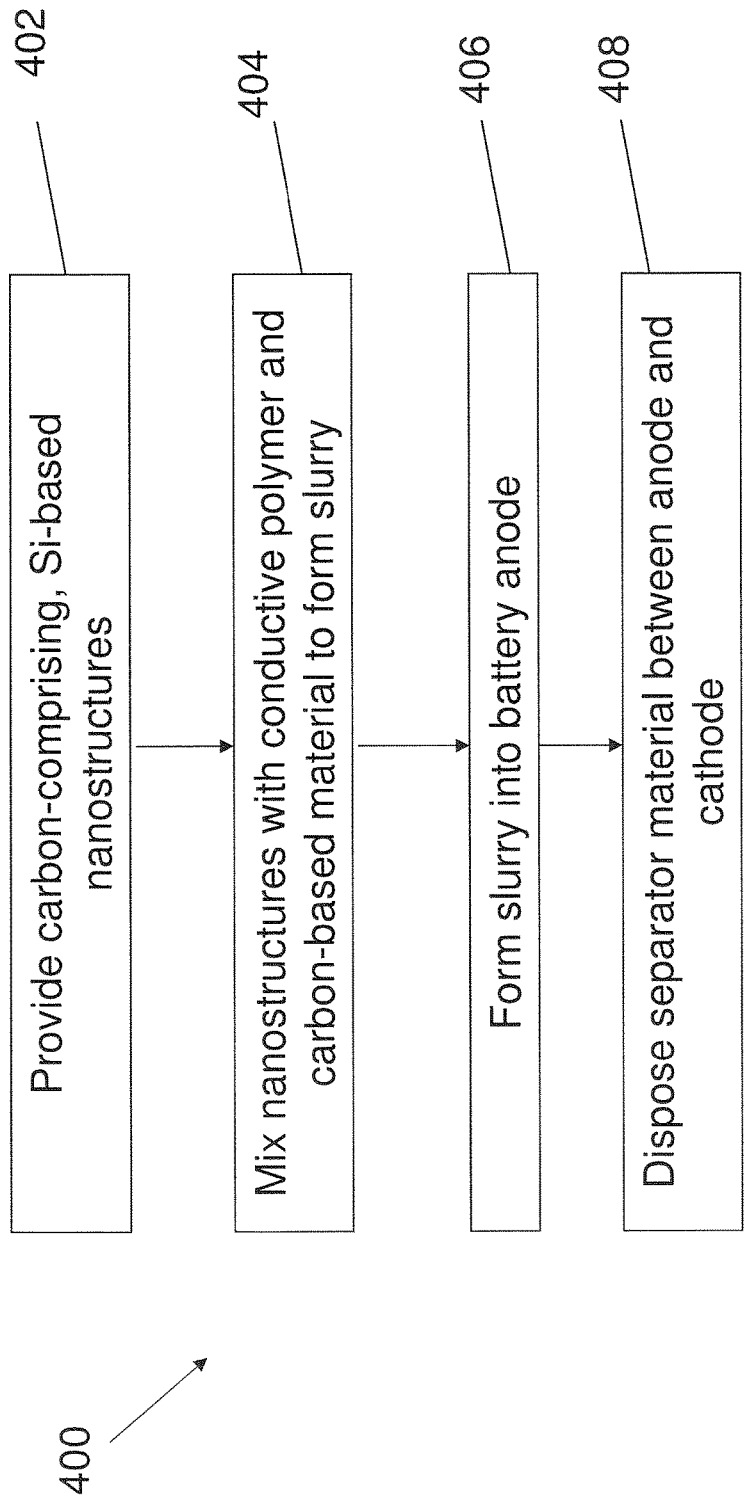
FIGS. 4A-4B show flowcharts of methods of preparing a battery in accordance with embodiments of the present invention.

As shown in flowchart 400 of FIG. 4A, with reference to FIGS. 1A, 1C and 2, the present invention also further provides methods of preparing a battery 200. Suitably, in step 402 of flowchart 400, the methods comprise providing one or more carbon-comprising, Si-based nanostructures 100. hi step 404, the nanostructures are mixed with a conductive polymer and a carbon-based material to form a slurry. In step 406 of flowchart 400, the slurry is formed into an anode 202. A separator material 208 is then disposed between the anode 202 and a cathode 204 in step 408.

Figure 4B:
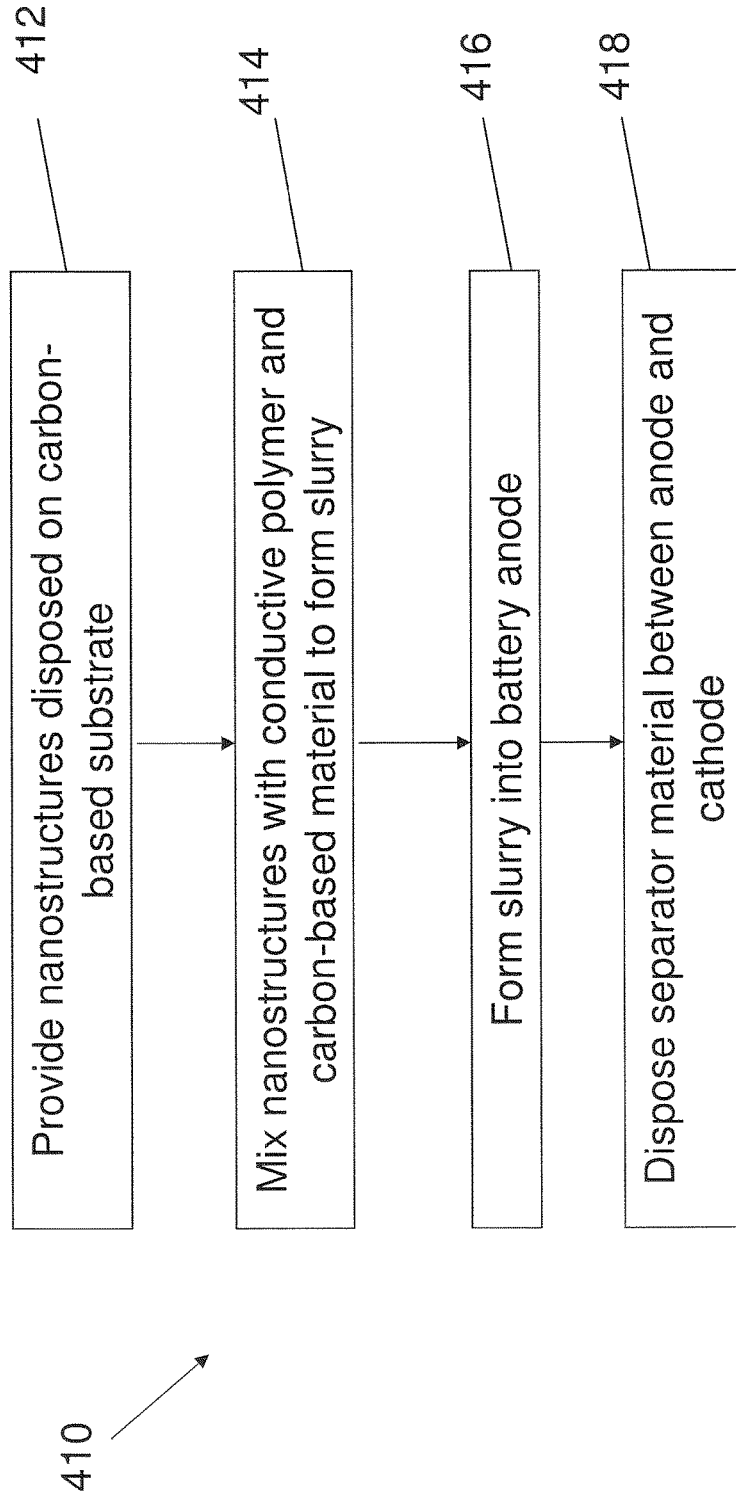

As shown in flowchart 410 of FIG. 4B, with reference to FIGS. 1B, 1C and 2, the present invention further provides additional methods of preparing a battery 200. Suitably, in step 412 of flowchart 410, the methods comprise providing one or more nanostructures 114 disposed on a carbon-based substrate 112 or 112'. In step 414, the nanostructures are mixed with a conductive polymer and a carbon-based material to form a slurry. In step 416 of flowchart 410, the slurry is formed into an anode 202. A separator material 208 is then disposed between the anode 202 and a cathode 204 in step 418.

Methods of preparing lithium batteries, as well as suitable components for cathodes, separator materials, and electrolytes, can be found, for example, in "Lithium batteries: Science and Technology," G Nazri and G. Pistoia, eds., Springer, New York (2004), the disclosure of which is incorporated by reference herein in its entirety. These well known methods are suitably combined with the methods and nanostructure compositions described herein to prepare batteries.

As described throughout, exemplary nanostructures include nanowires, nanoparticles, or nanofilms, suitably Si nanostructures, such as Si nanowires, and core-shell (including core-shell-shell) nanowires. Suitable characteristics and sizes of the nanostructures, such as nanowires, are described throughout as well. Exemplary carbon-based substrates are also described herein.

Suitably, the carbon-comprising, Si-based nanostructures, the nanostructure-carbon-based substrate compositions, and the scaffold-based nanostructures of the present invention comprise about 1 weight % to about 80 weight % of the anode, suitably about 10 weight %. In suitable embodiments, the nanostructures are mixed with a polyvinylidene difluoride conductive polymer and graphite and/or carbon to prepare the slurry in step 404/414 that ultimately will become the battery anode. Additional conductive polymers and carbon-based materials are described herein.

In suitable embodiments, a conductive polymer membrane (separator 208) is disposed between the anode and the cathode in step 408/418. Exemplary conductive polymer membranes are disclosed herein or otherwise known in the art.

Methods of preparing the anode, separator and cathode to form the battery include rolling, heating, drying and storage methods (including temperatures and times) that are well known in the art. See for example, "Lithium batteries: Science and Technology," and U.S. Pat. Nos. 6,165,642, 7,541,114 6,440,606, 5,681,357, 5,688,293 and 5,834,135 the disclosures of each of which are incorporated by reference herein in their entireties.

As described herein, the carbon-comprising, Si-based nanostructure compositions, the nanostructure-carbon-based substrate compositions, and the scaffold-based nanostructures of the present invention are suitably used as additives in conventional battery electrode (e.g., anode) formation techniques. Thus, these additives are easily substituted in the battery manufacturing process by simply replacing a portion of the battery electrode slurry with the presently disclosed additives (e.g., about 1 weight % to about 80 weight %, suitably about 5 weight % to about 20 weight %, or about 10 weight %). The remainder of the traditional battery formation process is then followed. No additional modifications are required when using the additives of the present invention, though the processes can be further modified if desired.

Figure 19:
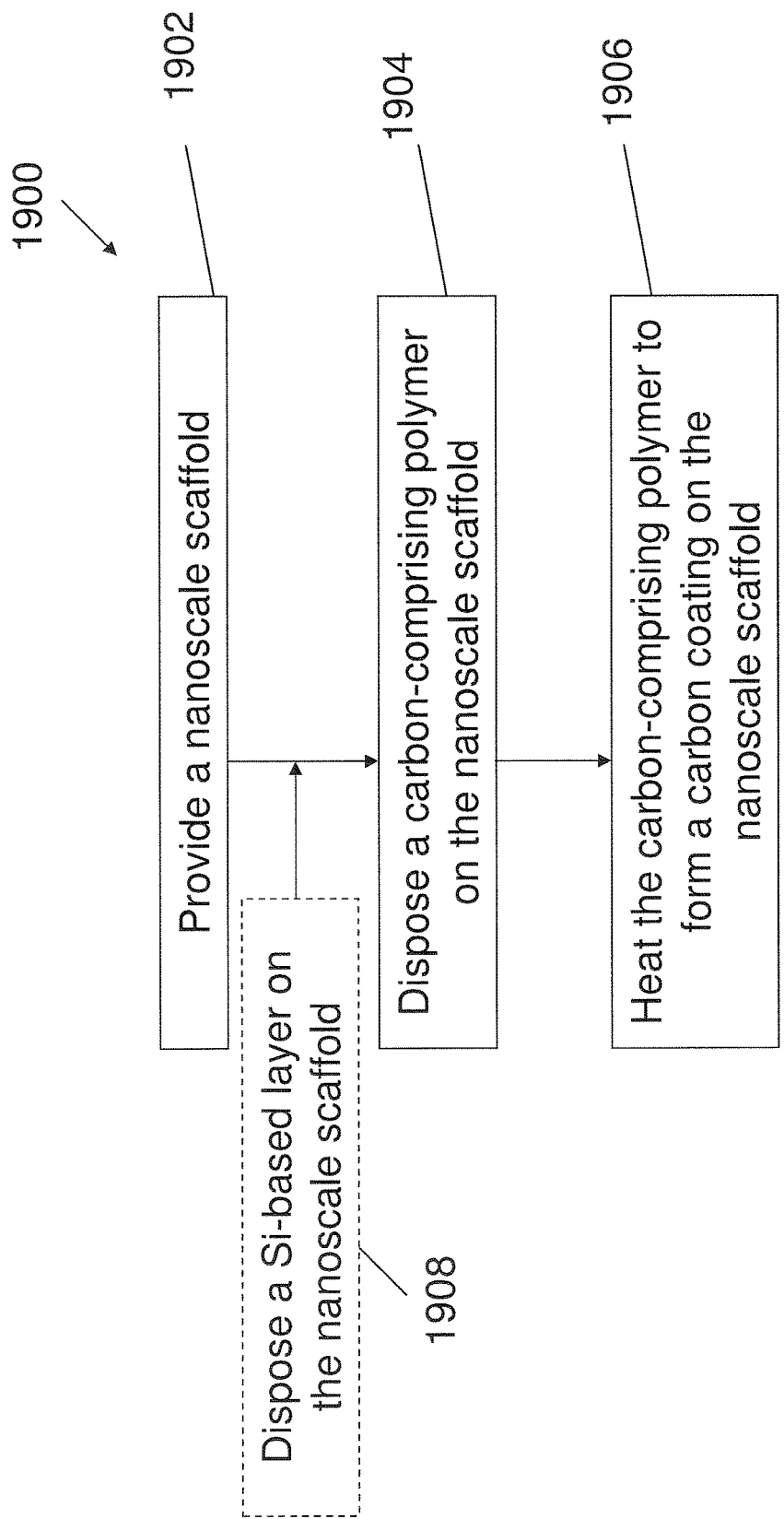
FIG. 19 shows a flowchart of a method of preparing a carbon-coated nanostructure in accordance with an embodiment of the present invention.

The present invention provides further methods of preparing a carbon-coated nanostructure. As shown in flowchart 1900 of FIG. 19, with reference to FIG. 1D, suitably such methods comprise, in step 1902, providing a nanoscale scaffold 152. Example nanoscale scaffolds include nanowires, nanopowder, nanorods, nanofilms, nanotubes, branched nanocrystals, nanotetrapods, tripods, bipods, nanocrystals, nanodots, quantum dots, nanoparticles, branched tetrapods (e.g., inorganic dendrimers), and the like.

In a step 1904 of flowchart 1900, a carbon-comprising polymer is disposed on the nanoscale scaffold 152. The carbon-comprising polymer may comprise, for example, styrene butadiene rubber (SBR), carboxymethyl cellulose (CMC), polyvinylidene fluoride (PVDF), and the like, and combinations thereof.

In a step 1906, the carbon-comprising polymer is heated to form a carbon coating 156 on the nanoscale scaffold 152. The carbon-comprising polymer may be heated to about 160° C. to about 1000° C. For example, the carbon-comprising polymer may be heated to about 200° C. to about 400° C., about 250° C. to about 350° C., or about 300° C. As another example, it may be heated to about 600° C. to about 800° C., about 650° C. to about 750° C., or about 700° C. As a further example, it may be heated to about 800° C. to about 1000° C., about 850° C. to about 950° C., or about 900° C. The carbon-comprising polymer may be heated for a duration of about 30 minutes to about 5 hours, about 1 hour to about 3 hours, or about 2 hours. The heating may be done in the presence of an inert gas, such as neon, argon, krypton, or xenon.

As illustrated in a step 1908, such methods may also optionally include disposing a Si-based layer 154 (e.g., crystalline Si and/or amorphous Si) on the nanoscale scaffold 152, prior to disposing the carbon-comprising polymer, in which case the carbon-comprising polymer is disposed on the Si-based layer 154.

As described herein, in the Examples set forth below, and in Provisional Patent Application No. 61/179,663, filed May 19, 2009, the disclosure of which is incorporated by reference herein in its entirety, the present invention overcomes the limitations of bulk silicon and harnesses the high charge capacity of silicon in the form of nanowires. The nanowires suitably have diameters in the 10's of nanometer range, and aspect ratios of about 1000. The nanowires are able to absorb the large volume changes caused by lithiation and delithiation during charging and discharging without losing their structural integrity.

The following Examples describe silicon nanowire (Si NW) performance in practice. For implementation in Li-ion batteries, the Si NWs are suitably used as a low-volume (about 5-30 weight %) filler in anodes. This approach allows for easy integration into existing product lines while still providing a significant boost in performance. An addition of 10% by weight of SiNW has been found to result in a battery anode capacity boost of about 30%-50%.

It will be readily apparent to one of ordinary skill in the relevant arts that other suitable modifications and adaptations to the methods and applications described herein can be made without departing from the scope of the invention or any embodiment thereof. Having now described the present invention in detail, the same will be more clearly understood by reference to the following examples, which are included herewith for purposes of illustration only and are not intended to be limiting of the invention.

EXAMPLES

Example 1: Preparation and Characterization of Si Nanowires

Growth and Shape of Si Nanowires

Figure 5B:
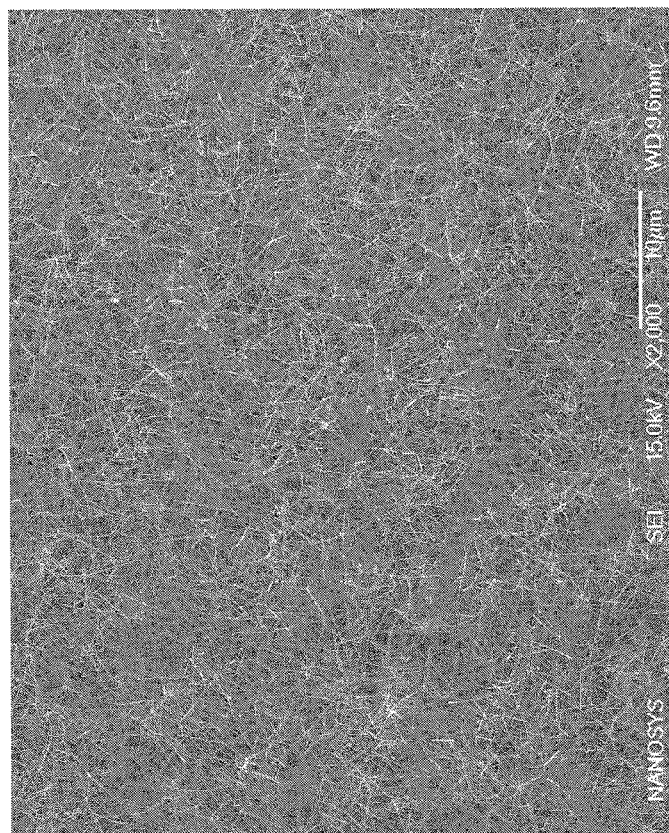
FIGS. 5A-5B show scanning electron microscopy (SEM) micrographs of nanowires grown with a high degree of straightness and verticality (A) and with a random, interweaving, intertwining and overlapping orientation (B).
Figure 5A:
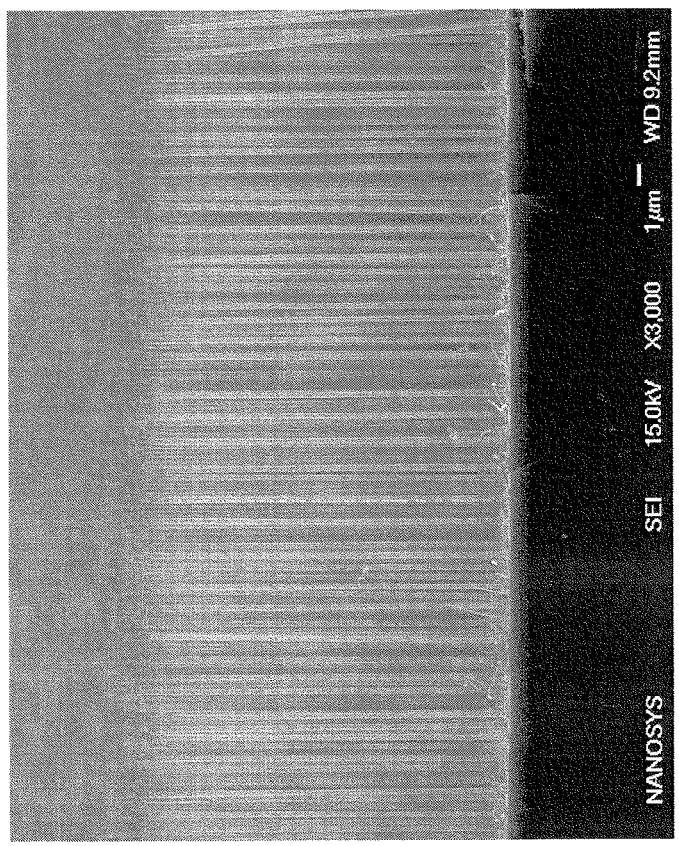

Vapor-liquid-solid (VLS) methods are utilized for growing Si nanowires. The wires are single crystalline with diameters between about 20 nm and about 200 nm and lengths between about 1 µm and about 50 µm. The growth processes allow for high degrees of freedom in the design of shape, size, composition etc. For example, nanowires are able to be manufactured that are substantially straight and with a yield of greater than about 99% (see FIG. 5A). For battery applications, an interwoven, interleaving or overlapping structure is suitably used (see FIG. 5B). The nanowires can also easily be doped, as well as grown as alloys or multi phase materials. Suitably, Si nanowires of approximately 20 nm-60 nm diameter in a core/shell configuration where the shell consists of a thin layer of carbon that is mostly covalently bonded to the silicon are produced. This carbon layer provides the path for electronic conductivity.

Suitable Growth Substrates for Silicon Nanowires for Battery Applications: Carbon Black, Graphite, Graphene The methods of the present invention can be utilized to prepare silicon nanowires on a variety of different substrate materials and form factors. For use as an additive to battery slurries, nanowires are suitably grown onto carbon black, graphite or on loose graphene nanosheet powder surfaces. In all three cases, it is very straightforward to mix the substrate/Si nanowire compositions/additives into anode materials. As described throughout, growing Si nanowires on graphene or carbon powders allows the structures to accommodate the large volume change during lithiation and delithiation of Si materials. Thus, the Si nanowire materials can be utilized directly in graphite based inks or slurries.

Figure 6:
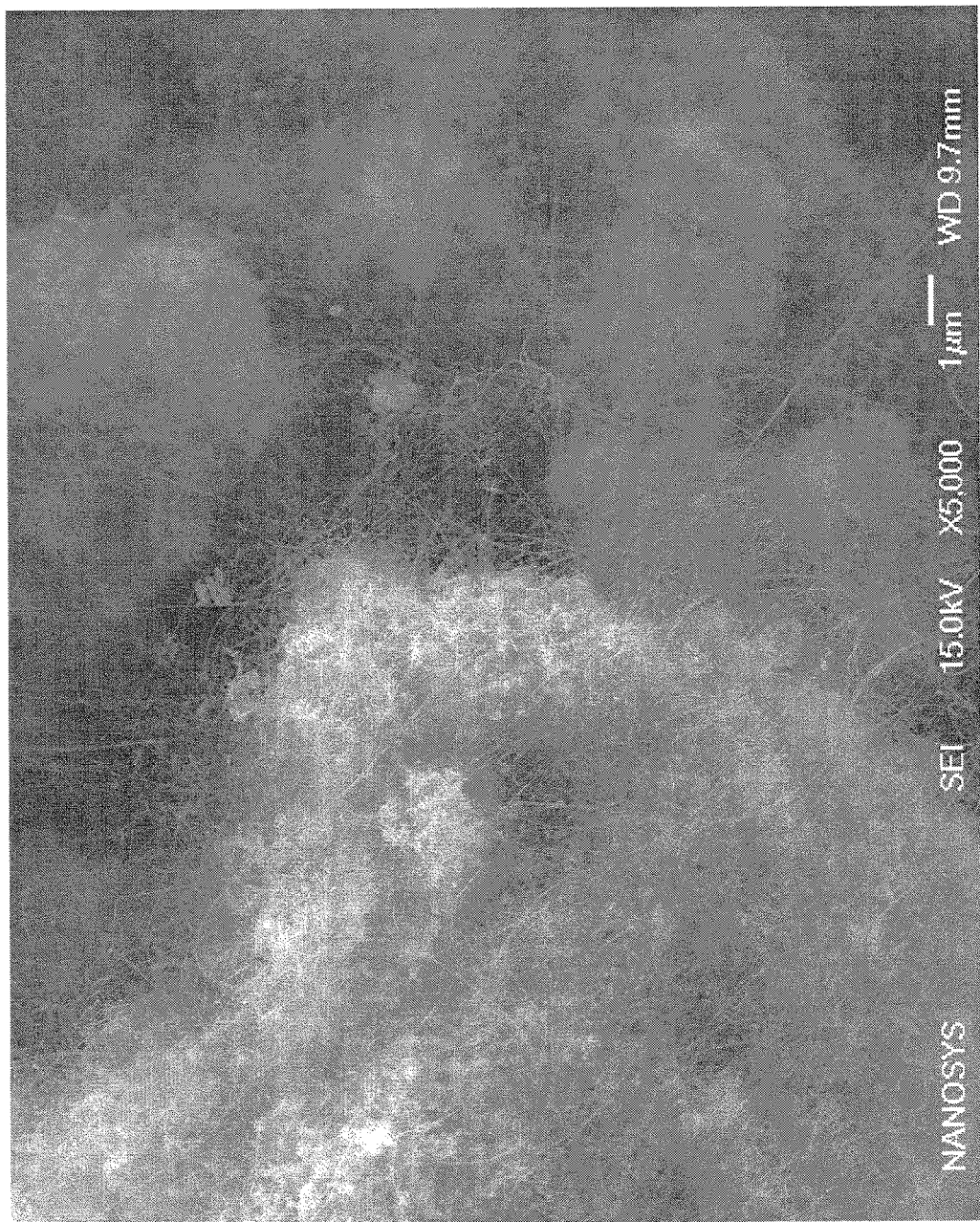
FIG. 6 shows an SEM micrograph of silicon nanowires grown on carbon black.

Carbon black is an effective growth substrate for the nanowires as well as a suitable matrix material for a battery anode, and can easily be integrated into slurry formulations. The nanowires can be grown on carbon black, as well as on other substrates, in densities that can be adjusted in a wide range and thus tailored to the desired performance characteristics. FIG. 6 shows an SEM micrograph of silicon nanowires grown on carbon black. The nanowires form an interwoven and overlapping network that provides a large amount of surface area and accessibility for lithiation and ionic and electron transport.

Figure 7B:
FIGS. 7A and 7B show SEM micrographs of silicon nanowires grown on graphite foil at low (A) and high (B) magnification.
Figure 7A:
Figure 24B:
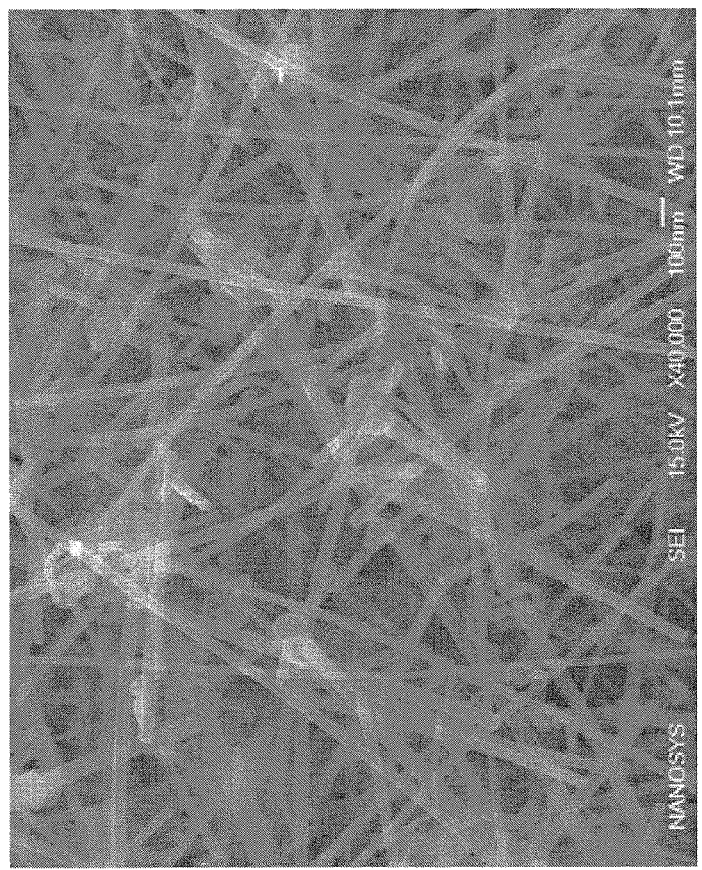
FIGS. 24A and 24B show SEM micrographs of silicon nanowires at low (A) and high (B) magnification.
Figure 24A:
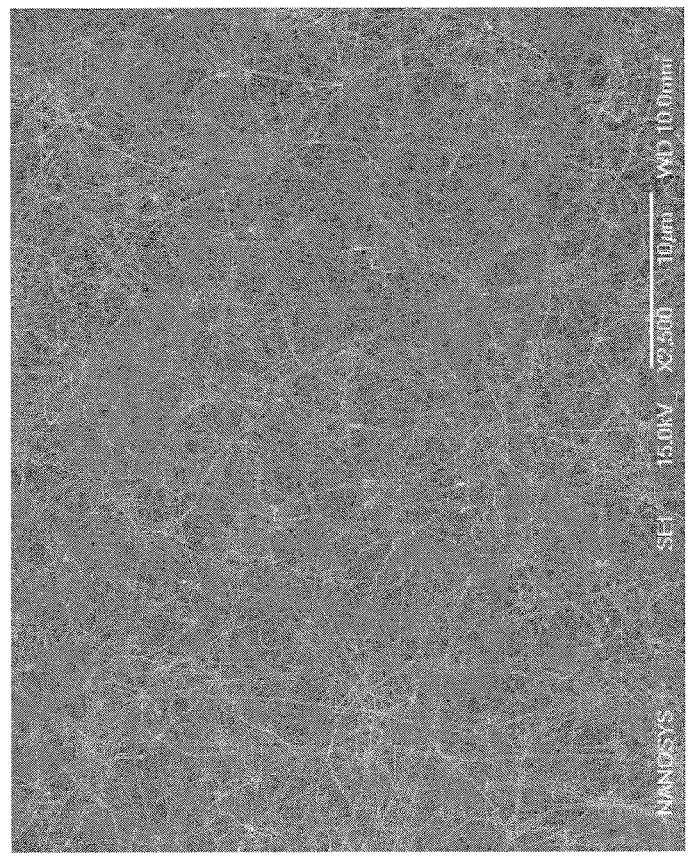

The micrographs in FIGS. 7A and 7B show Si nanowires grown on graphite foil, at high (A) and low (B) magnification. FIGS. 24A and 24B show Si nanowires at low magnification (A) and high magnification (B). The average diameter of the nanowires is about 45 nm.

Figure 8B:
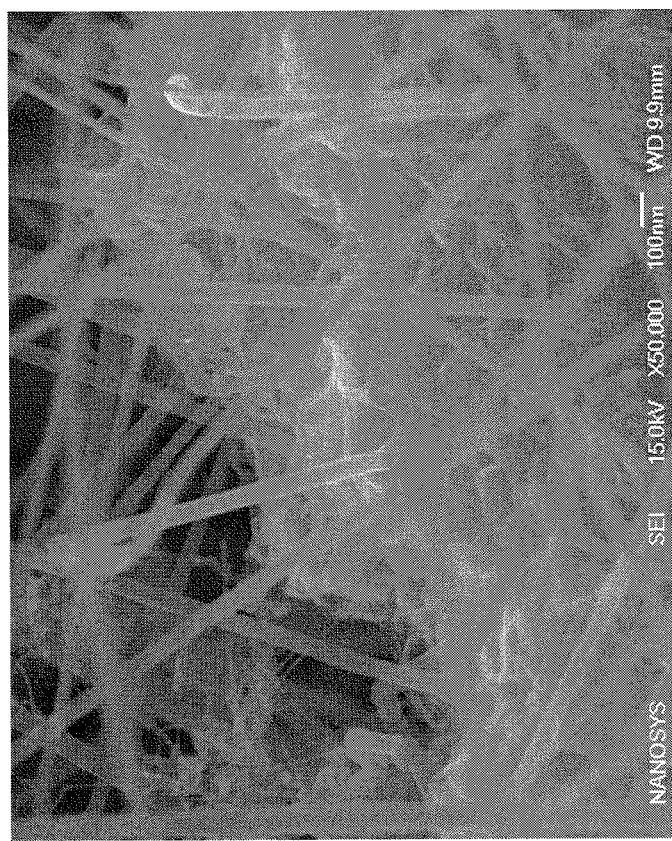
FIGS. 8A and 8B show SEM micrographs of loose graphene microsheet powders (A) and silicon nanowires grown on the graphene powder (B).
Figure 8A:
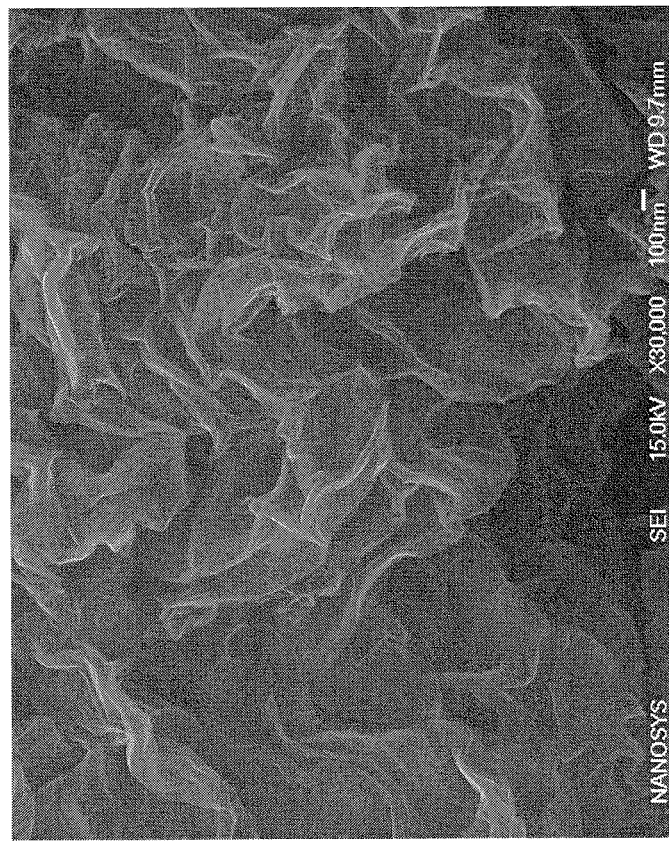

FIGS. 8A and 8B show SEM micrographs of loose graphene microsheet powders (A) and silicon nanowires grown on the graphene powder (B). The average diameter of the nanowires is 50 nm. Si nanowires grown on the nano or micro graphene nanosheet powders provide high surface area and high mechanical flexibility to the additives. Both graphite foil and graphene powder allow for accommodation of the volume change of the Si nanowires and provide high electronic conductivity.

Figure 9:
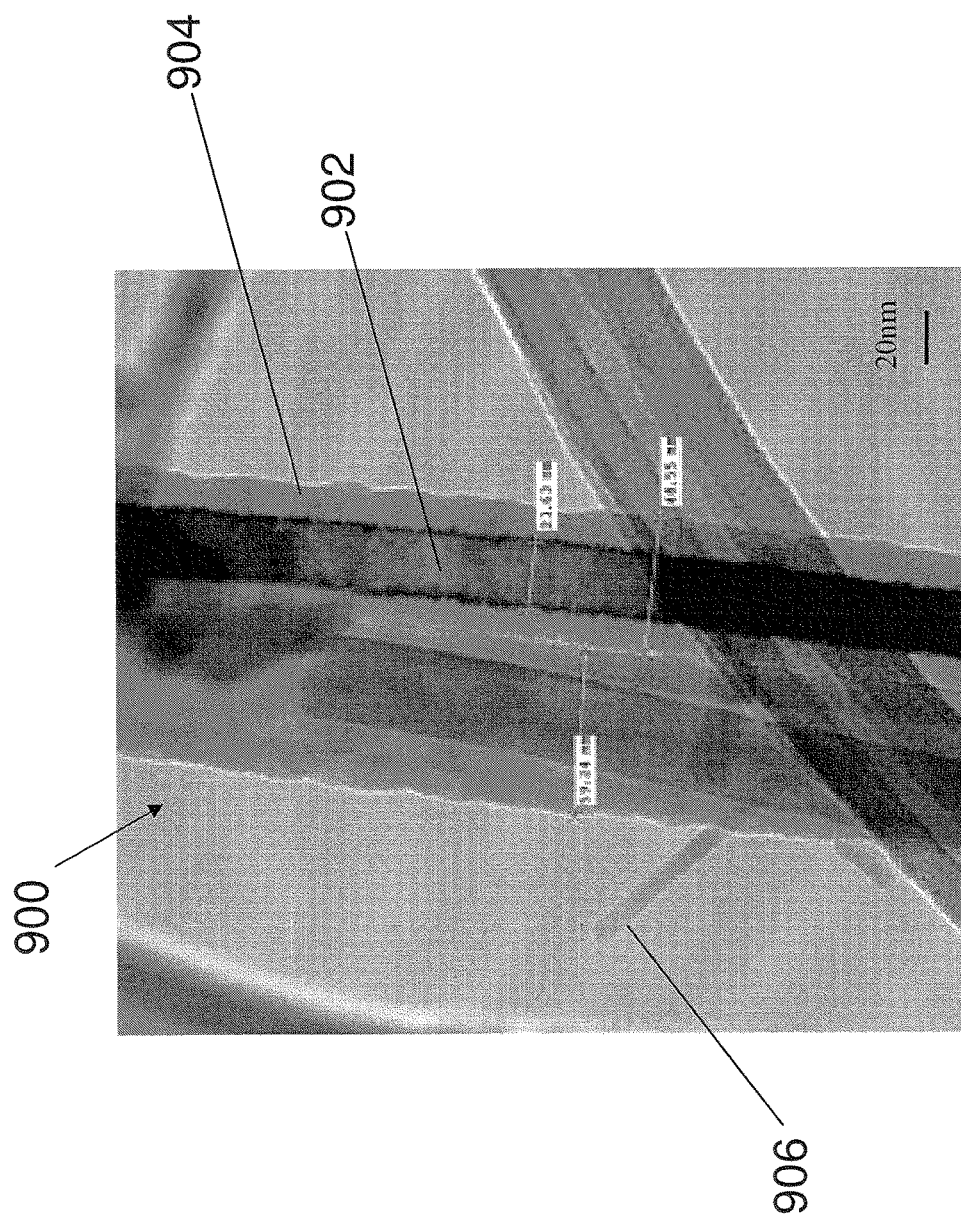
FIG. 9 shows a transmission electron microscopy (TEM) micrograph of silicon nanowires with a crystalline core and amorphous shell.

FIG. 9 shows a transmission electron microscopy (TEM) micrograph of silicon nanowires 900 with a crystalline core 902 and amorphous shell 904. Si nanowires suitably have a core-shell structure with adjustable core to shell diameter ratios. The core is crystalline and the shell amorphous. The final surface layer is an electronically conductive thin layer of carbon that is mostly covalently bonded to the shell. Nanowires have radial dimensions on the order of about one hundred atomic radii, and thus upon lithiation, allow lattice strain to be absorbed elastically. When the strain becomes too large to be accommodated elastically, a phase transformation from crystalline to amorphous Si occurs. Upon continuous incorporation of lithium atoms into the crystal, the nanowires eventually accommodate the increasing strain through plastic deformation and the creation of protrusions or leaf-like structures 906 extending from the surface of the nanowires.

These protrusions in thin film material result in a reduction of the conductivity of the Si material itself, and hence decrease the capacity of Si material over cycling. However, in the case of Si core nanowires coated with a C shell, these protrusions provide the benefit of creating more surface area and even shorter diffusion paths for the lithium ions as compared to a smooth nanowire. In addition, loss in electronic conductivity is avoided by the presence of carbon on the wire surface and carbon powders or graphite powders in the electrode. This extra surface area provides an increase, rather than a decrease, in the capacity of a battery anode containing Si nanowires of the present invention with increasing number of charge cycles.

Nanowires provide a continuous electronic conduction path that does not appear to be achieved at the same level with spherical nanoparticles. Spheres by their very nature only have a limited number of sphere-to-sphere point contacts that contribute to electronic conductivity. Nanowires also provide an additional degree of freedom in adjusting the porosity.

Figure 25B:
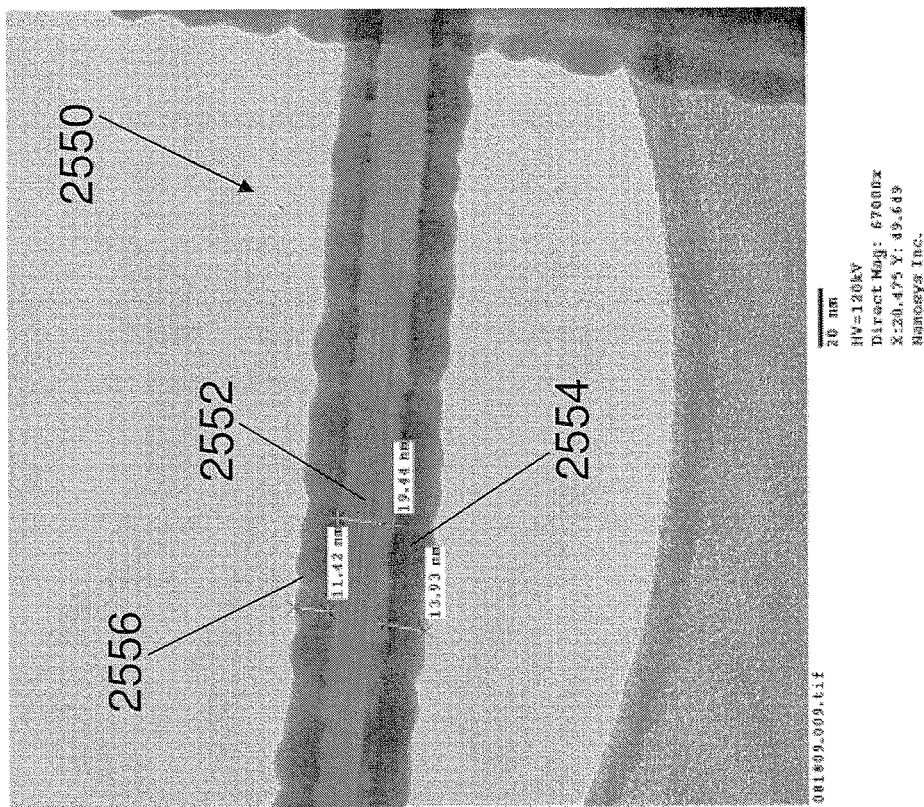
FIGS. 25A and 25B show TEM micrographs of silicon nanowires with a crystalline core and a combination of an amorphous Si and poly-Si shell.
Figure 25A:
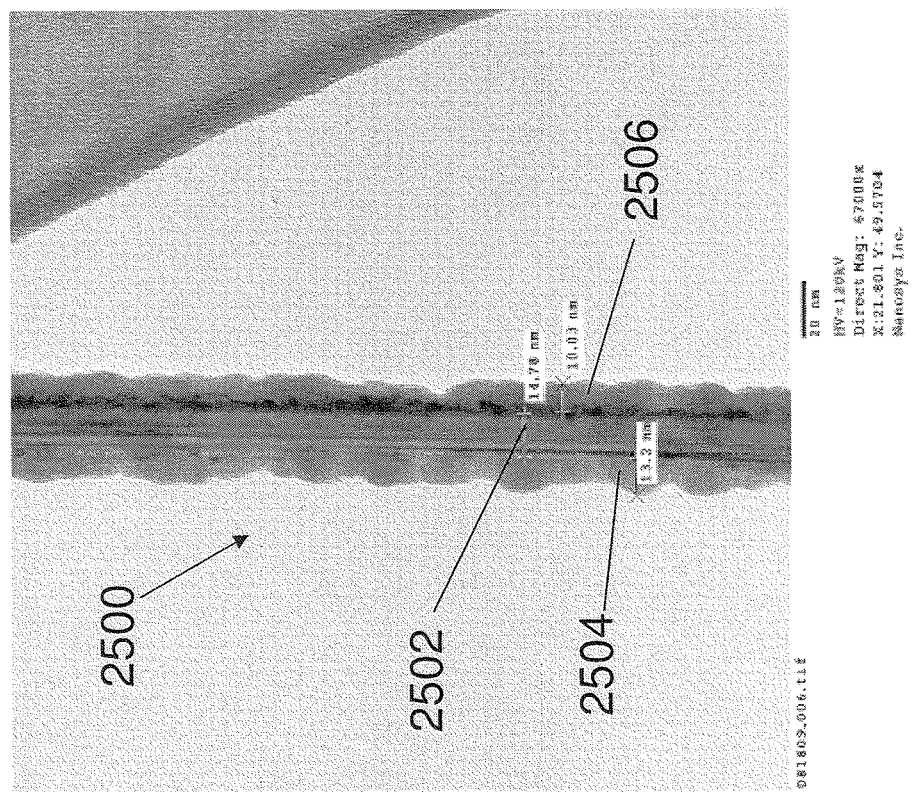

FIGS. 25A and 25B show TEM micrographs of silicon nanowires with a crystalline core (about 15 to 20 nm thick) and a combination of an amorphous (Si—O may be involved) and poly-Si shell (about 10 to 15 nm thick) covered by a carbon shell. Referring to FIG. 25A, silicon nanowire 2500 has a crystalline core 2502 of approximately 14.76 nm with a carbon shell, comprising a first side 2504 and a second side 2506. The first side 2504 of the carbon shell has a thickness of approximately 13.2 nm, and the second side 2506 of the carbon shell has a thickness of approximately 10.03 nm. Referring to FIG. 25B, silicon nanowire 2550 has a crystalline core 2552 of approximately 19.44 nm with a carbon shell, comprising a first side 2554 and a second side 2556. The first side 2554 of the carbon shell has a thickness of approximately 13.93 nm, and the second side 2556 of the carbon shell has a thickness of approximately 11.42 nm.

Capacity of Si Nanowires on a Stainless Steel Electrode with Lithium Foil Counter Electrode In order to measure the charge capacity and cycle efficiency of Si nanowires, the nanowires were grown on a steel substrate as an anode, and used in conjunction with lithium foil as the counter electrode.

Figure 10:
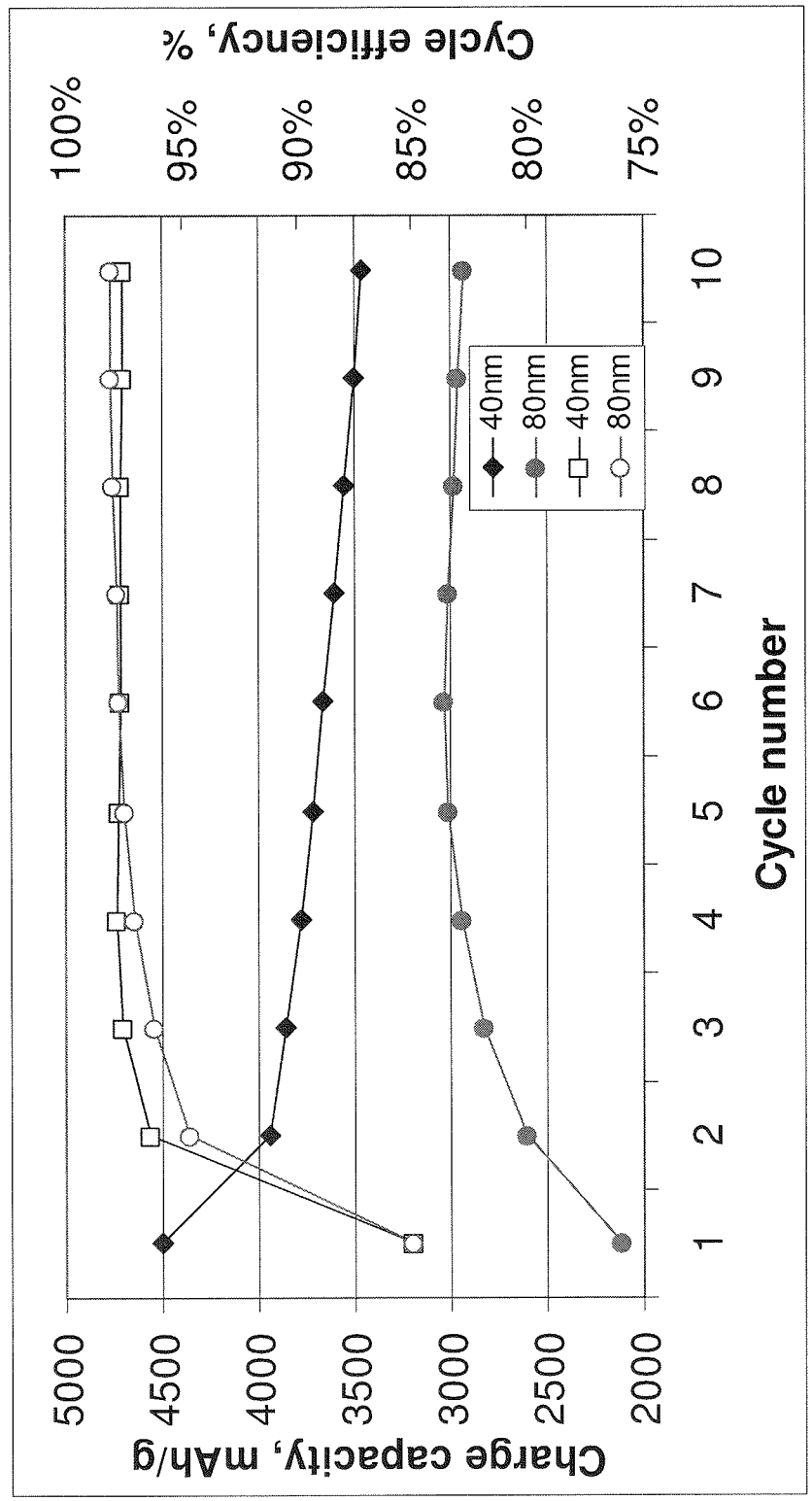
FIG. 10 shows charge capacity (solid markers) and cycle efficiencies (open markers) for silicon nanowires with two different diameters grown on steel substrates.

FIG. 10 shows the charge capacity and cycle efficiencies for nanowires with two different diameters. The thinner (40 nm) diameter wires (solid diamonds in the figure) achieve the theoretical capacity of bulk silicon of 4200 mAh/g maximum capacity during the first cycle, with a first cycle efficiency of 85% (open squares in the figure). The charge capacity decreases with increasing number of cycles, which is an artifact of the experimental arrangement and caused by the lack of binder and additives. Thicker (80 nm) nanowires demonstrate a smaller (2110 mAh/g) initial capacity (solid circles in the figure) that increases with increasing charge cycle number. This behavior can be understood by the fact that the diffusion distances for Li are longer and the strain relaxation via surface protrusions more difficult. The first-cycle loss in this case is 15% as well (open circles in the figure).

These measurements clearly demonstrate the theoretical charge capacity can be demonstrated with 40 nm thick wires. As described below, these Si nanowires have been used to develop an electrode that provides an enhanced capacity that can be maintained for 80 cycles without little to no reduction.

Comparison of Silicon Nanowires with Silicon Thin Films and Powder

Figure 11:
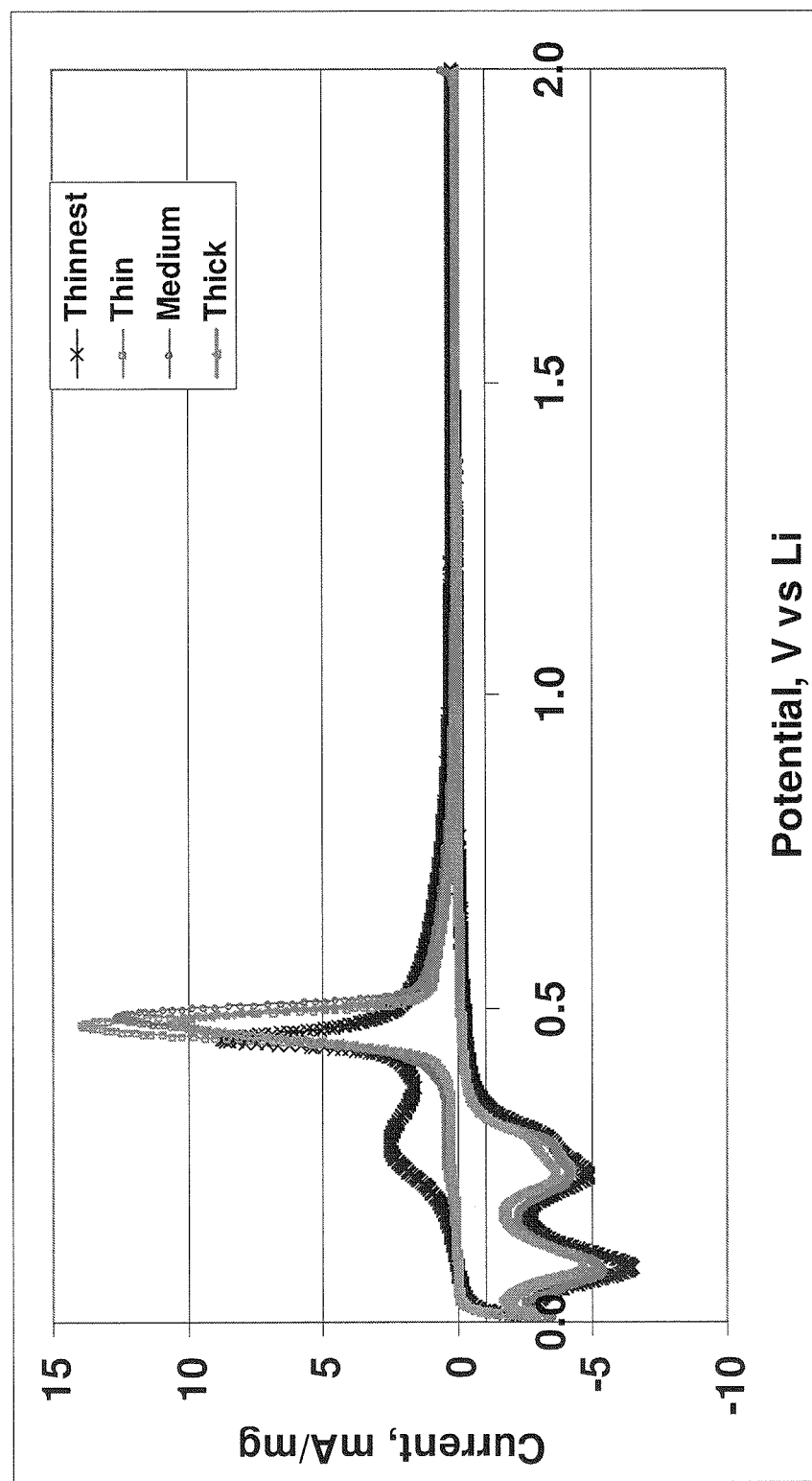
FIG. 11 shows current versus potential curves for silicon nanowires with different diameters grown on stainless steel substrate.

Si nanowires behave quite differently than Si thin films, bulk Si, or Si powders. When silicon nanowires are produced on a stainless steel substrate, a thin layer of silicon is also produced on the stainless substrate between the bases of the nanowires. The measurements provided herein therefore contain contributions from both the nanowires and the Si thin film. FIG. 11 shows the current versus potential curves taken at 0.1 mV/s for Si NWs with different diameters. The sharp peaks at 0.48 V are directly related to the Si nanowires. The feature at 0.29 V is the signature of silicon in the form of thin films. For very thin wires, the volume fraction of the thin film becomes large enough for its contribution to contribute to the current versus potential scan. The very large current at the charging peak of the silicon is part of the reason why nanowires allow for quick charging.

Figure 12:
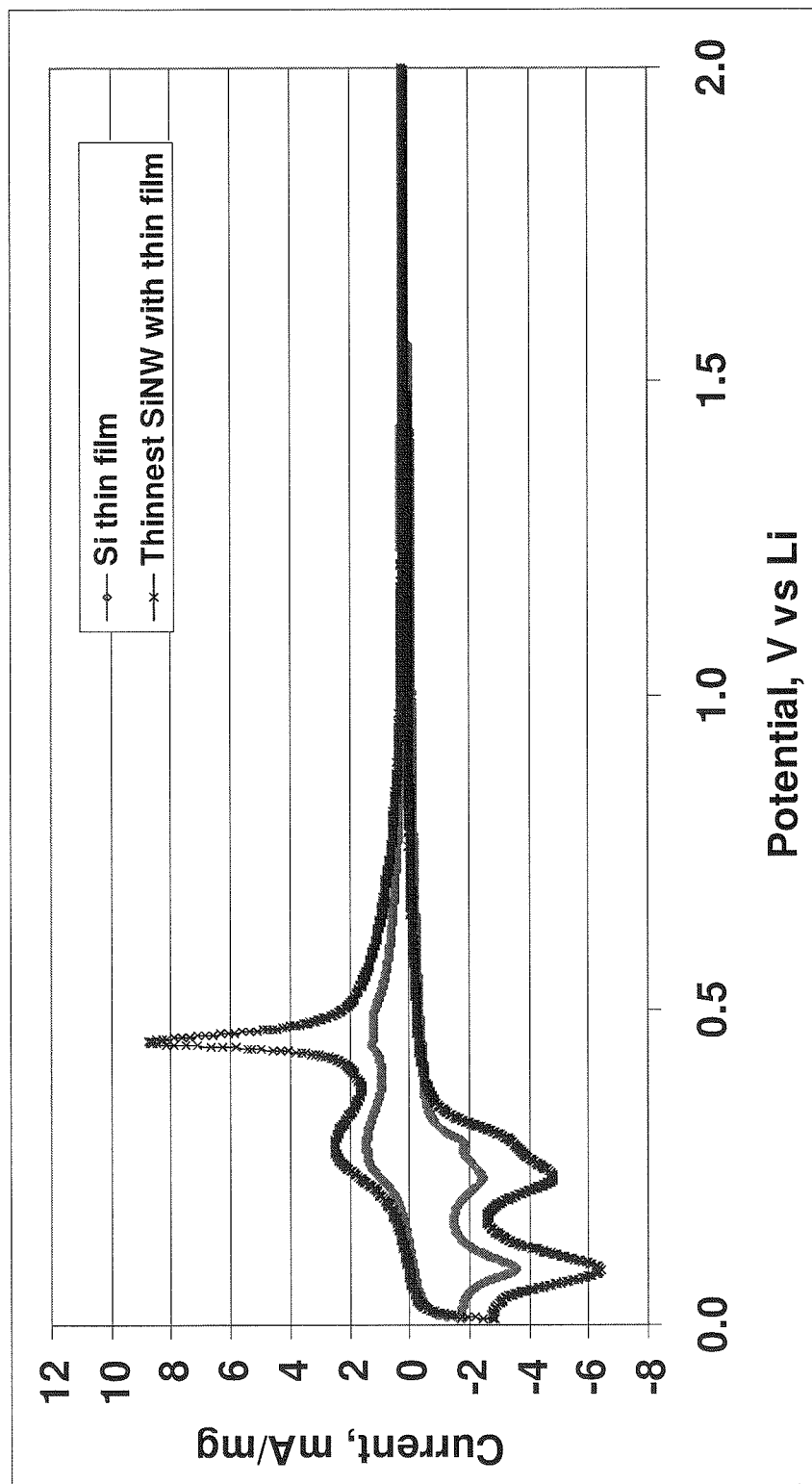
FIG. 12 shows current versus potential curves for a silicon thin film and silicon thin film plus silicon nanowires, both grown on stainless steel substrates.

A distinctly different behavior can be seen in FIG. 12, where a silicon thin film without nanowires is compared to a thin film with nanowires. For the scan on the sample with nanowires, the extra peak close to 0.5 V is observed.

Figure 26:
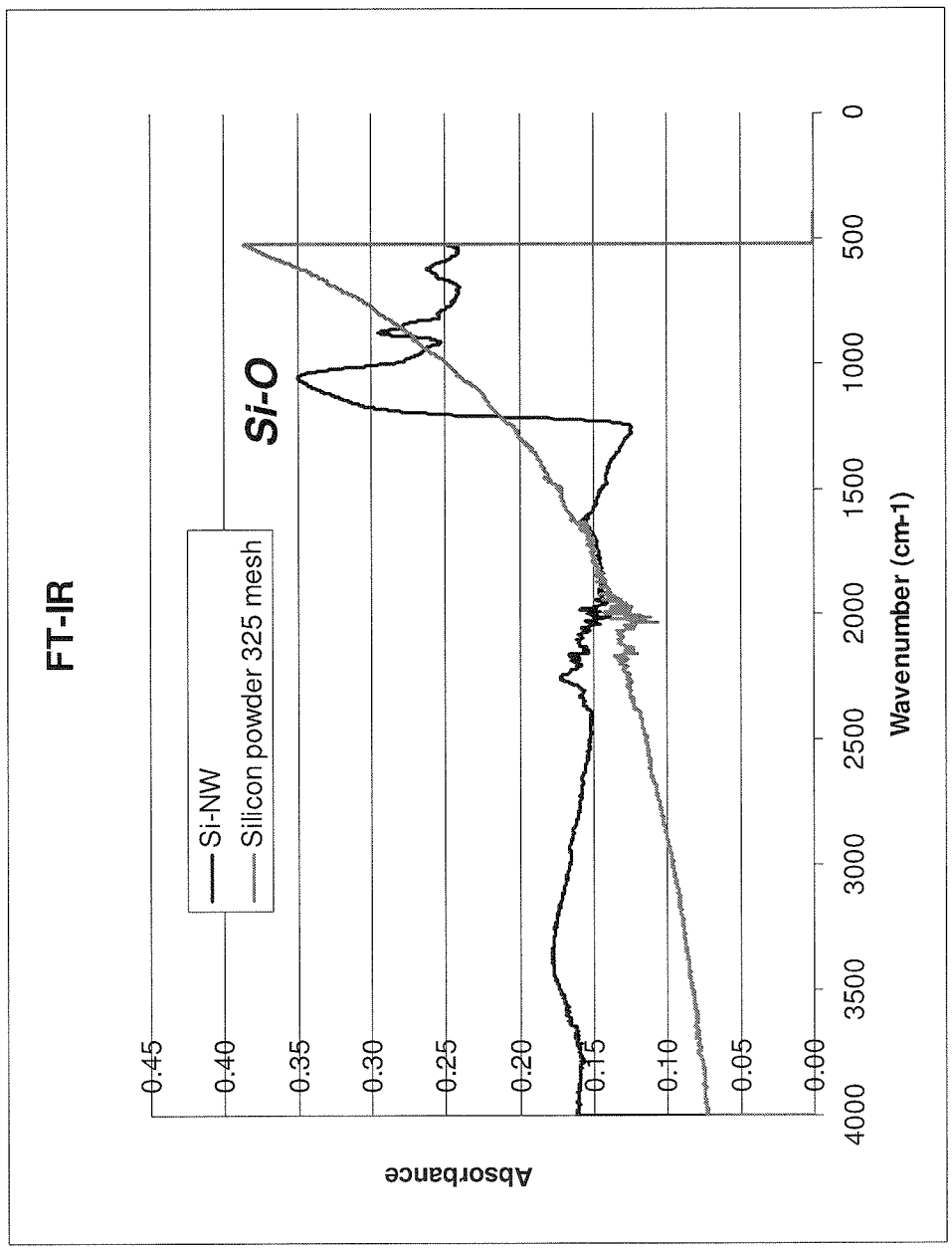
FIG. 26 shows Fourier Transform Infrared Spectroscopy (FTIR) measurements, illustrating differences between SiNWs and Si powders.

FIG. 26 shows Fourier Transform Infrared Spectroscopy (FTIR) measurements, illustrating differences between SiNWs and Si powders. The FTIR suggests that Si—O stretches at approximately 1070 cm$^{-1}$, indicating that $SiO_2$ may exist in the shell materials.

Carbon Coating on Si Nanowires

A carbon coating suitably improves the conductivity of Si nanowires and the ability to integrate the Si nanowires into carbon-based slurries for lithium-ion batteries. A carbon-based polymer (such as, SBR, CMC, PVDF, etc.) is typically used as a binder in the battery slurries. In embodiments, the binder is used as a carbon source for carbon coating on the Si nanowires. Carbonizing the carbon-based polymer to form a carbon coating on Si nanowires may also improve the interaction between the carbon-based polymer and the carbon coating on the Si nanowires.

Figures 21A, 21B:
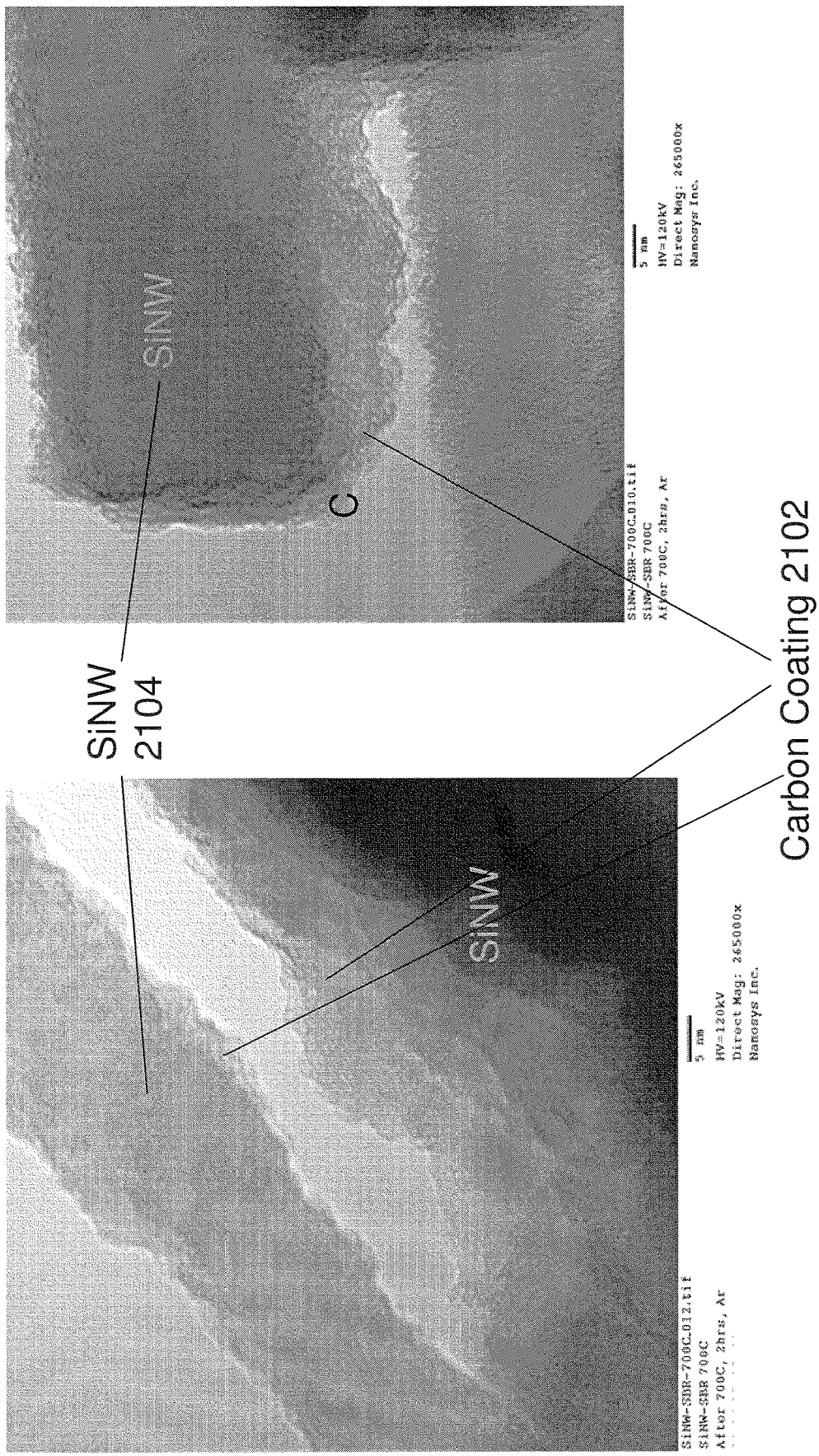
FIGS. 21A-21B show micrographs of a nanostructure comprising a carbon coating in accordance with an embodiment of the present invention.

FIGS. 21A and 21B are micrographs that show Si nanowires 2104 that have a carbon coating 2102. The carbon coating 2102 was achieved by decomposing SBR (styrene butadiene rubber). In this example, Si nanowires 2104 were mixed with SBR and then heated to about 700° C. for 2 hours in the presence of Argon to form carbon coating 2102.

Figure 22:
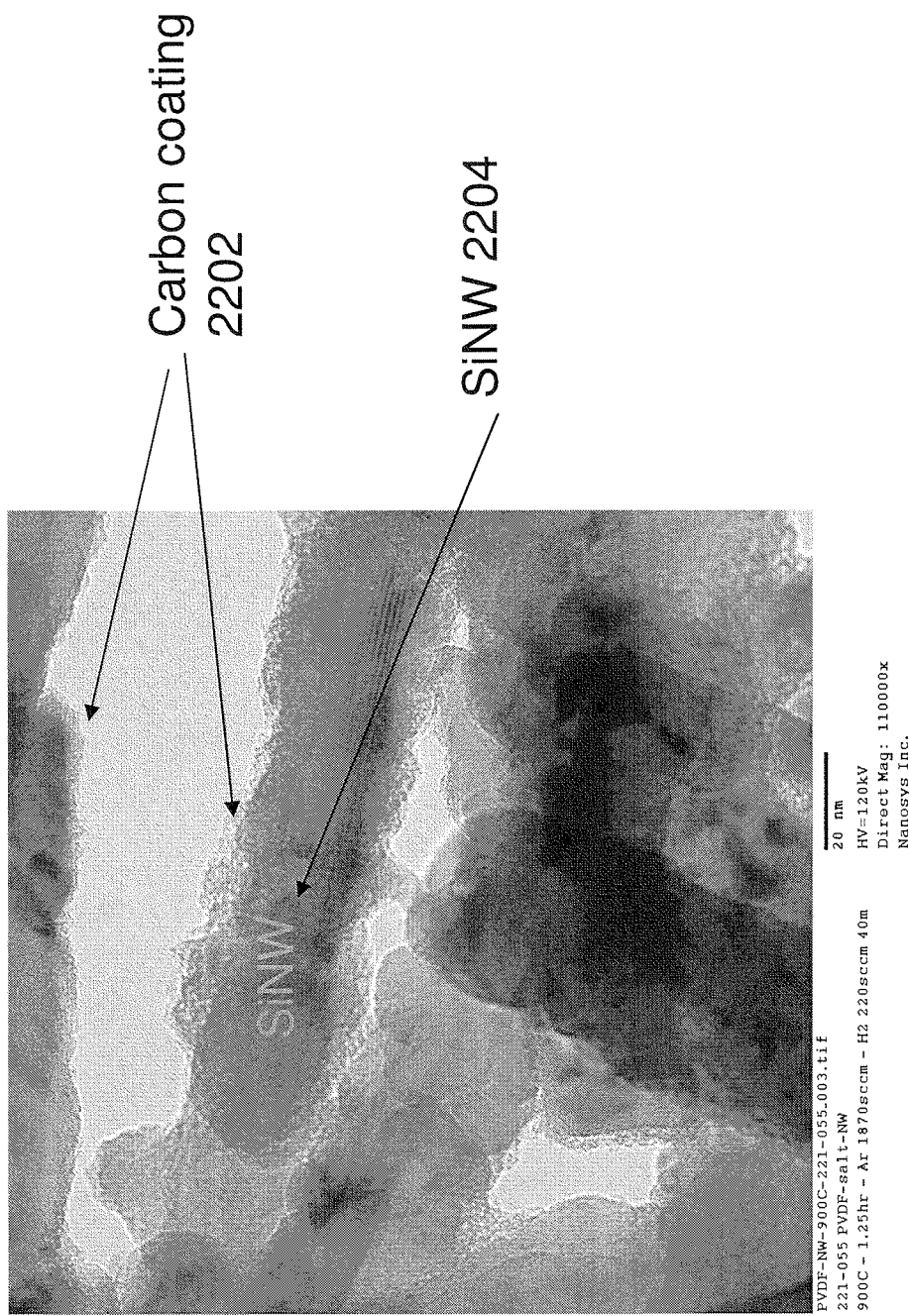
FIG. 22 shows a micrograph of a nanostructure comprising a carbon coating in accordance with another embodiment of the present invention.

FIG. 22 is a micrograph that shows Si nanowires 2204 that have a carbon coating 2202. The carbon coating 2202 was achieved by decomposing PVDF (poly(vinylidenefluoride)). In this example, Si nanowires 2204 were mixed with PVDF and then heated to about 900° C. for 2 hours in the presence of Argon to form carbon coating 2202.

Si nanowires that have a carbon coating (e.g., a surface layer of carbon or a carbon shell) show a better cycling performance when used in a lithium-ion battery. The improved performance may be due to formation of passivating films on the surface of electrode materials, especially for Si and carbon-coated Si.

Figure 23C:
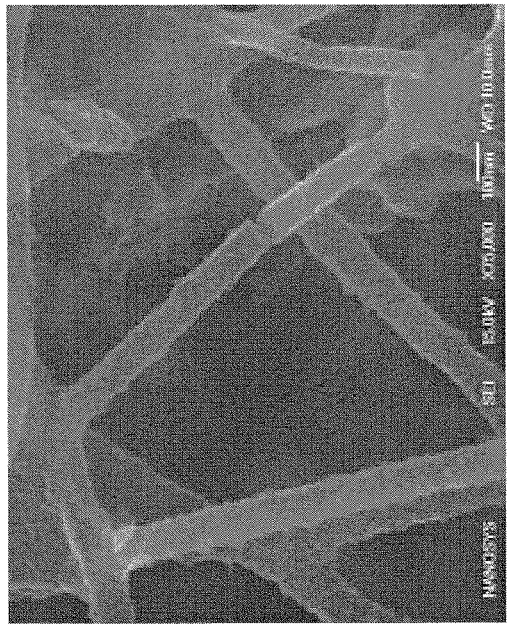
FIGS. 23A-23D show micrographs of nanostructures of embodiments of the present invention, illustrating morphology changes after several charge/discharge cycles.
Figure 23D:
Figure 23A:
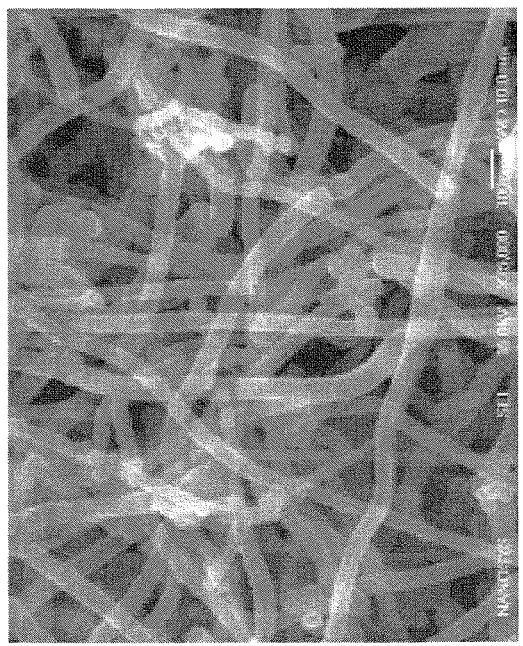
Figure 23B:
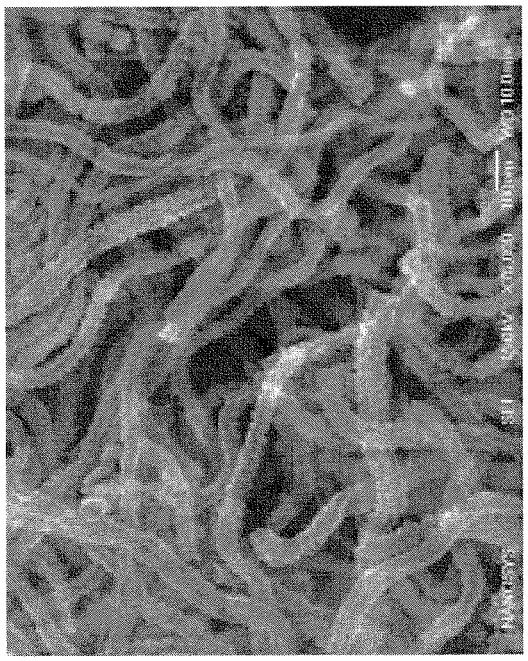

FIGS. 23A and 23B are micrographs that show Si nanowires of embodiments of the present invention after several charge/discharges cycles. FIG. 23A illustrates that significant morphology changes did not occur after 2 charge/discharge cycles. FIG. 23B illustrates that the Si nanowires became more porous after 10 charge/discharge cycles.

FIGS. 23C and 23D are micrographs that show carbon-coated Si nanowires of embodiments of the present invention after several charge/discharge cycles. The Si nanowires in these figures were carbon coated using decomposed PVDF. After 2 charge/discharge cycles, as illustrated in FIG. 23C, there was not significant morphology changes in the carbon-coated Si nanowires, and the carbon coating is still intact. After 10 charge/discharge cycles, as illustrated in FIG. 23D, there was not significant morphology changes in the carbon-coated Si nanowires, but the carbon coating split along the length of the Si nanowires.

Figure 13:
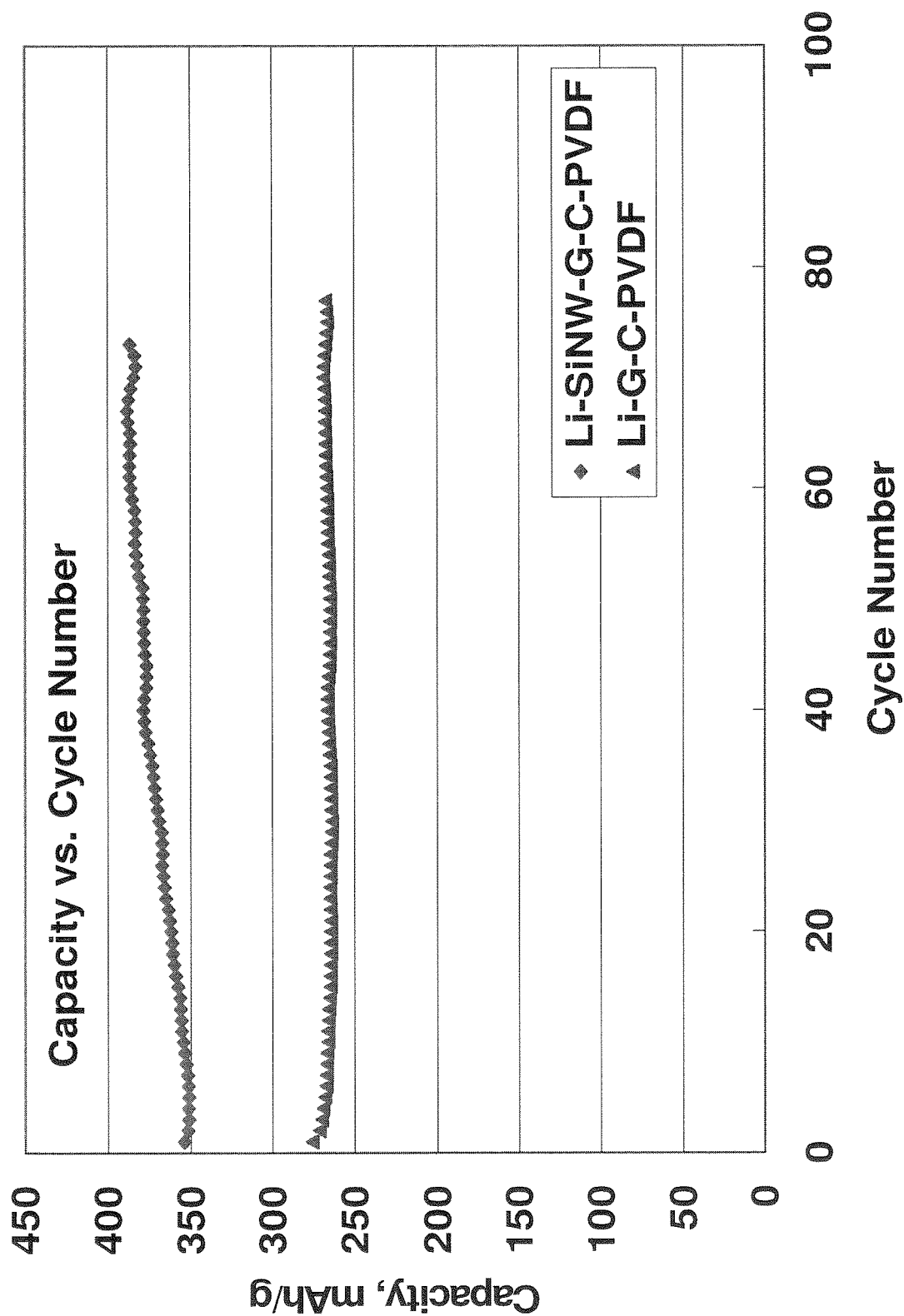
FIG. 13 shows capacity as a function of Charge/Discharge Cycle comparing compositions of the present invention to control compositions.
Figure 14:
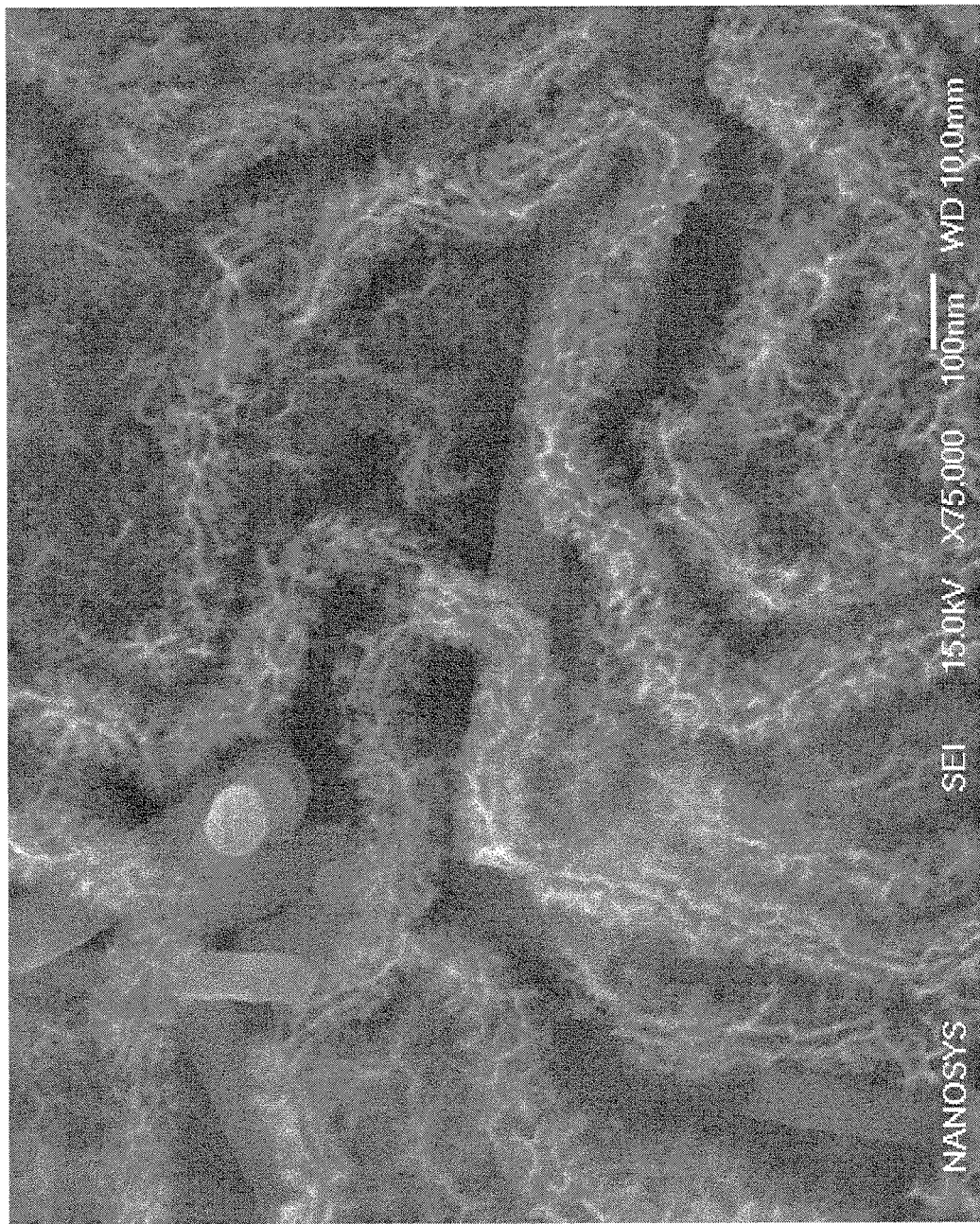
FIG. 14 shows an SEM micrograph of silicon nanowires after 60 charge cycles.

Example 2: Preparation and Characterization of Anodes Using Nanowire-Carbon-Based Substrate Additives Increased Anode Capacity and Cycle Life To approximate commercial battery formulations and for purposes of a baseline and control, a mixture of 80% graphite with 10% carbon and 10% PVDF (Li-G-C-PVDF) was utilized as a battery slurry. To determine the capacity of the nanowire materials of the present invention, 10% of the graphite was replaced with 10% Si Nanowire material (Li—SiNW-G-C-PVDF). FIG. 13 shows a resulting increase in capacity when using the nanowires. The capacity gain is initially 30% and continues to increase to 50% after about 60 charge/discharge cycles. The increase in capacity with number of cycles can be explained by examining an SEM micrograph of the structure of the Si NWs after a few cycles (FIG. 14). The formerly smooth nanowire surfaces become microstructured, increasing the surface area, thus increasing the interfacial area between silicon and ion conductor and shortening the diffusion paths for Li in the Si nanowires.

Figure 27:
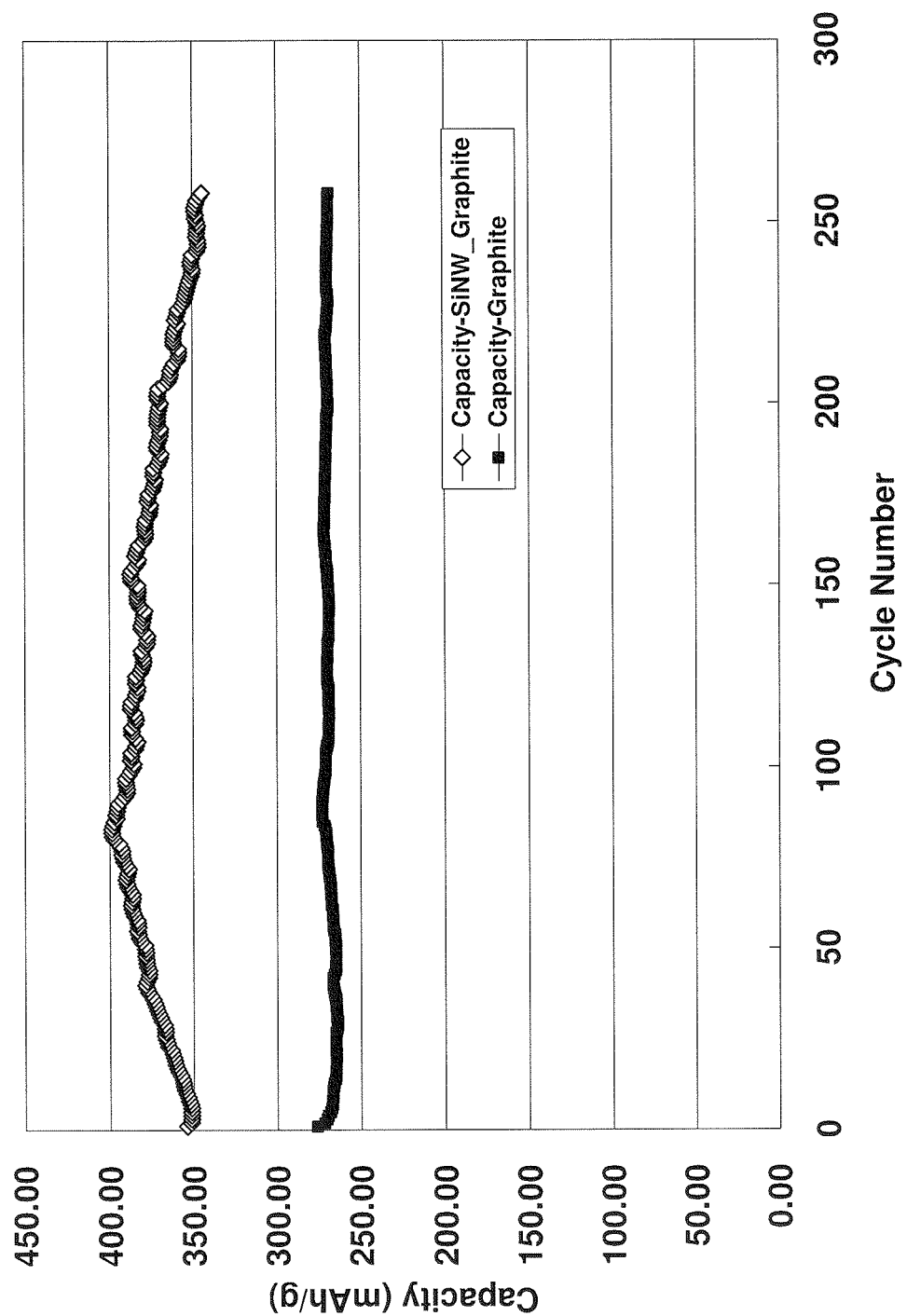
FIG. 27 shows a graph of capacity as a function of cycle number for a first anode comprising 10% Si nanowires, 10% PVDF, and 80% graphite carbon, and a second anode comprising only graphite carbon and PVDF.

FIG. 27 shows a graph of capacity as a function of cycle number for a first anode comprising 10% Si nanowires, 10% PVDF, and 80% graphite carbon, and a second anode comprising only graphite carbon and PVDF. The cycling performances were obtained with the cells after 10 constant voltage (CV) and 3 constant current (CC) cycles. The cycling results shown in FIG. 27 were tested using CC cycles of about 1.5 hours/half cycle. For the first anode (comprising Si nanowires, graphite, and PVDF), a capacity gain of more than 30% was achieved in 250 cycles.

Li Ion Battery: Fast Response Rates to Current Pulse for Nanowire Material

Figure 15:
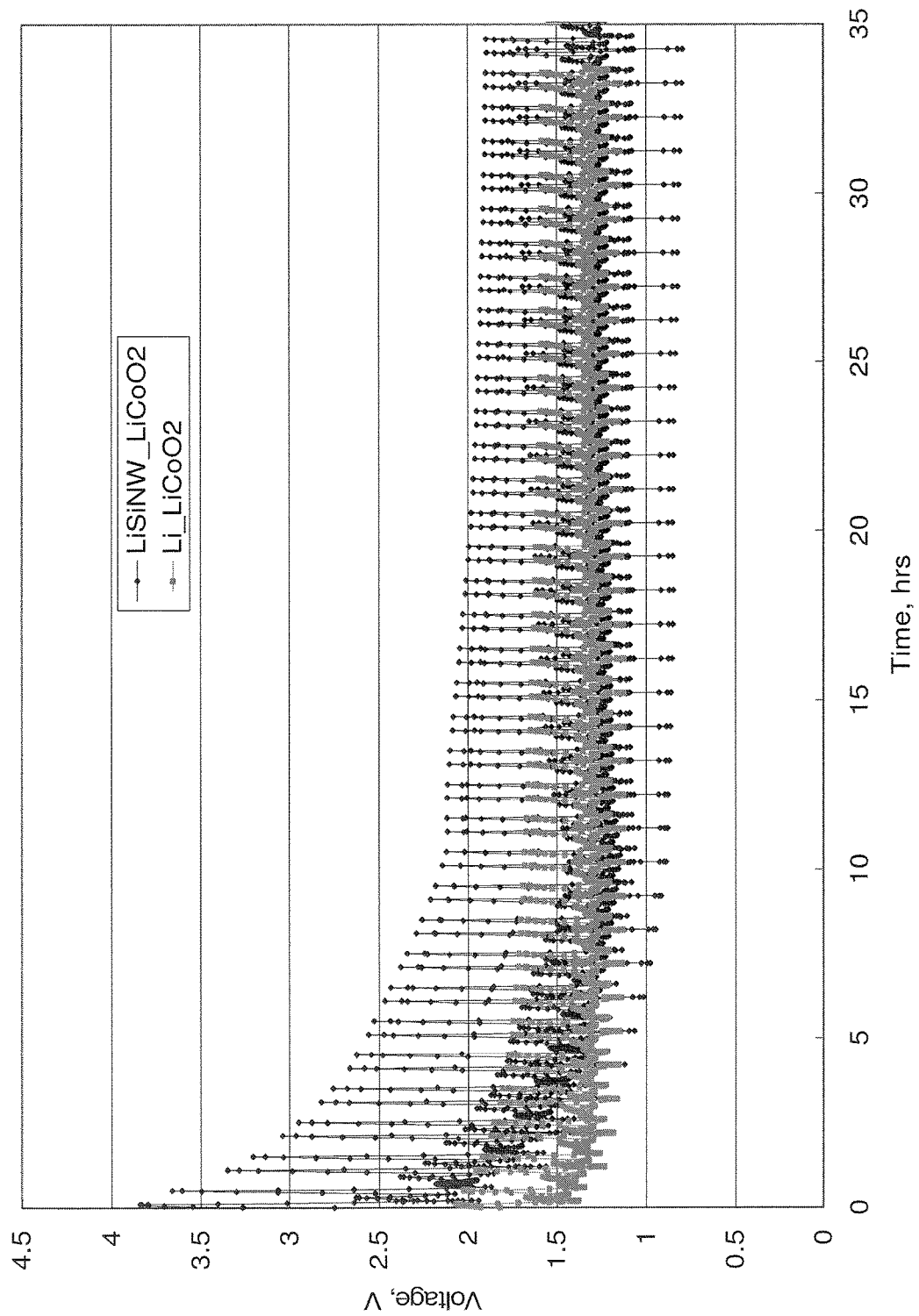
FIG. 15 shows a comparison of the fast charge cycling behavior of a cell comprising a Li-silicon nanowire anode/LiCO$_2$ cathode compared to a Li anode/LiCO$_2$ cathode control cell.

FIG. 15 shows the charge cycling behavior of a Li SiNW anode/Li CoO2 cathode cell as compared to the same cell without nanowires as control. The cell containing the nanowires in the anode exhibits very fast response rate to various current pulses (e.g., at 1 mA in 3-second time slots). This fast rate can be attributed to a large surface area and short diffusion paths for Li ions, as well as a unique network structure providing efficient electronic conduction.

Uniform Distribution of Polymer Binder

Figure 16:
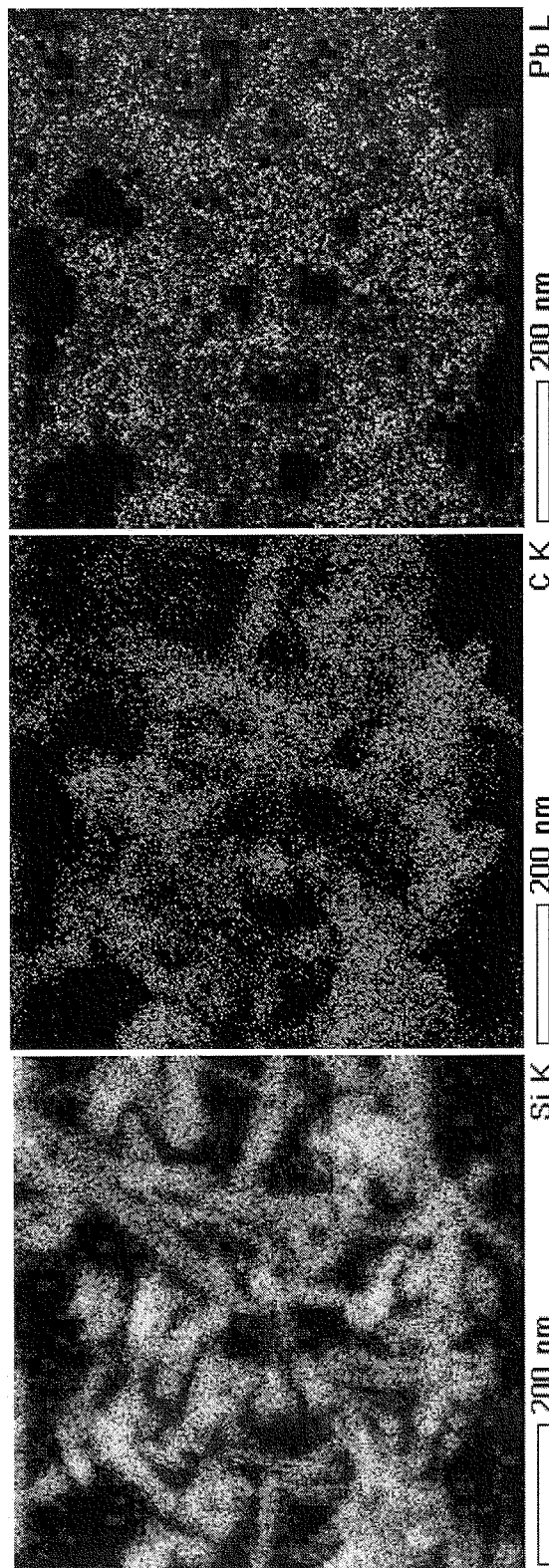
FIGS. 16A-16C show scanning transmission electron microscope (STEM) Energy Dispersive X-ray (EDX) micrographs revealing the uniform and homogenous distribution of carbon (16B) and lead (Pb) as marker for NAFION® (16C) on the silicon nanowire network (16A).

As described herein, suitably the nanowires of the additives of the present invention are arranged in an interwoven, interleaving or overlapping network. For an efficient battery design, however, it is important to uniformly distribute carbon as well as the binder (e.g., conductive polymer or "polymer binder"). In order to demonstrate the uniform distribution of polymer, lead (Pb)-stained NAFION® was used as a model substance that could be tracked using Energy Dispersive X-Ray (EDX) analysis. FIGS. 16A-16C show scanning transmission electron microscope (STEM) EDX elemental maps of Si nanowires (16A), carbon (16B), and Pb (16C) demonstrating the uniform distribution of C and binder on the Si nanowires. The nanowire network surface area can be adjusted to 30-100 m$^2$/g for 20-60 nm nanowires, which is substantially larger than that of graphite powders (~1 m$^2$/g) in commercial batteries.

Heat-treated battery electrodes may improve binder distribution and, therefore, may lead to better cycling. In one example, a foil with PVDF-SiNW-graphite-conductive carbon black was heated at 300° C. under 4% hydrogen in Argon for 8 hours. The melting point of PVDF is about 160° C. The onset temperature of PVDF decomposition is higher than 350° C., so 300° C. is an effective temperature for heat treatments of embodiments of the present invention.

Heat-treated Si nanowire-graphite-PVDF electrodes may improve adhesion to the current collector (e.g., Cu) and, more importantly, may make a relatively dense/uniform coating layer. The improved adhesion of the coating layers on the current collector may lead to better cycling performance. In addition, a better interaction between the binder and active material powders may also result in reduced changes in the solid electrolyte interphase (SEI), which also influences cycling performances.

Manufacturing and Integration into Existing Slurry Preparations

As described herein, Si nanowires can be disposed on a number of substrates. Using the methods described throughout, nanowire diameter (e.g., 20-200 nm), length (e.g., to about 50 µm), taper (usually targeted to be zero), size distribution (>+/−20% full width at half-maximum), and doping (if desired), over a wide range and with high yield, can be readily controlled. Nanowires with Si cores and SiC shells with adjustable core/shell ratios and graphitic surface layers can be readily produced. Production output has been scaled-up by 100× from the lab scale and successfully tested in a prototype for a manufacturing line designed for high volume (50 tons of Si NWs per year) production.

Figure 17:
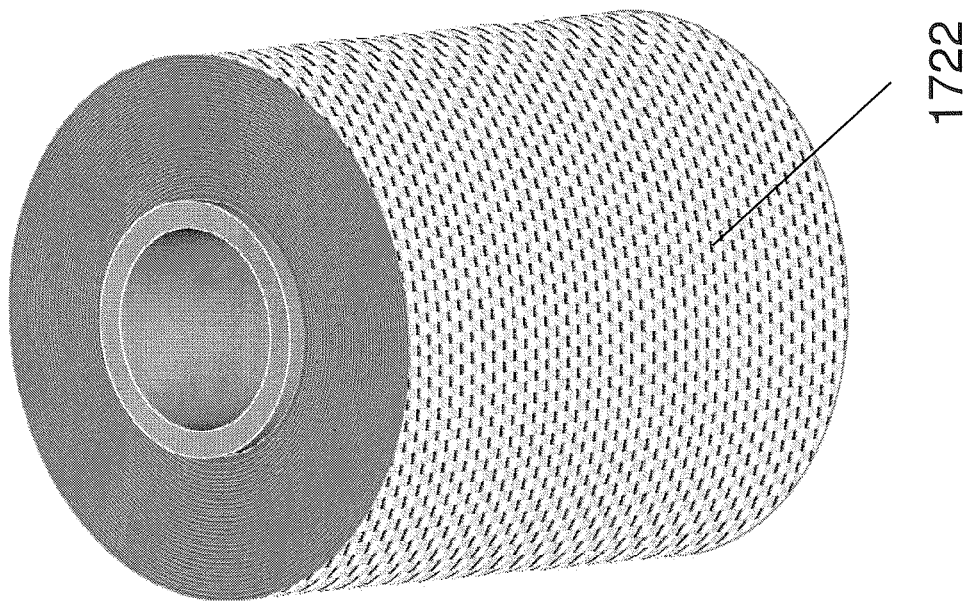
FIG. 17 shows an exemplary process for producing nanowires in accordance with and embodiment of the present invention.

An exemplary manufacturing process is shown in FIG. 17. This process utilizes a high volume, high density method of growing nanowires as disclosed in U.S. Provisional Patent Application No. 61/221,501, filed Jun. 29, 2009, entitled "Methods for Growth of High Density Nanowires," and in U.S. Provisional Patent Application No. 61/179,663, filed May 19, 2009. The growth of Si nanowires suitably utilizes nanowire nucleation from gold colloid catalysts in a silicon-rich chemical vapor deposition environment. As set forth in FIG. 17, the production methods shown in flowchart 1700, suitably comprise step 1702, in which an aluminum foil is embossed. In step 1704, the foil is then cleaned using conventional solvents, and in step 1706 a substrate surface is prepared (e.g., a carbon-based substrate). Gold colloid is disposed on the substrate in step 1708, followed by drying in step 1710. Nanowire growth is then performed in step 1712 using a VLS-process (other processes as described herein can also be used). The nanowires are then harvested (for example, by sonication) in step 1714, filtered in step 1716 and dried in step 1718. The nanowires can then be balled milled in step 1720 to be used as additives as described herein. Suitably, as described in U.S. Provisional Patent Application No. 61/221,501, filed Jun. 29, 2009, entitled "Methods for Growth of High Density Nanowires," and U.S. Provisional Patent Application No. 61/179,663, a cartridge assembly 1722 is used to facilitate preparation of a large number of nanowires.

Figure 18:
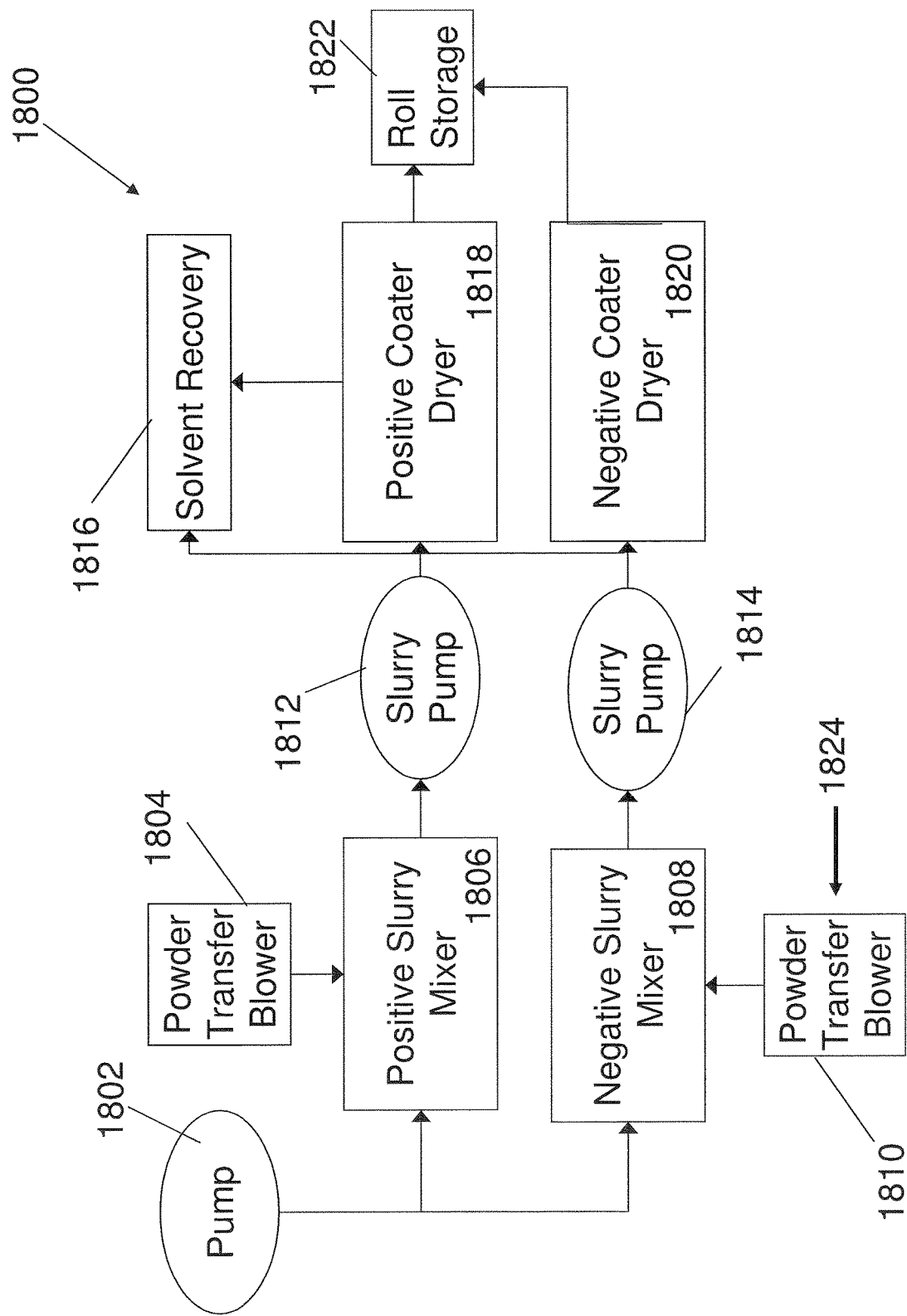
FIG. 18 shows an exemplary process/equipment design for introducing the additives of the present invention into existing slurry preparations.

FIG. 18 describes an exemplary process of introducing the additives of the present invention into existing slurry preparation protocols/equipment designs 1800. As shown in FIG. 18, exemplary preparation protocols/equipment design 1800 suitably includes pump 1802, powder transfer blowers 1804 and 1810, and positive slurry mixer 1806 and negative slurry mixer 1808. The positive and negative slurry mixers feed into slurry pumps 1812 and 1814, respectively. Slurry pumps 1812 and 1814 feed into positive coater dryer 1818 and negative coater dryer 1820, respectively. A solvent recovery mechanism 1816 is also provided. Positive coater dryer 1818 and negative coater dryer 1820 both feed into roll storage 1822, which ends the exemplary preparation protocol/equipment design 1800. As described throughout, additives of the present invention are suitably added in 1824 to powder transfer flower 1810, which are then mixed and prepared into anodes. Other suitable preparation protocols/equipment designs will be readily envisioned by those skilled in the art, and the design shown in 1800 is provided for illustrative purposes only as an example.

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

All publications, patents and patent applications mentioned in this specification are indicative of the level of skill of those skilled in the art to which this invention pertains, and are herein incorporated by reference to the same extent as if each individual publication, patent or patent application was specifically and individually indicated to be incorporated by reference.

The invention claimed is:

1. A battery slurry additive comprising:
   a plurality of Si-based nanoscale scaffolds disposed on particles of a carbon-based powder substrate comprising carbon black or graphite and forming a porous network,
   wherein the particles of the carbon-based powder substrate are between 5 microns and 50 microns,
   wherein the plurality of Si-based nanoscale scaffolds have a core-shell structure,
   wherein the plurality of Si-based nanoscale scaffolds comprise nanowires with at least one cross-sectional dimension less than 100 nm,
   wherein said porous network comprises mesopores and macropores, and
   wherein said porous network can accommodate volume changes associated with lithiation and delithiation during repeated charge/discharge cycles of a battery anode electrode.

2. The battery slurry additive as claimed in claim 1, wherein the Si-based nanoscale scaffolds comprise at least 50% silicon.

3. The battery slurry additive as claimed in claim 1, wherein the Si-based nanoscale scaffolds comprise at least 95% silicon.

4. The battery slurry additive as claimed in claim 1, wherein the core of the Si-based nanoscale scaffolds comprise crystalline silicon.

5. The battery slurry additive as claimed in claim 1, wherein the shell of the Si-based nanoscale scaffolds comprise amorphous silicon or carbon.

6. The battery slurry additive as claimed in claim 1, wherein the Si-based nanoscale scaffolds comprise nanowires, nanorods, nanoparticles or nanofilms.

7. The battery slurry additive as claimed in claim 1, wherein the Si-based nanoscale scaffolds comprise nanoparticles with all dimensions less than 50 nm.

8. The battery slurry additive as claimed in claim 1, wherein the carbon-based powder substrate comprises at least about 90% carbon by mass.

9. The battery slurry additive as claimed in claim 1, wherein the carbon-based powder substrate comprises at least about 95% carbon by mass.

10. The battery slurry additive as claimed in claim 1, where the porous network is substantially free of micropores.

11. The battery slurry additive as claimed in claim 1, wherein the Si-based nanoscale scaffolds comprise a conductive polymer.

12. The battery slurry additive as claimed in claim 11, wherein the conductive polymer comprises one or more of polyvinylidene difluoride (PVDF), polypyrrole, polythiaphene, polyethylene oxide, polyacrylonitrile, poly (ethylene succinate), polypropylene, poly ((3-propiolactone), styrene butadiene rubber (SBR), carboxymethyl cellulose (CMC), and sulfonated fluoropolymers.

13. The battery slurry additive as claimed in claim 1, wherein the Si-based nanoscale scaffolds comprise an artificial solid electrolyte interphase (SEI).

14. The battery slurry additive as claimed in claim 1, wherein the Si-based nanoscale scaffolds are pre-lithiated.

15. The battery slurry additive as claimed in claim 1, wherein the Si-based nanoscale scaffolds have a core-shell-shell structure.

16. The battery slurry additive of claim 1, wherein the shell comprises a metal or a metal-oxide.

17. The battery slurry additive of claim 1, wherein the core comprises crystalline silicon and the shell comprises amorphous silicon.

18. The battery slurry additive of claim 1, wherein the nanowires are grown directly on and attached to the surface of the carbon-based powder substrate.

19. The battery slurry additive of claim 1, wherein the nanowires intertwine, interweave or overlap to form the porous network.

20. A battery anode electrode for lithium-ion batteries, comprising:
    (1) a battery slurry additive as claimed in claim 1; and
    (2) a carbon-based material comprising graphite; and
    (3) a binder,
    wherein the battery anode electrode comprises 1 weight % to 80 weight % of said additive.

21. The battery anode electrode as claimed in claim 20, wherein the battery anode electrode comprises 5 weight % to 20 weight % of said Si-based nanoscale scaffolds.

22. The battery anode electrode as claimed in claim 20, wherein the battery anode electrode comprises 5 weight % to 30 weight % of said Si-based nanoscale scaffolds.

23. The battery anode electrode as claimed in claim 20, wherein the battery anode electrode comprises 5 weight % to 20 weight % of said additive.

24. A battery anode electrode for lithium-ion batteries, comprising:
    (1) a battery slurry additive as claimed in claim 1; and
    (2) a carbon-based material comprising graphite; and
    (3) a binder,
    wherein the battery anode electrode comprises 5 weight % to 20 weight % of said Si-based nanoscale scaffolds.

25. A battery comprising an anode electrode as claimed in claim 20, a cathode electrode, a separator, and an electrolyte.

26. The battery of claim 25, wherein the electrolyte comprises one selected from the group consisting of an alkali metal salt dissolved in organic solvent, an alkali metal salt mixed with an ionically conducting polymer, and an alkali metal salt mixed with an ionically conducting inorganic material.

27. The battery of claim 25, wherein the battery is a Li-ion battery.

28. A battery comprising an anode electrode as claimed in claim 24, a cathode electrode, a separator, and an electrolyte.

29. The battery of claim 28, wherein the electrolyte comprises one selected from the group consisting of an alkali metal salt dissolved in organic solvent, an alkali metal salt mixed with an ionically conducting polymer, and an alkali metal salt mixed with an ionically conducting inorganic material.

30. The battery slurry additive of claim 1, wherein at least one of the nanowires comprises a semiconductor oxide.

\* \* \* \* \*